US012767568B1

(12) United States Patent
Mohammed et al.

(10) Patent No.: US 12,767,568 B1
(45) Date of Patent: Oct. 20, 2026

(54) METHOD OF REMOVING HEAVY METAL FROM WASTEWATER

(71) Applicant: KING FAHD UNIVERSITY OF PETROLEUM AND MINERALS, Dhahran (SA)

(72) Inventors: Isah Mohammed, Dhahran (SA); Dhafer Abdullah Al Shehri, Dhahran (SA); Mohamed Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/417,037

(22) Filed: Dec. 11, 2025

Related U.S. Application Data

(60) Provisional application No. 63/857,649, filed on Aug. 5, 2025.

(51) Int. Cl.

| | |
|---|---|
| ***C02F 1/66*** | (2023.01) |
| ***C02F 1/52*** | (2023.01) |
| *C02F 101/20* | (2006.01) |
| *C02F 101/22* | (2006.01) |

(52) U.S. Cl.
CPC .............. *C02F 1/66* (2013.01); *C02F 1/5272* (2013.01); *C02F 2101/203* (2013.01); *C02F 2101/206* (2013.01); *C02F 2101/22* (2013.01); *C02F 2301/024* (2013.01)

(58) Field of Classification Search
None
See application file for complete search history.

(56) References Cited

U.S. PATENT DOCUMENTS

| | | | | |
|---|---|---|---|---|
| 2008/0038169 A1* | 2/2008 | Phan | ........................ | C22B 3/284 423/120 |
| 2019/0367390 A1* | 12/2019 | Sant | ........................ | C01F 11/005 |

FOREIGN PATENT DOCUMENTS

| | | | |
|---|---|---|---|
| EP | 408937 A1 | 1/1991 | |
| JP | 2002224676 A | 8/2002 | |
| JP | 08425170 B2 | 11/2018 | |
| JP | 2024051869 A | 4/2024 | |

OTHER PUBLICATIONS

Quanyuan Chen, et al.. "Precipitation of heavy metals from wastewater using simulated flue gas: Sequent additions of fly ash, lime and carbon dioxide" Water Research, vol. 43, Issue 10, Jun. 2009, pp. 2605-2614.

* cited by examiner

*Primary Examiner* — Richard C Gurtowski
(74) *Attorney, Agent, or Firm* — Oblon, McClelland, Maier & Neustadt, L.L.P.

(57) ABSTRACT

A method of removing a heavy metal from a wastewater includes adding a chelating agent to the wastewater to obtain a mixture. The method includes mixing $CO_2$ with the mixture to reach an alkaline pH to generate a carbonic mixture. The method includes precipitating the carbonic mixture to generate a mineral entrapping the heavy metal. The chelating agent is present in the wastewater at an amount of 0.1 to 15 wt. % based on the total weight of the wastewater. The wastewater includes an alkali metal and an alkaline earth metal. The heavy metal, the alkali metal, and the alkaline earth metal are in the form of water-soluble salts. The chelating agent is at least one selected from the group consisting of ethylenediaminetetraacetic acid (EDTA), gluconic acid, citric acid, and phytic acid.

20 Claims, 26 Drawing Sheets

METHOD OF REMOVING HEAVY METAL FROM WASTEWATER

CROSS-REFERENCE TO RELATED APPLICATION

The present application claims benefit of priority to U.S. Provisional Application No. 63/857,649 having a filing date of Aug. 5, 2025, and which is incorporated herein by reference in its entirety.

STATEMENT OF PRIOR DISCLOSURE BY AN INVENTOR

Aspects of the present disclosure are described in Mohammed, I.; Mahmoud, M.; Shehri, D. A.; Bello, A. "A complementary eco-friendly approach to heavy metal removal from wastewater/produced water streams through mineralization." Journal of Environmental Chemical Engineering, 2024, 12 (5), 113939, which is incorporated herein by reference in its entirety.

STATEMENT OF ACKNOWLEDGEMENT

Support provided by the College of Petroleum and Geoscience at King Fahd University of Petroleum and Minerals, Saudi Arabia is gratefully acknowledged.

BACKGROUND

Technical Field

The present disclosure is directed at a method of removing heavy metals from a wastewater.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Increasing global water demand has led to reliance on desalination and treatment of wastewater and produced water, especially in regions like Saudi Arabia. These water sources often contain heavy metals exceeding safe limits, posing health and environmental risks. Conventional removal methods such as chemical precipitation, ion exchange, adsorption, electrochemical deposition, and membrane filtration have limitations including incomplete removal, sensitivity to contaminants, and operational inefficiencies. Therefore, improved treatment solutions are needed.

Accordingly, an object of the present disclosure is directed to a more effective water treatment method for heavy metal removal, thereby overcoming the limitations of the prior art.

SUMMARY

In an exemplary embodiment, a method of removing heavy metals from a wastewater is described. The method includes adding a chelating agent to the wastewater to obtain a mixture. The method includes mixing $CO_2$ with the mixture to reach an alkaline pH to generate a carbonic mixture.

The method includes precipitating the carbonic mixture to generate a mineral entrapping the heavy metal. The chelating agent is present in the wastewater at an amount of 0.1 to 15 wt. % based on the total weight of the wastewater. The wastewater includes an alkali metal and an alkaline earth metal. The heavy metal, the alkali metal, and the alkaline earth metal are in the form of water-soluble salts. The chelating agent is at least one selected from the group consisting of ethylenediaminetetraacetic acid (EDTA), gluconic acid, citric acid, and phytic acid. The $CO_2$ is in the form of a gas consisting essentially of $CO_2$ at a pressure of 10 to 100 psi, and the mixing includes sparging the $CO_2$ into the mixture with a flow rate sufficient to distribute the $CO_2$ evenly into the mixture. The carbonic mixture has a pH of 8 to 12. The heavy metal is preferably present in the mineral in an amount of 0.001 to 1 wt. % based on the total weight of the mineral after precipitating.

In some embodiments, the mixing includes turbulent mixing of the $CO_2$ through the mixture.

In some embodiments, the heavy metal is at least one selected from the group consisting of iron, copper, lead, cadmium, chromium, nickel, zinc, strontium, barium, cobalt, manganese, gold, ruthenium, palladium, and silver.

In some embodiments, the alkali metal is sodium, potassium, or a combination thereof.

In some embodiments, the alkaline earth metal is magnesium, calcium, or a combination thereof.

In some embodiments, the $CO_2$ is mixed with the mixture at a pressure of 12 to 80 psi.

In some embodiments, the method further includes repeating the mixing and the precipitating 3 to 10 times.

In some embodiments, the mixing lasts for a period of 1 to 1500 minutes.

In some embodiments, the carbonic mixture has a pH of 8 to 12 after precipitating.

In some embodiments, the precipitating is carried out for a period of 10 to 100 hours.

In some embodiments, the precipitating generates 0.1 to 5 g of mineral per 50 mL of wastewater.

In some embodiments, the mineral includes sodium in an amount of 2 to 25 wt. %, magnesium in an amount of 0.5 to 6 wt. %, aluminum in an amount of 0.01 to 0.2 wt. %, silicon in an amount of 0.001 to 0.4 wt. %, chloride in an amount of 35 to 70 wt. %, potassium in an amount of 0.1 to 8 wt. %, calcium in an amount of 4 to 30 wt. %, chromium in an amount of 0.0001 to 0.05 wt. %, manganese in an amount of 0.001 to 0.3 wt. %, iron in an amount of 0.0.0001 to 0.05 wt. %, cobalt in an amount of 0.0001 to 0.02 wt. %, nickel in an amount of 0.001 to 0.04 wt. %, copper in an amount of 0.001 to 0.03 wt. %, zinc in an amount of 0.0001 to 0.01 wt. %, and strontium in an amount of 0.005 to 0.03 wt. %, based on the total weight of the mineral.

In some embodiments, the mineral includes halite in an amount of 80 to 99.8 wt. %.

In some embodiments, the halite includes chloride in an amount of 40 to 55 wt. %, sodium in an amount of 25 to 35 wt. %, oxygen in an amount of 10 to 15 wt. %, zinc in an amount of 2 to 6 wt. %, magnesium in an amount of 0.1 to 2 wt. %, and calcium in an amount of 0.1 to 2 wt. %, based on the total amount of the halite in the mineral.

In some embodiments, the halite further includes palladium in an amount of 1 to 5 wt. %, ruthenium in an amount of 1 to 4 wt. %, based on the total amount of the halite in the mineral.

In some embodiments, the mineral includes quartz in an amount up to 5 wt. %.

In some embodiments, the mineral includes brucite in an amount up to 12 wt. %, and aragonite in an amount up to 2 wt. % based on the total weight of the mineral.

In some embodiments, the mineral includes calcite in an amount of 0.05 to 4 wt. %, based on the total weight of the mineral.

In some embodiments, the mineral includes halite and brucite in a rhombohedral morphology, calcite in a prismatic morphology, and aragonite in a fibrous-shaped morphology.

In some embodiments, the amount of heavy metal in the wastewater is reduced by 30 to 100% by weight after the precipitating.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
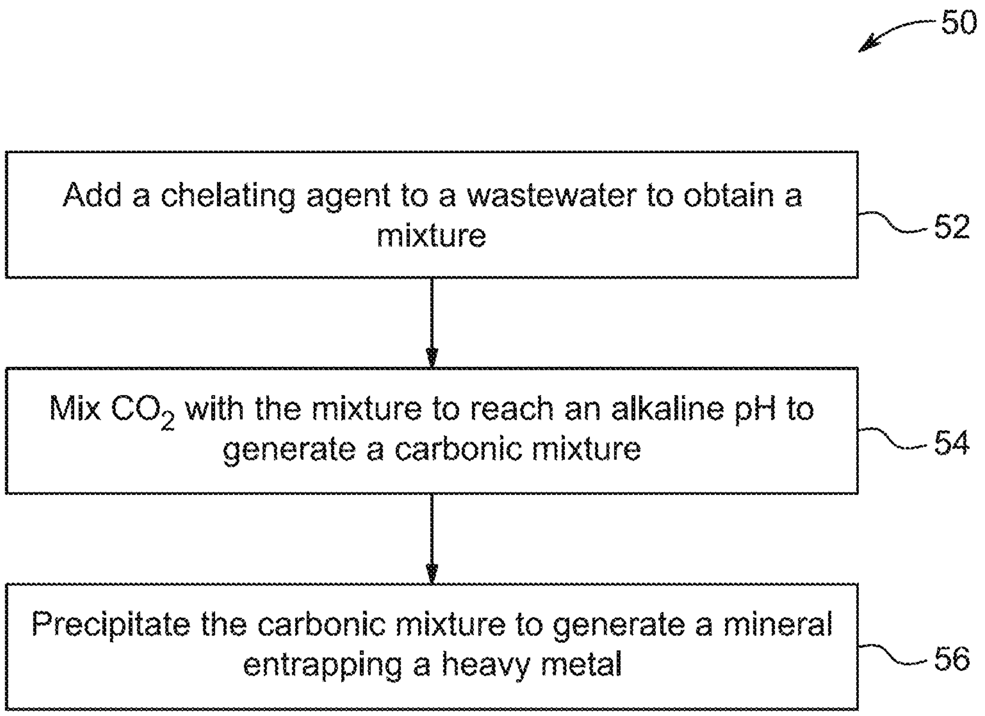
FIG. 1 is a schematic flow chart illustrating a method of removing a heavy metal from a wastewater, according to certain embodiments.

When describing the present disclosure, the terms used are to be construed in accordance with the following definitions, unless a context dictates otherwise.

Embodiments of the present invention may now be described more fully hereinafter with reference to the accompanying drawings wherever applicable, in that some, but not all, embodiments of the disclosure are shown.

In the drawings, reference numerals designate identical or corresponding parts throughout the several views. Further, as used herein, the words 'a', 'an', and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

As used herein, the term 'heavy metals' refers to metallic elements with high atomic weights and densities that are toxic to organisms at low concentrations, including but not limited to lead (Pb), mercury (Hg), cadmium (Cd), arsenic (As), and chromium (Cr).

As used herein, the term 'contaminated water sources' refers to bodies of water, including groundwater, surface water, or produced water, that contain pollutants at concentrations exceeding regulatory or naturally occurring baseline levels.

As used herein, the term 'wastewater' refers to water that has been adversely affected in quality by anthropogenic activity, including domestic, municipal, industrial, and oil field effluent streams.

As used herein, the term 'chelating agent' refers to a chemical species capable of forming multiple coordinate bonds with a metal ion, resulting in the formation of a stable ring structure and thereby facilitating metal ion sequestration and removal.

As used herein, the term 'alkali metal' refers to elements in Group 1 of the Periodic Table, including lithium (Li), sodium (Na), potassium (K), rubidium (Rb), cesium (Cs), and francium (Fr).

As used herein, the term 'alkaline earth metal' refers to elements in Group 2 of the Periodic Table, including beryllium (Be), magnesium (Mg), calcium (Ca), strontium (Sr), barium (Ba), and radium (Ra).

Aspects of the present disclosure are directed to a method for removing heavy metals from contaminated water sources, including produced water and industrial effluents. In the present disclosure, additives are introduced, and the water is exposed to atmospheric or captured $CO_2$, promoting the precipitation and immobilization of heavy metals within crystal structures such as aragonite, calcite, and halite. This process leverages the dehydration and chelation of heavy metals, enhancing their removal efficiency and complementing existing wastewater treatment technologies to improve water safety and security.

FIG. 1 illustrates a flow chart of a method 50 of removing a heavy metal from a wastewater. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes adding a chelating agent to the wastewater to obtain a mixture. The chelating agent is at least one selected from the group consisting of ethylenediaminetetraacetic acid (EDTA), gluconic acid, citric acid, and phytic acid. Other chelating agents suitable for use in the wastewater treatment may include diethylenetriaminepentaacetic acid (DTPA), ethylene glycol tetraacetic acid (EGTA), nitrilotriacetic acid (NTA), oxalic acid, tartaric acid, iminodiacetic acid (IDA), polyaminocarboxylic acids, and aminopolyphosphonic acids such as aminotris(methylenephosphonic acid) (ATMP).

At step 54, the method 50 includes mixing $CO_2$ with the mixture to reach an alkaline pH to generate a carbonic mixture. In some embodiments, the mixing includes turbulent mixing of the $CO_2$ through the mixture. In some embodiments, the mixing lasts for a period of 1 to 1500 minutes. $CO_2$ is in the form of a gas consisting essentially of $CO_2$ at a pressure of 10 to 100 psi, and the mixing includes sparging the $CO_2$ into the mixture with a flow rate sufficient. In some embodiments, the $CO_2$ is mixed with the mixture at a pressure of 12 to 80 psi.

At step 56, the method 50 includes precipitating the carbonic mixture to generate a mineral entrapping the heavy metal. The chelating agent is present in the wastewater at an amount of 0.1 to 15 wt. % based on the total weight of the wastewater. The wastewater includes an alkali metal and an alkaline earth metal. The heavy metal, the alkali metal, and the alkaline earth metal are in the form of water-soluble salts. In some embodiments, the heavy metal is at least one selected from the group consisting of iron, copper, lead, cadmium, chromium, nickel, zinc, strontium, barium, cobalt, manganese, gold, ruthenium, palladium, and silver. In some embodiments, the alkali metal is sodium, potassium, or a combination thereof. In some embodiments, the alkaline earth metal is magnesium, calcium, or a combination thereof. to distribute the $CO_2$ evenly into the mixture. The carbonic mixture has a pH of 8 to 12, preferably 8.5 to 10.5. In some embodiments, the carbonic mixture has a pH of 8 to 12, preferably 8.5 to 10.0 after precipitating. In some embodiments, the precipitating is carried out for a period of 10 to 100 hours, preferably 12 to 96 hours, preferably about 24 hours, preferably about 48 hours, preferably about 72 hours, and preferably about 96 hours. In some embodiments, the precipitating generates minerals in an amount of 0.1 to 5 g, preferably 0.5 to 4 g per 50 mL of wastewater.

In such steps, $CO_2$ is introduced into the mixture, which contains the alkali and alkaline earth metals as well as the chelating agent. The mixing is carried out under alkaline conditions to favor the formation of carbonate species within the solution. Turbulent mixing or sparging facilitates even distribution of $CO_2$ throughout the mixture, enhancing mass transfer and accelerating the chemical reactions required for mineral generation. The interaction of $CO_2$ with the dissolved ions initiates the formation of carbonic mixtures, setting the stage for subsequent mineral precipitation.

The role of the chelating agent is to selectively bind heavy metals, thereby reducing their solubility and promoting their coprecipitation with the carbonate minerals formed during the mixing phase. Operating under alkaline pH conditions not only maximizes carbonate mineral formation but also ensures that heavy metals are more amenable to immobilization.

In some embodiments, the heavy metal is present in the mineral in an amount of 0.001 to 1 wt. %, preferably 0.005 to 0.9 wt. %, preferably 0.01 to 0.8 wt. %, preferably 0.015 to 0.6 wt. %, preferably 0.02 to 0.4 wt. %, preferably 0.025 to 0.3 wt. %, preferably 0.03 to 0.2 wt. %, based on the total weight of the mineral after precipitating.

Precipitation of carbonate minerals occurs, entrapping heavy metals within the solid matrix. The chelating agent promotes incorporation of these metals into the mineral structure during this phase. This results in the effective immobilization of heavy metals, which can then be separated from the treated water as stable mineral solids.

In some embodiments, the method 50 further includes repeating the mixing and the precipitating 3 to 10 times, preferably 4 to 9 times, preferably 5 to 8 times, to enhance removal efficiency and maximize mineral recovery.

In some embodiments, the mineral includes sodium in an amount of 2 to 25 wt. %, preferably 3 to 24 wt. %, preferably 4 to 23 wt. %, preferably 5 to 22 wt. %, preferably 6 to 21 wt. %, preferably 7 to 20 wt. %; magnesium in an amount of 0.5 to 6 wt. %, preferably 0.8 to 5.5 wt. %, preferably 1.1 to 5.0 wt. %, preferably 1.4 to 4.5 wt. %, preferably 1.7 to 4.0 wt. %, preferably 1.8 to 3.8 wt. %; aluminum in an amount of 0.01 to 0.2 wt. %, preferably 0.03 to 0.18 wt. %, preferably 0.06 to 0.16 wt. %, preferably 0.09 to 0.14 wt. %; silicon in an amount of 0.001 to 0.4 wt. %, preferably 0.01 to 0.35 wt. %, preferably 0.05 to 0.3 wt. %, preferably 0.1 to 0.25 wt. %; chloride in an amount of 35 to 70 wt. %, preferably 38 to 68 wt. %, preferably 41 to 65 wt. %, preferably 44 to 62 wt. %, preferably 47 to 59 wt. %; potassium in an amount of 0.1 to 8 wt. %, preferably 0.5 to 6.5 wt. %, preferably 0.9 to 6.0 wt. %, preferably 1.3 to 5.5 wt. %, preferably 1.7 to 5.0 wt. %; calcium in an amount of 4 to 30 wt. %, preferably 6 to 28 wt. %, preferably 8 to 26 wt. %, preferably 10 to 24 wt. %, preferably 12 to 22 wt. %, preferably 14 to 20 wt. %; chromium in an amount of 0.0001 to 0.05 wt. %, preferably 0.001 to 0.04 wt. %, preferably 0.005 to 0.03 wt. %, preferably 0.01 to 0.02 wt. %; manganese in an amount of 0.001 to 0.3 wt. %, preferably 0.01 to 0.28 wt. %, preferably 0.02 to 0.25 wt. %, preferably 0.03 to 0.2 wt. %; iron in an amount of 0.0001 to 0.05 wt. %, preferably 0.001 to 0.04 wt. %, preferably 0.005 to 0.03 wt. %, preferably 0.01 to 0.02 wt. %; cobalt in an amount of 0.0001 to 0.02 wt. %, preferably 0.001 to 0.018 wt. %, preferably 0.002 to 0.016 wt. %, preferably 0.003 to 0.014 wt. %; nickel in an amount of 0.001 to 0.04 wt. %, preferably 0.002 to 0.035 wt. %, preferably 0.003 to 0.03 wt. %; copper in an amount of 0.001 to 0.03 wt. %, preferably 0.002 to 0.025 wt. %, preferably 0.003 to 0.02 wt. %; zinc in an amount of 0.0001 to 0.01 wt. %, preferably 0.001 to 0.009 wt. %, preferably 0.002 to 0.008 wt. %; and strontium in an amount of 0.005 to 0.03 wt. %, preferably 0.006 to 0.025 wt. %, preferably 0.007 to 0.02 wt. %, preferably 0.008 to 0.015 wt. %; based on the total weight of the mineral.

In some embodiments, an EDTA concentration of 1 wt. % applied to ABQQ (Fluid F3), the resulting mineral precipitate contains sodium at 7.23 wt. %, magnesium at 1.82 wt. %, aluminum at 0.13 wt. %, silicon at 0.23 wt. %, chloride at 67.61 wt. %, potassium at 1.04 wt. %, calcium at 21.78 wt. %, chromium at 0.0156 wt. %, manganese at 0.0328 wt. %, iron at 0.0210 wt. %, cobalt at 0.0024 wt. %, nickel at 0.0078 wt. %, copper at 0.0034 wt. %, zinc at 0.0085 wt. %, and strontium at 0.0088 wt. %.

In some embodiments, the mineral includes halite in an amount of 80 to 99.8 wt. %, preferably 84 to 99.6 wt. %, more preferably 85 to 99 wt. %, and most preferably about 86.3 wt. % as determined for the F3 fluid at 1 wt. % EDTA concentration.

In some embodiments, the halite includes chloride in an amount of 40 to 55 wt. %, sodium in an amount of 25 to 35 wt. %, oxygen in an amount of 10 to 15 wt. %, zinc in an amount of 2 to 6 wt. %, magnesium in an amount of 0.1 to 2 wt. %, and calcium in an amount of 0.1 to 2 wt. %, based on the total amount of the halite in the mineral. In some embodiments, the halite includes chloride in an amount of 40 to 55 wt. %, preferably 44 to 45 wt. %, more preferably 44.5 wt. %; sodium in an amount of 25 to 35 wt. %, preferably 30 to 31 wt. %, more preferably 30.8 wt. %; oxygen in an amount of 10 to 15 wt. %, preferably 12 to 13 wt. %, more preferably 12.6 wt. %; zinc in an amount of 2 to 6 wt. %, preferably 3.3 to 3.5 wt. %, more preferably 3.4 wt. %; magnesium in an amount of 0.1 to 2 wt. %, preferably 0.9 to 1.0 wt. %, more preferably 0.9 wt. %; and calcium in an amount of 0.1 to 2 wt. %, preferably 1.0 to 1.2 wt. %, more preferably 1.1 wt. %; all as determined for the halite phase isolated from the mineral precipitate of the F3 fluid at 1 wt. % EDTA concentration.

In some embodiments, the halite further includes palladium in an amount of 1 to 5 wt. %, preferably 2 to 4 wt. %, more preferably about 2.5 wt. %, and ruthenium in an amount of 1 to 4 wt. %, preferably 1.5 to 3.5 wt. %, more preferably about 2.1 wt. %, all based on the total amount of halite in the mineral. In some embodiments, the mineral includes quartz in an amount up to 5 wt. %, preferably up to 4 wt. %, preferably about 3.7 wt. %. In some embodiments, the mineral includes brucite in an amount up to 12 wt. %, preferably up to 10 wt. %, more preferably about 9.2 wt. %, and aragonite in an amount up to 2 wt. %, preferably up to 1 wt. %, more preferably about 0.7 wt. %, all based on the total weight of the mineral. In some embodiments, the mineral includes calcite in an amount of 0.05 to 4 wt. %, preferably 0.1 to 0.5 wt. %, more preferably about 0.1 wt. %, based on the total weight of the mineral.

In some embodiments, the mineral includes halite and brucite in a rhombohedral morphology, calcite in a prismatic morphology, and aragonite in a fibrous-shaped morphology. Other possible morphologies that may be observed in the mineral include cubic and sub-rounded crystal shapes for halite, granular and bladed forms for brucite, and rhombohedral or scalenohedral shapes for calcite. Aragonite may also exhibit needle-like or columnar morphologies. Quartz typically appears as euhedral or subhedral grains surrounded by other mineral phases.

In some embodiments, the amount of heavy metal in the wastewater is reduced by 30 to 100% by weight after the precipitating. In some embodiments, the amount of heavy metal in the wastewater is reduced by 30 to 100 wt. %, preferably 40 to 95 wt. %, and more preferably 50 to 90 wt. % after the precipitating and mineralization process.

EXAMPLES

The following examples demonstrate a method of removing a heavy metal from a wastewater as described herein. The examples are provided solely for illustration and are not to be construed as limitations of the present disclosure, as many variations thereof are possible without departing from the spirit and scope of the present disclosure.

Example 1. Material and Methodology

The salts that were employed in the present disclosure to make the brine were calcium chloride dihydrate, magnesium chloride hexahydrate, sodium chloride, potassium nitrate, ammonium formate, cadmium nitrate tetrahydrate, chromium (II) nitrate nonahydrate, nickel (II) nitrate nonahydrate, barium nitrate supplied by Sigma Aldrich. Ferric nitrate, zinc chloride, and manganese (II) nitrate tetrahydrate were supplied by Loba Chemie Pvt Ltd, Honeywell Fluka, and Alfa Aesar respectively. Lead (II) nitrate and strontium were prepared using ICP standards from Unltrascientific and Merck KGaA, Germany respectively. The chelating agent utilized in the present disclosure is the ethylenediaminetetraacetic acid (EDTA) supplied by Sigma Aldrich. The investigation employed $CO_2$ gas that Air Liquide Saudi Arabia supplied. The various brine solutions examined in the present disclosure were prepared using deionized water.

The present disclosure assesses two approaches to heavy metal mineralization-usage of atmospheric $CO_2$ and low-pressure bubbling of $CO_2$ into the brines. This is to assess the possibility of using low-pressure mineralization for operational convenience and the self-absorption of $CO_2$ from the atmosphere. This will mean that $CO_2$ will be absorbed from a sizable pit of wastewater that is exposed to the atmosphere and treated with additives such as those used in the present disclosure.

TABLE 1

Published wastewater and produced water data from the published art.

| Parameter | BM-WWTP [1] | LGW [1] | ABQQ [2] | ANDR [2] | SDGM [2] |
|---|---|---|---|---|---|
| pH | 7.29 | 7.89 | 7.2 | 7.2 | 7.4 |
| EC (μS/cm) | 123000 | 253000 | 113543.8 | 101148.9 | 102690 |
| Ca (mg/L) | 83.75 | 54.28 | 9911.9 | 6747.2 | 8626.0 |
| Mg (mg/L) | 13.4 | 27.66 | 1249.8 | 993.9 | 1134.4 |
| Na (mg/L) | 47.03 | 83.76 | 23281.3 | 19783.3 | 18100.0 |
| K (mg/L) | 6.88 | 3.89 | 965.9 | 821.4 | 887.7 |
| $NH_4$—N (mg/L) | 37.41 | 0 | — | — | — |
| $NO_3$—N (mg/L) | 24.32 | 0 | — | — | — |
| P (mg/L) | 9.85 | 0 | | | |
| Fe (mg/L) | 1.63 | 0.018 | 0.02 | 0.02 | 0.04 |
| Zn (mg/L) | 0.106 | 0.01 | 0.01 | — | — |
| Mn (mg/L) | 0.106 | 0.02 | 0.14 | 0.46 | 0.03 |
| Cu (mg/L) | 0.051 | 0.079 | 0.04 | 0.01 | 0.03 |
| Pb (mg/L) | 0.022 | 0.04 | — | — | — |
| Cd (mg/L) | 0.0096 | 0.0001 | — | — | — |
| Cr (mg/L) | 0.015 | 0.029 | — | — | — |
| Ni (mg/L) | 0.036 | 0.006 | | | |
| Sr (mg/L) | — | — | 505.8 | 315.7 | 413.5 |
| Ba (mg/L) | — | — | 3.4 | 0.3 | 0.3 |
| Cl (mg/L) | — | — | 56317.1 | 44903.0 | 44729.1 |
| $SO_4$ (mg/L) | — | — | 582.5 | 626.0 | 478.7 |
| B (mg/L) | | | 20.5 | 3.7 | 14.0 |
| Al (mg/L) | | | 0.05 | 0.07 | 0.06 |
| Ag | — | — | — | — | — |

The synthetic wastewater and produced water fluids used in the present disclosure were made following published data from various locations in Saudi Arabia. This includes data from the Samtah sewage treatment plant [Alnashiri, H. M., Assessment of physicochemical parameters and heavy metal concentration in the effluents of sewage treatment plants in Jazan Region, Saudi Arabia, J. King Saud Univ.-Sci., 33 (2), 2021, 101600, incorporated herein by reference in its entirety], the Jeddah city Bani-Malik wastewater treatment plant (BM-WWTP) influent, and local groundwater (LGW) [Balkhair, K. S., et al., Field accumulation risks of heavy metals in soil and vegetable crops irrigated with sewage water in western region of Saudi Arabia, Saudi. J. Biol. Sci., 23 (S1), 2016, S32-S44, incorporated herein by reference in its entirety]. The produced water data utilized in the present disclosure are those of 55 wells in the Gawar fields of Abqaiq (ABQQ), Aindar (ANDR), and Shedgum (SDGM) [Ullattumpoyil, N., Produced water geochemistry from an upstream oil operation, J. Geosci. Environ. Prot., 11 (3), 2023, 155-168, incorporated herein by reference in its entirety]. Table 1 displays a summary of the published data used to prepare the fluids. To prepare the synthetic fluids to represent the data in Table 1, salts as mentioned in the preceding section were used as shown in Table 2. These fluids were allowed to stand undisturbed while being stirred for 24 hours before use to ensure all salts were well dissolved. More so, the fluids were filtered to ensure no undissolved salts were left in the brine before usage. Additionally, the fluids' initial pH and conductivity as well as ionic composition were measured.

Table 1 includes the following references, which are incorporated herein by references in their entireties:

[1]. Alnashiri, H. M., Assessment of physicochemical parameters and heavy metal concentration in the effluents of sewage treatment plants in Jazan Region, Saudi Arabia, J. King Saud Univ.-Sci., 33 (2), 2021, 101600, incorporated herein by reference in its entirety.

[2]. Ullattumpoyil, N., Produced water geochemistry from an upstream oil operation, *J. Geosci. Environ. Prot.,* 11 (3), 2023, 155-168, incorporated herein by reference in its entirety.

The low-pressure surface mineralization scenario involves the bubble-through (at less than 100 psi) of collected $CO_2$ through wastewater that has been treated with additives to enhance the kinetics of mineralization. This is a feasible approach overall since it resembles aeration chambers used in water treatment procedures. Furthermore, aeration tanks are adaptable for this use. $CO_2$ is introduced into contact with the fluid in both cases of heavy metal mineralization, both with and without additives (EDTA). Furthermore, the impact of additive concentration on the mineralization of heavy metals is investigated. The samples are exposed to atmospheric conditions and left undisturbed for 96 hours before the conclusion of the tests in the instance that $CO_2$ is absorbed by the wastewater from the atmosphere. Following filtering the samples containing precipitates, X-ray fluorescence (XRF) and X-ray diffraction (XRD) are used to analyze the precipitates. Furthermore, measurements of the fluids' ionic composition, pH, and conductivity are made every 48 and 96 hours.

TABLE 2

Composition of prepared synthetic waste and produced water.

| Salts | | | Composition (g/L) | | | | |
|---|---|---|---|---|---|---|---|
| Chemical Name | Chemical formula | pH | BM-WWTP 7.29 | LGW 7.89 | ABQQ 7.20 | ANDR 7.20 | SDGM 7.40 |
| Calcium chloride•2$H_2O$ | $CaCl_2$ | | 0.30720 | 0.19910 | 36.35784 | 24.74940 | 31.64103 |
| Magnesium chloride.6$H_2O$ | $MgCl_2O$ | | 0.11208 | 0.23136 | 10.45399 | 8.31351 | 9.48873 |
| Sodium chloride | NaCl | | 0.11955 | 0.21292 | 59.18107 | 50.28915 | 46.01021 |
| Potassium nitrate | $KNO_3$ | | 0.01779 | 0.01006 | 2.49761 | 2.12397 | 2.29541 |
| Ammonium formate | $CH_5NO_2$ | | 0.13077 | 0.00000 | 0.00000 | 0.00000 | 0.00000 |
| Ferric Nitrate | $Fe(NO_3)_3$•9$H_2O$ | | 0.01179 | 0.00013 | 0.00014 | 0.00014 | 0.00029 |
| Zinc chloride | $ZnCl_2$ | | 0.00022 | 0.00002 | 0.00002 | 0.00000 | 0.00000 |
| Manganese (II) nitrate tetrahydrate | $Mn(NO_3)_2$•4$H_2O$ | | 0.000488 | 0.00009 | 0.00064 | 0.00210 | 0.00014 |
| Copper (II) chloride | $CuCl_2$ | | 0.00011 | 0.00017 | 0.00008 | 0.00002 | 0.00006 |
| Lead (II) nitrate | $Pb(NO_3)_2$ | 5 mL | 0.11000 | 0.20000 | 0.00000 | 0.00000 | 0.00000 |
| Cadmium nitrate tetrahydrate | $CdN_2O_6$•4$H_2O$ | | 0.00003 | 0.00000 | 0.00000 | 0.00000 | 0.00000 |
| Chromium (II) nitrate nonahydrate | $Cr(NO_3)_3$•9$H_2O$ | | 0.00012 | 0.00022 | 0.00000 | 0.00000 | 0.00000 |
| Nickel (II) nitrate hexahydrate | $Ni(NO_3)_2$.6 $H_2O$ | | 0.00018 | 0.00003 | 0.00000 | 0.00000 | 0.00000 |
| Strontium ICP Standard | $Sr(NO_3)_2$ | 5 mL | 0.00000 | 0.00000 | 2.52900 | 1.57850 | 2.06750 |
| Barium nitrate | $Ba(NO_3)_2$ | | 0.00000 | 0.00000 | 0.00647 | 0.00057 | 0.00057 |
| Boron | $Na_2B_4O_7$•10$H_2O$ | 5 mL | 0.00000 | 0.00000 | 0.10250 | 0.01850 | 0.07000 |

In instances where low-pressure bubbling of $CO_2$ is carried out, the sample is bubbled with $CO_2$ for one hour every day and then let to stand undisturbed. This is carried out for the full 96 hours of experiments. The solid samples that precipitated in both cases are collected and dried. The solids are then analyzed using XRF and XRD after being dried at 40° C. Moreover, scanning electron microscopy with energy dispersive X-ray spectroscopy (SEM-EDX) analysis of the recovered solids is carried out. To accomplish the procedure outlined above, 50 milliliters of the brine are transferred into beakers, left undisturbed, and exposed to $CO_2$ in the atmosphere. To bubble $CO_2$ through the brine, 50 milliliters of the brine are transferred into rubber-sealed vials. After the hour-long bubbling process is over, the bottles remain undisturbed until the next day, when the process will be repeated. When examining the effects of additions like EDTA, 50 mL of brine was mixed with 25 mL of varying EDTA concentrations (1, 2, 3, 5, and 10%), and the mixture was then allowed to go through the two previously mentioned procedures. All experiment's precipitates are collected, dried, and characterized. More so, the pH, and conductivity of the samples as well as their ionic composition were analyzed.

Metrohm's 850 Professional ion chromatography (IC) and Thermo Fisher Scientific Integrated Capacitively Coupled Plasma Quadrupole Inductively Coupled Plasma-Mass Spectrometer (iCAP RQ ICP-MS) are used to analyze the fluids' ionic composition. Before this, the conductivity and pH of the fluids are measured. Before the ion analysis is carried out, the samples are diluted to the appropriate concentration based on the conductivity of the samples.

The ICP-MS equipment was used to analyze heavy metal concentrations, whereas the IC instrument was used to analyze cations such as Na, Mg, Ca, and K. The benchtop pH/mV meter (HI2211) with 0.01 resolution from HANNA Instruments was utilized in this investigation.

A total of 15 post-experiment samples were investigated using a Gemini 550 scanning electron microscope, which was fitted with an Aztec EDX spectrometer and a backscattered electron detector. Before running the SEM analysis, prepared stub-mounted samples were doubly coated with 30 nm gold-palladium using a Quorum QR150R sputter coater. The coated samples were investigated under the SEM at 15 kV and 166 pA probe current, at a working distance varying between 8- and 15-mm. Nine out of the fifteen precipitate samples that were recovered from the study were subjected to a SEM examination, as the samples generally displayed the same morphology when analyzed. Furthermore, XRD was used to carefully analyze the mineralogical composition of the material.

Density functional theory (DFT) simulations were carried out to shed light on the processes that led to the reduction in the concentration of the heavy metals as well as to shed light on the formation of precipitates and the interactions that produced them. The B3LYP/def2TZVP level of theory was used for all DFT computations, as implemented in Gaussian 16 [Frisch, M. J., et al., Gaussian 16 Revision A.03, Gaussian, Inc., Wallingford, 2016, incorporated herein by reference in its entirety]. The calculations were done implicitly in the solvent (water) using the self-consistent reaction field of the polarizable continuum model (PCM-SCRF) [Tomasi, J., et al., Quantum mechanical continuum solvation models, Chem. Rev., 105 (8), 2005, 2999-3094, incorporated herein by reference in its entirety]. Frequency calculations are performed to confirm that the energy-minimized structures are in a minimum energy state. The binding energies (counterpoise corrected) from the heavy metal ion, water, carbonate, EDTA, and their intermolecular interaction are evaluated using the same degree of theory as previously. Additionally, non-covalent interactions (NCI) were analyzed, and the nature of the interactions was ascertained using the Multiwfn tool [Tomasi, J., et al., Quantum mechanical continuum solvation models, Chem. Rev., 105 (8), 2005, 2999-3094, incorporated herein by reference in its entirety]. NCI allows for the observation and identification of various interactions, including hydrogen bonds, steric clashes, and van der Waals interactions. Plotting the reduced density gradient (RDG) s(r) vs density (ρ(r)) for low reduced gradient sites is one way to accomplish this. Furthermore, bond formation-which is indicated by the absence of peaks on the RDG maps—can be confirmed using the NCI analysis. The hydration of the ions was also examined with the number of water molecules in the first and second hydration shells examined.

The results of the mineralization-based heavy metal removal evaluation are mentioned. The study evaluated two heavy metal removal techniques. While $CO_2$ is extracted from the atmosphere in the first method, $CO_2$ is bubbled through the solution for one hour in the second method. In any event, $CO_2$ exposure is given to the produced water or wastewater to enable the heavy metals to mineralize. Furthermore, the role of additives such as chelating agents in promoting heavy metal removal is examined. The effect of different chelating agent concentrations is also examined to determine the desired chelating agent concentration. Before examining the findings, it is imperative to review the environmental regulations in Saudi Arabia as well as the allowable thresholds for heavy metals in discharge streams into lands and surface, marine, and coastal waterways.

Table 3 and 4 present the requirements for wastewater treatment in Saudi Arabia before it is discharged into land and water. Therefore, regardless of the method, all treated water needs to meet these requirements. Unfortunately, there are situations where state-of-the-art technologies cannot achieve these requirements; in such cases, complementary technologies, such as those demonstrated in the present disclosure, can be employed to ensure environmental safety. Apart from the heavy metal concentration, the discharge fluid pH is important since it impacts aquatic life. The processed water is used for agricultural irrigation projects or dumped into open waters. Furthermore, the water's chemistry may change due to the treated wastewater, affecting aquatic life. Furthermore, it has been indicated that the ocean absorbs around 25% of the atmospheric $CO_2$, reducing the effect of $CO_2$ on climate [Newton, J., et al., Ocean Acidification Research for Sustainability (OARS): The UN Decade Programme of the Global Ocean Acidification Observing Network (GOA-ON), 2021, incorporated herein by reference in its entirety].

However, there is a cost to that: marine life is impacted due to the water becoming more acidic. Moreover, acidification is predicted to continue, dropping the pH by about 0.3 units by 2081-2100 [Newton, J., et al., Ocean Acidification Research for Sustainability (OARS): The UN Decade Programme of the Global Ocean Acidification Observing Network (GOA-ON), 2021, incorporated herein by reference in its entirety]. Therefore, caution must be taken to ensure that wastewater injections do not add to the ocean's acidification.

TABLE 3

Standards of treated wastewater before discharge in coastal and marine waters

| Component | Unit | Parameter Average Value (Maximum for any Sample) |
|---|---|---|
| Chemical Standards | | |
| Biological Oxygen Demand ($BOD_5$) | mg/L | 10(25) |
| Chemical Oxygen Demand (COD) | mg/L | 20(50) |
| pH | — | (6.5-9) |
| Aluminum | mg/L | 5 |
| Barium | mg/L | 1 |
| Cadmium | mg/L | 0.005 |
| Chromium | mg/L | 0.01 |
| Cobalt | mg/L | 0.05 |
| Copper | mg/L | 0.5 |
| Iron | mg/L | 1 |
| Lead | mg/L | 0.008 |
| Manganese | mg/L | 0.2 |
| Nickel | mg/L | 0.008 |
| Zinc | mg/L | 0.08 |

TABLE 4

Standards of treated wastewater before discharge in soil, land, or surface water

| Component | Unit | Parameter Average Value (Maximum for any Sample) | |
|---|---|---|---|
| Chemical Standards | | | |
| | | Soil/Land | Surface Water |
| BOD5 | mg/L | 25(40) | 15(20) |
| pH | — | (6-8.4) | (6-8.4) |
| Aluminum | mg/L | 5 | 5 |
| Cadmium | mg/L | 0.1 | 0.01 |
| Chromium | mg/L | 0.1 | 0.1 |
| Cobalt | mg/L | 0.05 | 0.05 |
| Copper | mg/L | 0.4 | 0.2 |
| Iron | mg/L | 5 | 5 |
| Lead | mg/L | 0.1 | 0.1 |
| Manganese | mg/L | 0.2 | 0.2 |
| Nickel | mg/L | 0.2 | 0.2 |
| Zinc | mg/L | 4 | 2 |
| Lithium | mg/L | 2.5 | 2.5 |

The process of heavy metal mineralization was investigated in the present disclosure. This was accomplished by using two different implementation strategies: the first involved allowing $CO_2$ from the atmosphere to seep into the wastewater, and the second involved bubbling $CO_2$ through the wastewater at low pressure. In both scenarios, the fluids are exposed to $CO_2$ both with and without an additive (EDTA at different concentrations) to guarantee a decrease in the content of the heavy metals. The fluids being exposed to $CO_2$ in the absence of any additives is the base case discussed in the present disclosure. This simulates the aeration chamber as well, which exposes the wastewater to outside air. In the first phase of the study, the wastewater and produced water (BM-WWTP, LGW, ABQQ, ANDR, and SDGM) referred to as F1-5, respectively were allowed to stand undisturbed in both instances of absorption of $CO_2$ from the atmosphere and bubbling of $CO_2$ through the fluids. This is to examine the base case for comparison with the effect of additives. The rationale behind the approach adopted in the present disclosure is the improved kinetics of mineralization which has been demonstrated in a separate study that ensures mineralization within a day. Thus, minimizes the amount of time it takes to achieve the production of stable colloids which can easily be separated.

To ascertain the reduction in heavy metal concentration in the fluids, the ionic composition is analyzed using IC and ICP-MS instruments. This gives account of the cations and heavy metals in the different fluids; thus, the ionic composition of the fluids is discussed in the following sections.

More so, the effect of time is also accounted for to determine the best time required for the mineralization or reduction in heavy metal concentration to be achieved. It is evident from Table 5's IC values for both the $CO_2$ bubbling through the fluids and the absorption from the atmosphere that Fluids 1 and 2 have low salinity levels while Fluids 3 through 5 have high salinity levels and high amounts of Na, Ca, Mg, and K. There was no discernible drop in the concentration of the cations (Na, K, Mg, and Ca), according to Table 5, which shows the base case as a function of time. Furthermore, when the solution is exposed to the atmosphere and water vaporizes out of it, there may occasionally be a little rise in the cation concentration. This was also the case when $CO_2$ was bubbled through the samples throughout the experimental period. Thus, absorption or bubbling of $CO_2$ through the solution has no significant effect on the reduction of ion concentration. However, it would modify the fluid's pH.

TABLE 5

IC results from cases of $CO_2$ absorption and bubbling of $CO_2$ through the solution.

| | | Composition (ppm) | | | | | | | |
|---|---|---|---|---|---|---|---|---|---|
| | Time | Surface $CO_2$ Absorption | | | | $CO_2$ Bubbling Through the Solution | | | |
| Fluids | (hrs.) | Na | K | Mg | Ca | Na | K | Mg | Ca |
| F1 | 24 | 72 | 16 | 19 | 57 | 69 | 16 | 17 | 66 |
| | 48 | 76 | 16 | 19 | 65 | 70 | 16 | 17 | 67 |
| | 72 | 86 | 22 | 18 | 82 | 99 | 22 | 17 | 86 |
| | 96 | 87 | 18 | 19 | 77 | 76 | 15 | 18 | 65 |
| F2 | 24 | 90 | 3 | 28 | 47 | 86 | 3 | 27 | 46 |
| | 48 | 93 | 4 | 28 | 48 | 86 | 3 | 28 | 45 |
| | 72 | 99 | 5 | 24 | 64 | 92 | 6 | 21 | 66 |
| | 96 | 104 | 4 | 33 | 55 | 91 | 3 | 27 | 49 |
| F3 | 24 | 20472 | 819 | 1412 | 7879 | 19922 | 837 | 1289 | 7447 |
| | 48 | 22438 | 992 | 1431 | 8700 | 19812 | 898 | 1284 | 7471 |
| | 72 | 20554 | 795 | 2755 | 7709 | 18088 | 619 | 2980 | 6871 |
| | 96 | 22251 | 995 | 1484 | 8354 | 19605 | 832 | 1288 | 7170 |
| F4 | 24 | 18663 | 767 | 1093 | 5856 | 16906 | 691 | 981 | 5245 |
| | 48 | 20285 | 939 | 1189 | 6324 | 17773 | 703 | 1054 | 5959 |
| | 72 | 16550 | 584 | 1069 | 6221 | 16962 | 634 | 1109 | 6480 |
| | 96 | 18792 | 838 | 1113 | 5886 | 18678 | 784 | 1083 | 5652 |
| F5 | 24 | 16722 | 797 | 1229 | 7167 | 16174 | 779 | 1172 | 6845 |
| | 48 | 18469 | 941 | 1342 | 7840 | 16192 | 786 | 1263 | 7049 |
| | 72 | 18036 | 760 | 1431 | 7870 | 16290 | 655 | 1263 | 6911 |
| | 96 | 17760 | 919 | 1300 | 7437 | 15740 | 764 | 1154 | 6636 |

In terms of the heavy metal composition of the fluids exposed to $CO_2$ absorption from the atmosphere and that bubbled with $CO_2$, Tables 6 and 7 depict the results. In the case where the wastewater was exposed to $CO_2$ from the atmosphere (Table 6), results of fluid 1 show that the concentration of Fe, Mn, Ni, Zn, Sr, Cd, Ba and Pb does not decrease due to exposure to the atmosphere. However, the concentration of Cr and Cu were observed to decrease. Like the case of fluid 1, all heavy metals in fluid 2 showed no signs of decreasing with time due to exposure to the atmosphere except for Cu and Pb. More so, the decrease observed is within the resolution limits of the equipment. Thus, it can be inferred that the exposure of both fluids 1 and 2 to $CO_2$ from the atmosphere had no effect of the heavy metal concentration. In the case of high salinity fluids such as fluids 3-5, no decrease in the concentration of the heavy metals was observed due to their exposure to atmospheric $CO_2$. In the case where $CO_2$ was bubbled into the fluids (Table 7), no observable reduction in the heavy metal concentrations was observed. However, the pH of the solution is affected by the dissolution of $CO_2$ in the fluids. Additionally, from the results of the base case, no precipitates were observed as well as any significant reduction in the heavy metal concentrations. Thus, the exposure of wastewater to $CO_2$ by bubbling $CO_2$ through the fluids or absorption from the atmosphere does not affect the heavy metal concentration in the fluids. Thus, the use of additives such as EDTA is a necessity to reduce the heavy metal concentration.

Figure 2A:
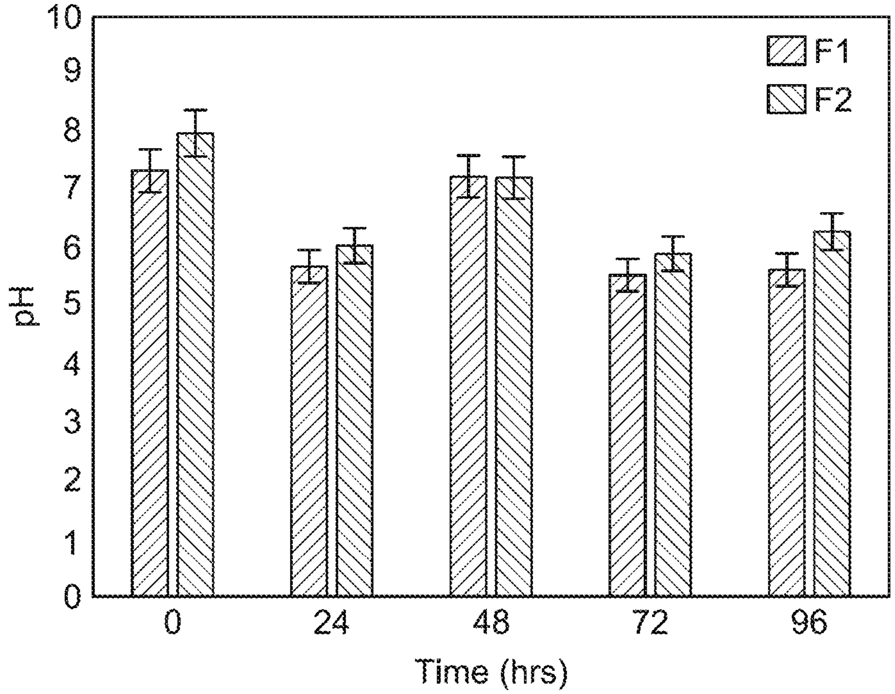
FIG. 2A depicts pH of fluids (F1 and F2 collected from Bani-Malik wastewater treatment plant (BM-WWTP) and local groundwater (LGW), respectively), exposed to atmospheric $CO_2$, according to certain embodiments.
Figure 2B:
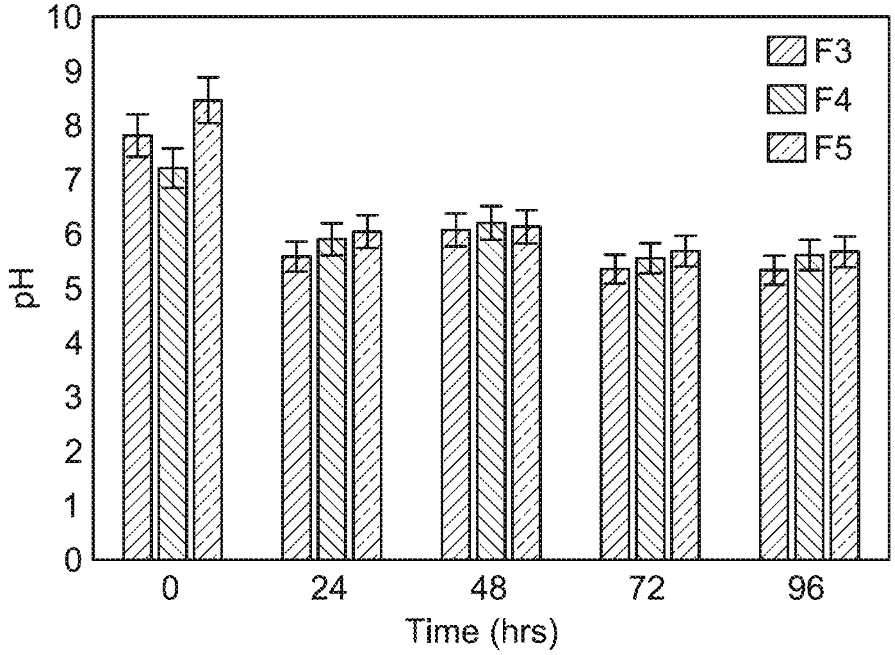
FIG. 2B depicts pH of fluids (F3, F4, and F5 collected from wells in the Gawar fields of Abqaiq (ABQQ), Aindar (ANDR), and Shedgum (SDGM), respectively,) exposed to atmospheric $CO_2$, according to certain embodiments.
Figure 2C:
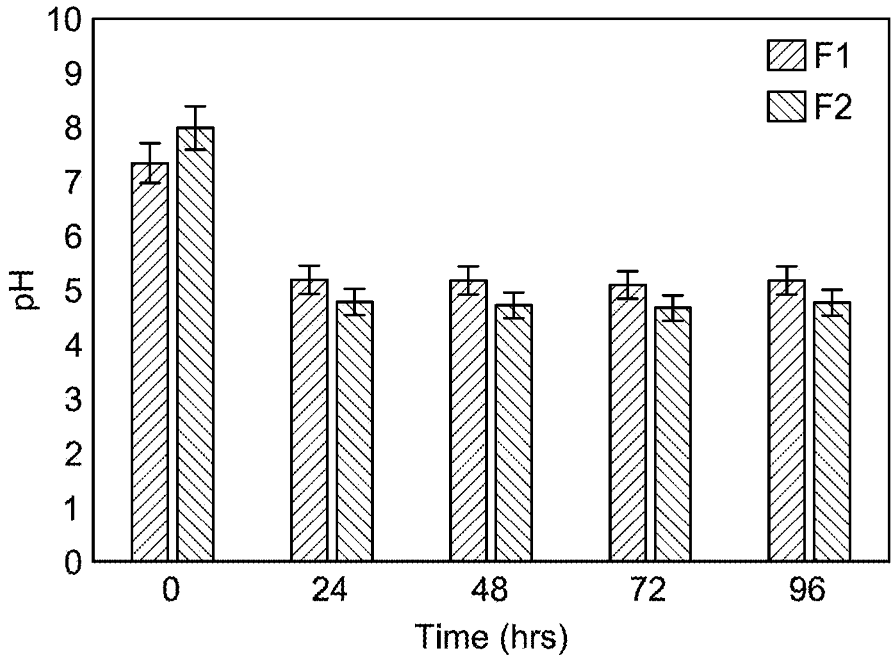
FIG. 2C depicts pH of fluids F1 and F2 (BM-WWTP, LGW) bubbled with $CO_2$, according to certain embodiments.
Figure 2D:
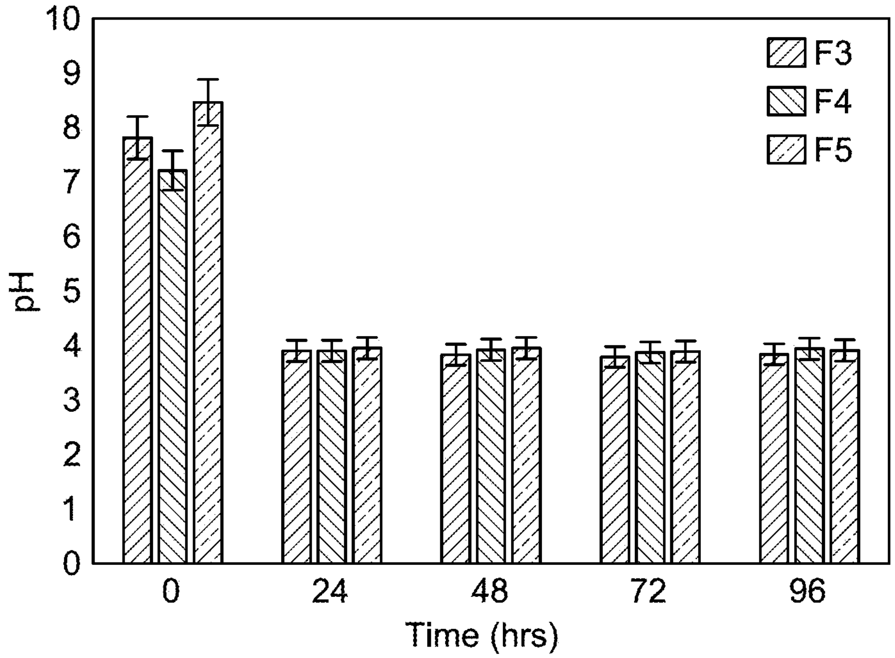
FIG. 2D depicts pH of fluids F3, F4, and F5 (ABQQ, ANDR, and SDGM) bubbled with $CO_2$, according to certain embodiments.
Figure 3A:
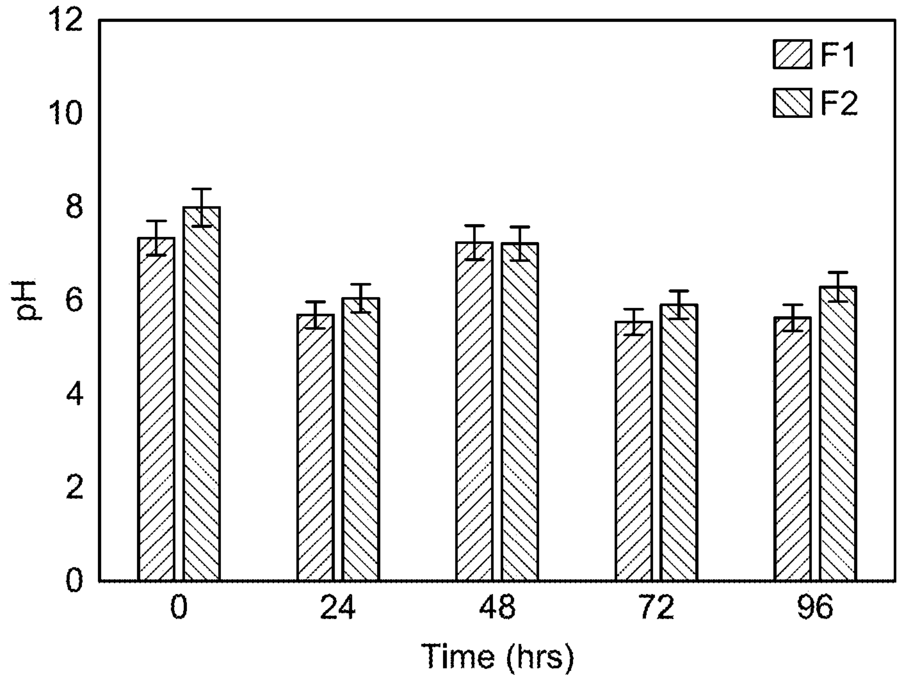
FIG. 3A depicts pH of fluids F1 and F2 with 1 wt. % ethylenediaminetetraacetic acid (EDTA) solution in the instances of atmospheric $CO_2$ absorption, according to certain embodiments.
Figure 3B:
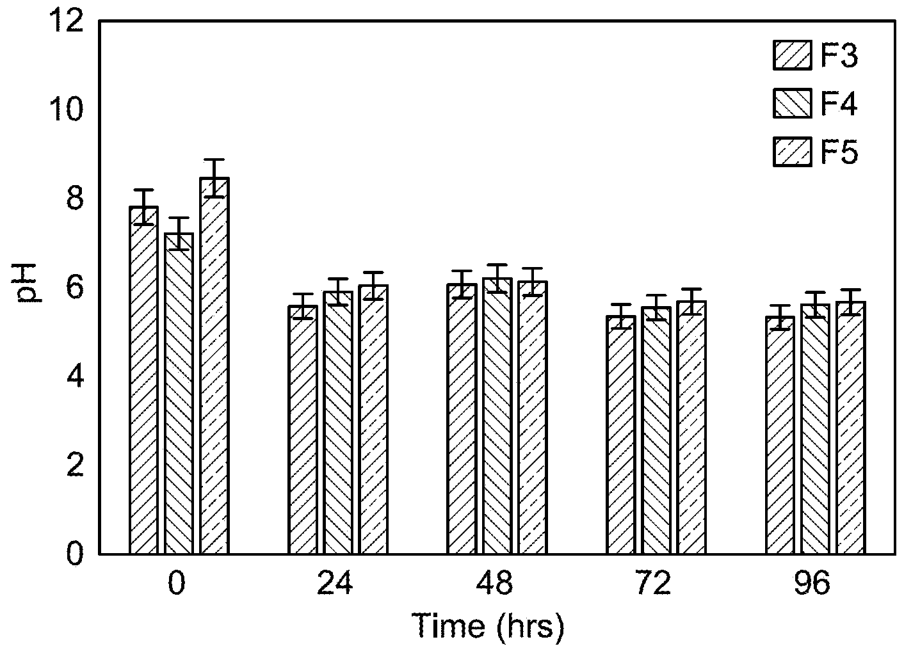
FIG. 3B depicts pH of fluids F3, F4, and F5 with 1 wt. % EDTA solution in the instances of atmospheric $CO_2$ absorption, according to certain embodiments.
Figure 3C:
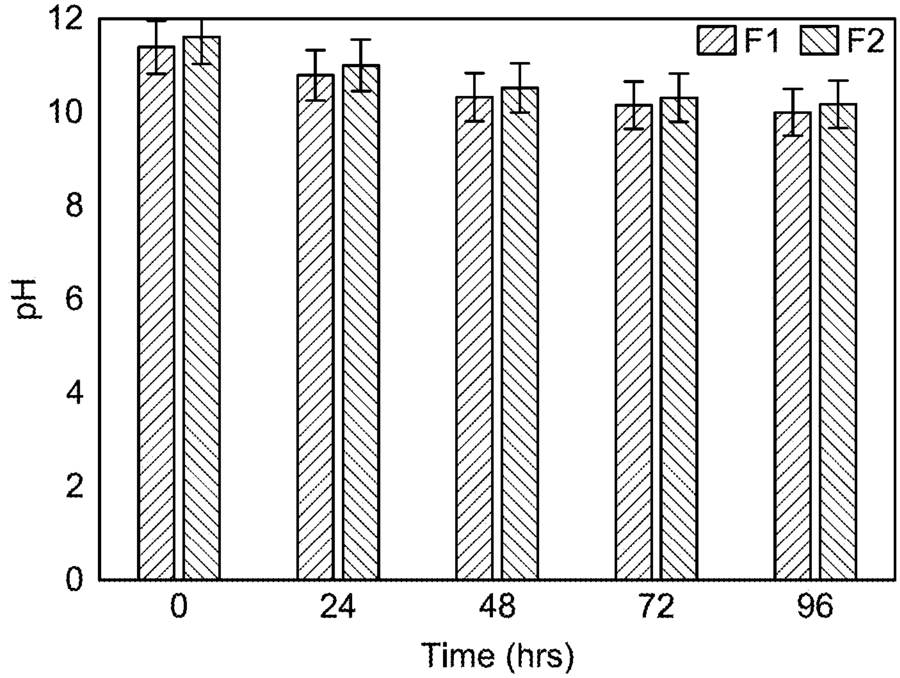
FIG. 3C depicts pH of fluids F1 and F2 with 1 wt. % EDTA solution in the instances of bubbled with $CO_2$, according to certain embodiments.
Figure 3D:
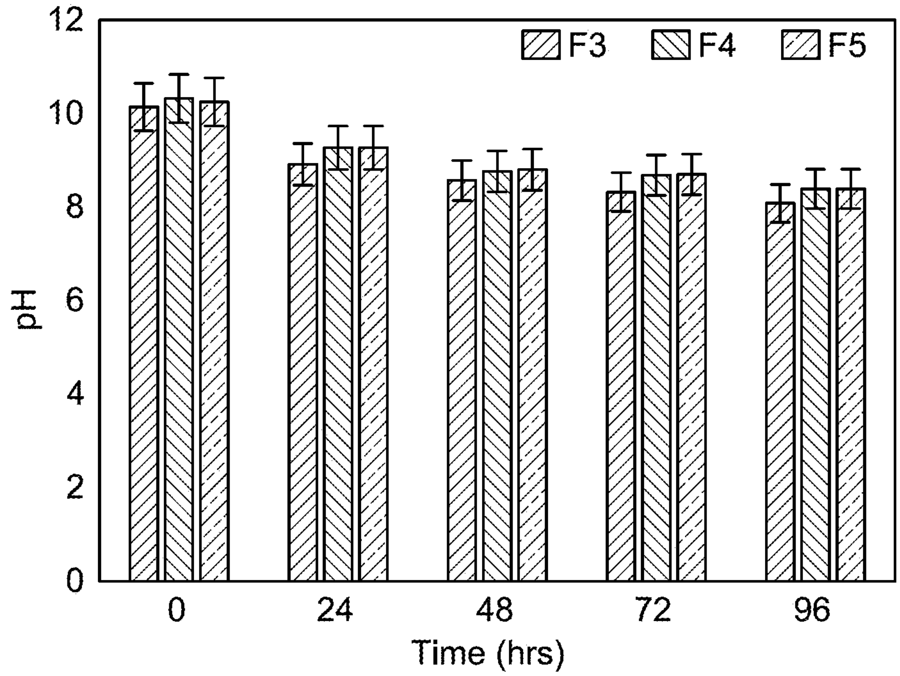
FIG. 3D depicts pH of fluids F3, F4, and F5 with 1 wt. % EDTA solution in the instances of bubbled with $CO_2$, according to certain embodiments.

Although the concentration of the heavy metals in the fluid is not affected by the exposure to $CO_2$, the pH of the fluid is. FIGS. 2A-2D show the pH of the fluids exposed to $CO_2$ in both instances of atmospheric $CO_2$ absorption (FIGS. 2A and 2B) and bubbling of $CO_2$ through the fluids (FIGS. 2C and 2D). From FIGS. 2A and 2B, the exposure of the fluids to atmospheric $CO_2$ reduces the pH of the fluids however not as much as the case of bubbling $CO_2$ through the solutions (FIGS. 2C and 2D) where the pH decreased to pH values 3-4. The decrease in the pH of the solution to this value agrees with published data [Mohammed, I., et al., Electrokinetic property and colloidal stability study of igneous rocks: Implication on carbon mineralization and underground $CO_2$ storage, Energy & Fuels, 37 (5), 2023, incorporated herein by reference in its entirety] where $CO_2$ dissolution in brine results in a decrease in pH. More so, the pH values of 3-4 implies that the dissolved $CO_2$ exist in the form of $CO_2$ gas and some percentage of $HCO_3^-$. Noteworthy from the pH trends in both scenarios of $CO_2$ exposure to the fluids is that the absorption of $CO_2$ from the atmosphere results in a gradual decrease in pH whereas the bubbling of the $CO_2$ through the solution results in a drastic decrease in pH to average values in the range of 3-4. Thus, this may impact on the removal efficiency of the heavy metals.

TABLE 6

Heavy metal composition of fluids exposed to $CO_2$ absorption from the atmosphere.

| | Time | Composition (ppm) | | | | | | | | | |
|---|---|---|---|---|---|---|---|---|---|---|---|
| Fluid | (hrs.) | Fe | Cr | Mr | Ni | Zn | Sr | Cd | Cu | Ba | Pb |
| F1 | 24 | 3.9019 | 0.4763 | 0.2064 | 0.5607 | 4.4310 | 0.0113 | 0.9320 | 1.9597 | 0.0053 | 0.0527 |
| | 48 | 2.5053 | 0.0540 | 0.2555 | 0.6020 | 4.7353 | 0.0144 | 1.0149 | 0.9262 | 0.0054 | 0.0055 |
| | 72 | 3.3855 | 0.2614 | 0.2751 | 0.6578 | 5.1523 | 0.0145 | 1.0617 | 1.0754 | 0.0063 | 0.0063 |
| | 96 | 3.2672 | 0.0686 | 0.2878 | 0.6507 | 5.2217 | 0.0130 | 1.0407 | 1.0936 | 0.0077 | 0.0288 |
| F2 | 24 | 1.6906 | 0.7747 | 0.1471 | 0.0060 | 0.0000 | 0.0050 | 0.0024 | 0.2609 | 0.0004 | 0.1343 |
| | 48 | 1.9321 | 0.1953 | 0.1430 | 0.0062 | 0.0116 | 0.0055 | 0.0028 | 0.0499 | 0.0014 | 0.0217 |
| | 72 | 1.9271 | 0.1761 | 0.1447 | 0.0067 | 0.0000 | 0.0686 | 0.0038 | 0.0501 | 0.0225 | 0.0229 |
| | 96 | 2.0231 | 0.1159 | 0.1453 | 0.0078 | 0.0000 | 0.0183 | 0.0038 | 0.0152 | 0.0035 | 0.0049 |

TABLE 6-continued

| Heavy metal composition of fluids exposed to $CO_2$ absorption from the atmosphere. | | | | | | | | | | | |
|---|---|---|---|---|---|---|---|---|---|---|---|
| | Time | Composition (ppm) | | | | | | | | | |
| Fluid | (hrs.) | Fe | Cr | Mr | Ni | Zn | Sr | Cd | Cu | Ba | Pb |
| F3 | 24 | 243.2937 | 2.8390 | 0.1480 | 0.8677 | 0.0000 | 3.7346 | 0.0156 | 1.3717 | 3.6479 | 0.0000 |
| | 48 | 249.6918 | 2.9408 | 0.1558 | 0.8590 | 0.2634 | 4.0173 | 0.0168 | 1.5367 | 4.0408 | 0.0000 |
| | 72 | 264.5953 | 3.0860 | 0.1643 | 0.9108 | 0.0000 | 4.5102 | 0.0167 | 1.6000 | 4.5373 | 0.0000 |
| | 96 | 262.0101 | 3.3122 | 0.1615 | 0.9172 | 0.0000 | 4.0702 | 0.0212 | 1.6478 | 4.3382 | 0.0000 |
| F4 | 24 | 151.5665 | 2.2127 | 0.1872 | 0.5394 | 0.0000 | 2.2733 | 0.0092 | 1.0199 | 0.1278 | 0.0000 |
| | 48 | 181.5206 | 2.4584 | 0.2078 | 0.6580 | 0.0000 | 2.7318 | 0.0101 | 1.2977 | 0.1701 | 0.0000 |
| | 72 | 187.1582 | 2.5840 | 0.2172 | 1.5182 | 0.0000 | 3.0492 | 0.0151 | 1.3123 | 0.1946 | 0.0001 |
| | 96 | 168.4792 | 2.3475 | 0.1871 | 0.5675 | 0.0000 | 2.4330 | 0.0133 | 1.1997 | 0.1579 | 0.0000 |
| F5 | 24 | 218.5173 | 2.3779 | 0.0639 | 0.7431 | 0.0000 | 3.1665 | 0.0102 | 1.2012 | 6.6540 | 0.0000 |
| | 48 | 219.8067 | 2.3891 | 0.0635 | 0.7659 | 0.0000 | 3.1939 | 0.0090 | 1.2260 | 6.7511 | 0.0000 |
| | 72 | 251.9871 | 3.1996 | 0.7571 | 19.3485 | 3.7854 | 4.0762 | 0.1126 | 3.1667 | 7.7991 | 2.1354 |
| | 96 | 240.1346 | 2.8488 | 0.0702 | 0.8156 | 0.0000 | 3.4025 | 0.0098 | 1.3833 | 7.5165 | 0.0000 |

In the base case, it is observed that the exposure of the fluids to $CO_2$ regardless of what strategy was employed did not affect the heavy metal concentration. Thus, necessitating the addition of additives which will aid the removal of the heavy metals. The additive utilized in the present disclosure is the EDTA solution, however, any other molecule that behaves as a chelating agent could be utilized but must be validated before its application. The mechanism employed herein is the removal of heavy metals through their immobilization and precipitation. This involves the heavy metals being fixed into solid compounds such as carbonates precipitated from the reaction. These solids can then thereafter be separated using solid-liquid separation techniques which include centrifugation or sedimentation. To evaluate the effect of additives, 1 weight percent (wt. %) EDTA solution was added to the fluids (50 mL of fluids and 25 mL of 1 wt. % EDTA). The fluids are then allowed to go through the described process of absorption of $CO_2$ from the atmosphere and the bubbling process. As in the base case, the pH and ionic composition of the fluids were monitored for a period of 96 hours and instances that produced precipitates were identified.

The results of the effect of the addition of 1 wt. % EDTA solution to the fluids are shown in Table 8. The rationale behind the use of EDTA to enforce mineralization is based on the EDTA's ability to dehydrate the cations thus improving the kinetics of carbonate formation. This is because the ions exist in the fluids in their hydrated form. Therefore, if they could be dehydrated, the ion interaction with the carbonate ions would be improved. In this instance, calcite, aragonite, dolomite and other carbonates could be formed, with some heavy metals infused in their structure. In the cases of treating the fluids with 1 wt. % EDTA solution, the change in the ionic composition of the fluids is shown in Table 8. Table 8 shows the percentage change in the ions compared to the based case where EDTA solution was not added (Table 5). In the case of fluid 1, in the instances where $CO_2$ was absorbed and bubbled through the solution, the concentration of $Na^+$ increased. The percentage increase was observed at 24-48 hours of exposure, however, at 72 hours, although the percentage increase is positive, the values are lower than in other instances. Thus, this could be the desired time required for the formation of solids such as halite by the $Na^+$. In the case of $K^+$, the highest decrease in concentration

TABLE 7

| Heavy metal composition of fluids bubbled with $CO_2$. | | | | | | | | | | | |
|---|---|---|---|---|---|---|---|---|---|---|---|
| | Time | Composition (ppm) | | | | | | | | | |
| Fluid | (hrs.) | Fe | Cr | Mn | Ni | Zn | Sr | Cd | Cu | Ba | Pb |
| F1 | 24 | 4.1624 | 0.5634 | 0.2495 | 0.5735 | 4.6074 | 0.0106 | 0.9120 | 2.5396 | 0.0049 | 0.0675 |
| | 48 | 3.7025 | 0.5011 | 0.2415 | 0.5404 | 4.3832 | 0.0102 | 0.8678 | 2.4429 | 0.0070 | 0.0748 |
| | 72 | 3.6767 | 0.4844 | 0.2387 | 0.5537 | 4.4110 | 0.0204 | 0.8717 | 2.4648 | 0.0115 | 0.0754 |
| | 96 | 3.8432 | 0.6816 | 0.2564 | 0.5950 | 4.7115 | 0.0101 | 0.8939 | 2.6090 | 0.0143 | 0.0788 |
| F2 | 24 | 1.9552 | 0.8330 | 0.1659 | 0.0057 | 0.0216 | 0.0041 | 0.0022 | 0.3249 | 0.0004 | 0.1605 |
| | 48 | 2.1274 | 0.8949 | 0.1907 | 0.0071 | 0.0199 | 0.0615 | 0.0032 | 0.3709 | 0.0039 | 0.1742 |
| | 72 | 1.8236 | 0.8281 | 0.1840 | 0.0075 | 0.0181 | 0.0057 | 0.0027 | 0.3564 | 0.0054 | 0.1688 |
| | 96 | 2.0855 | 0.8535 | 0.1865 | 0.0145 | 0.0019 | 0.2134 | 0.0035 | 0.3758 | 0.0234 | 0.1633 |
| F3 | 24 | 227.4725 | 2.6100 | 0.1649 | 0.7886 | 0.0000 | 3.6021 | 0.0158 | 1.5905 | 3.7514 | 0.0633 |
| | 48 | 232.0048 | 2.6238 | 0.1642 | 0.8246 | 0.0000 | 5.2925 | 0.0133 | 1.7239 | 3.7871 | 0.0688 |
| | 72 | 217.8835 | 2.4639 | 0.1593 | 0.7576 | 0.0000 | 3.5209 | 0.0145 | 1.5346 | 3.6874 | 0.0671 |
| | 96 | 286.9903 | 3.5380 | 0.2039 | 1.0015 | 0.0000 | 7.9867 | 0.0144 | 2.0843 | 4.9924 | 0.0902 |
| F4 | 24 | 171.4867 | 2.2723 | 0.2184 | 0.5721 | 0.0000 | 2.4958 | 0.0138 | 1.1295 | 0.1551 | 0.0000 |
| | 48 | 177.5057 | 2.3776 | 0.2332 | 0.5697 | 0.0056 | 2.6201 | 0.0130 | 1.2204 | 0.1825 | 0.0044 |
| | 72 | 171.8357 | 2.3889 | 0.2201 | 0.5571 | 0.0647 | 2.4773 | 0.0161 | 1.1656 | 0.1671 | 0.0097 |
| | 96 | 181.4742 | 2.5591 | 0.2345 | 1.2359 | 0.0000 | 2.7591 | 0.0174 | 1.2951 | 0.3534 | 0.0217 |
| F5 | 24 | 197.8677 | 2.0939 | 0.0645 | 0.6886 | 0.0000 | 2.9152 | 0.0069 | 1.2662 | 6.4626 | 0.0000 |
| | 48 | 223.1640 | 2.3943 | 0.0715 | 0.7906 | 0.0103 | 3.1388 | 0.0091 | 1.5409 | 7.1233 | 0.0055 |
| | 72 | 222.4160 | 2.5221 | 0.1072 | 0.7725 | 0.0000 | 3.2127 | 0.0077 | 1.5034 | 6.8974 | 0.0055 |
| | 96 | 242.2028 | 2.6734 | 0.0772 | 0.7982 | 0.0000 | 3.5582 | 0.0135 | 1.6389 | 7.4991 | 0.0054 |

in both instances of atmospheric $CO_2$ absorption and bubbling was recorded to be 79% in both cases at 72 hours. This could imply that for monovalent ions, 72 hours of exposure is required to achieve a significant reduction in their concentration.

In cases of divalent cations such as $Mg^{2+}$ and $Ca^{2+}$, the highest reduction in concentration in the instance of exposure to atmospheric $CO_2$ was 34 and 25% respectively at 24 hours of treatment time. Whereas when the $CO_2$ was bubbled through the solution, the highest percentage reduction was 23 and 30% at 48 hours and 24 hours respectively for $Mg^{2+}$ and $Ca^{2+}$. The increase in the percentage concentration of the divalent cations as the exposure time increases above 48 hours is due to the vaporization of the fluid with time. This was ascertained by exposing similar fluids to the experimental condition and over the 48 hours of treatment, 44 mL of water was vaporized. Thus, the increase in percentage at times above 48 hours was due to fluid vaporization.

In the case of Fluid 2, a similar trend in the change of $Na^+$ concentration is observed however, the magnitude is slightly less compared to Fluid 1. The maximum percentage reduction in the $K^+$, $Mg^{2+}$ and $Ca^{2+}$ concentration was observed to be 100, 27 and 45% respectively in the instance of atmospheric $CO_2$ absorption. This does imply that by adding 1 wt. % EDTA solution to the wastewater and exposing the solution to the atmosphere, the concentration of these ions can be reduced by almost half and in the instance of $K^+$, completely. On the other hand, in the instance of bubbling $CO_2$ through the solution, the highest percentage reduction was 79, 23 and 30% respectively for $K^+$, $Mg^{2+}$ and $Ca^{2+}$. From the instances of Fluid 1 and 2, it can be observed that the percentage reduction in $Ca^{2+}$ in both instances of atmospheric $CO_2$ absorption and bubbling of $CO_2$ through the solution is higher than that of $Mg^{2+}$. This could imply that the kinetics of $Ca^{2+}$ mineralization may be higher than that of $Mg^{2+}$. This could also be attributed to their hydration stability and the fact that the kinetics of mineralization may be more controlled by the mass of the ions rather than their charge.

In the high salinity fluids (Fluid 3-5), a reduction in the $Na^+$ concentration is observed. This implies that the formation of halite is possible in these fluids, thus, higher concentrations than in Fluids 1 and 2 were required. The highest percentage decrease in $Na^+$ concentration in fluid 3-5 in the case of atmospheric $CO_2$ absorption, was recorded to be 29, 37 and 35% respectively. This also implies that this approach could be used to produce low-salinity water with approximately 30% less $Na^+$ for reuse in processes. In instances of $CO_2$ bubbling through the solutions, the percentage decrease in $Na^+$ concentration was 28, 31, and 31% respectively. Thus, regardless of the approach implemented, the percentage reduction in $Na^+$ remains the same. In the case of $K^+$, the percentage decrease in concentration in both instances of atmospheric $CO_2$ absorption and bubbling was recorded to be 53, 41, 41% and 58, 48, and 34% for fluids 3-5 respectively. Thus, in higher salinity fluids, almost half the concentration of $K^+$ can be removed with the implementation of EDTA treatment and exposure to $CO_2$.

In the cases of divalent cations ($Mg^{2+}$ and $Ca^{2+}$), 97 and 96% reduction in $Mg^{2+}$ and $Ca^{2+}$ were observed by the exposure of Fluid 3 to atmospheric $CO_2$ in the presence of EDTA. In instance of bubbling $CO_2$ through fluid 3, 85, and 83% reduction in $Mg^{2+}$ and $Ca^{2+}$ concentrations were observed. Thus, in these conditions, the mineralization of the divalent cations is prevalent. Similar observations are made in the case of Fluid 4 and 5, however, of lower percentage reduction of around 40% in both cations. These percentage reductions also imply that mineralization of heavy metals may be more prevalent in these high salinity fluids as the heavy metals could be infused into their structure.

TABLE 8

Effect of 1 wt. % EDTA on the concentration of $Na^+$, $K^+$, $Mg^{2+}$, and $Ca^{2+}$ in treated fluids.

| | | % Change | | | | | | | |
|---|---|---|---|---|---|---|---|---|---|
| | Time | $CO_2$ Absorption from Atmosphere | | | | Bubbling of $CO_2$ | | | |
| Fluids | (hrs.) | Na | K | Mg | Ca | Na | K | Mg | Ca |
| F1 | 24 | 1317 | −30 | −34 | −25 | 1233 | −31 | −10 | −30 |
| | 48 | 1581 | −10 | −5 | 2 | 1237 | −28 | −23 | −19 |
| | 72 | 569 | −79 | −37 | 235 | 682 | −79 | 64 | 21 |
| | 96 | 1952 | −15 | 78 | 70 | 2048 | −7 | 110 | 188 |
| F2 | 24 | 1005 | −12 | −26 | −39 | 1034 | −38 | −23 | −37 |
| | 48 | 988 | −37 | −27 | −38 | 1081 | −22 | −20 | −20 |
| | 72 | 761 | −100 | −13 | −45 | 889 | −88 | −16 | −50 |
| | 96 | 1760 | 34 | 19 | 5 | 1958 | 49 | 25 | 26 |
| F3 | 24 | −24 | −28 | −45 | −41 | −28 | −31 | −34 | −40 |
| | 48 | −29 | −38 | −43 | −44 | −22 | −29 | −30 | −35 |
| | 72 | 19 | −53 | −97 | −96 | 86 | 16 | −85 | −83 |
| | 96 | −12 | −31 | −43 | −50 | 26 | −58 | −93 | −95 |
| F4 | 24 | −37 | −26 | −28 | −17 | −27 | −23 | −32 | −33 |
| | 48 | −34 | −41 | −38 | −38 | −9 | −5 | −18 | −25 |
| | 72 | −18 | −34 | −38 | −44 | −21 | −37 | −43 | −43 |
| | 96 | −27 | −33 | −32 | −28 | −31 | −48 | −38 | −39 |
| F5 | 24 | −26 | −36 | −46 | −47 | −30 | −17 | −34 | −35 |
| | 48 | −35 | −41 | −30 | −35 | −31 | −34 | −41 | −38 |
| | 72 | −28 | −34 | −39 | −42 | −23 | −29 | −34 | −36 |
| | 96 | −31 | −36 | −33 | −33 | −29 | −31 | −29 | −31 |

The effect of the treatment of the fluids with 1 wt. % EDTA solution on the heavy metal composition is shown in Tables 9 and 10. The case of atmospheric $CO_2$ absorption is shown in Table 9 whereas the case of bubbling $CO_2$ is shown in Table 10. From Table 9, a significant reduction in the concentration of the heavy metals can be observed except in the case of Ba and Sr which showed an increase instead. More so, the increase in the concentration of Ba in the solution is attributed to the vaporization of water from the solution thus concentrating on the solution. On the other hand, for the heavy metals considered in Fluid 1, the highest percentage reduction was observed to be 61, 95, 44, 41, 52, 41, 88 and 99% for Fe, Cr, Mn, Ni, Zn, Cd, Cu and Pb respectively. This is significant as it could complement the existing state-of-the-art by reducing the amount of heavy metal ions in discharge fluids. In the case of Fluid 2 (Table 9), the use of EDTA (1 wt. %) was ineffective in removing Zn, Cd, and Ba ions and the increase in the concentration with time is due to vaporization as in Fluid 1. However, the observed percentage decrease in the concentration of Fe, Cr, Mn, Ni, Sr, Cu, and Pb are 49, 88, 74, 43, 72, and 96% respectively. More so, from the results in the instances of Mn, Cr, Ni, Cu, and Pb, the desired treatment time or exposure time is 24 hours. Whereas in the case of Fe and Sr, the concentration decreased further with time.

In the instance of the high salinity fluids such as fluids 3-5 (Table 9), the treatments reduced the heavy metal compositions with the highest reduction for Fluid 3 being 46, 38, 100, 46, 100, 34, 65, 52, and 30% for Fe, Cr, Mn, Ni, Zn, Sr, Cd, Cu, Ba and Pb respectively. In the case of Fluid 4, the highest percentage reduction is 38, 34, 100, 43, 40, 49, 44, and 43% for Fe, Cr, Mn, Ni, Sr, Cd, Cu, and Ba respectively. For Fluid 5, the percentage reduction in the heavy metals is observed to be 47, 44, 100, 97, 100, 45, 93, 76, 98 and 100% for Fe, Cr, Mn, Ni, Zn, Sr, Cd, Cu, Ba and Pb respectively.

In instance where $CO_2$ was bubbled through the solution, the percentage change in the heavy metal concentration using 1 wt. % EDTA solution is shown in Table 10. From the table across all fluids examined, the addition of 1 wt. % EDTA to the fluids and their subsequent exposure to $CO_2$ has significant impact on the effluent concentration of heavy metals. However, in some instances such as the case of Pb, the treatment was ineffective. In the case of Fluid 1, the highest percentage reduction of the heavy metals was 62, 93, 40, 42, 48, 35, 38, 91, 23, and 85% for Fe, Cr, Mn, Ni, Zn, Sr, Cd, Cu, Ba and Pb respectively. Compared to the instance of atmospheric $CO_2$ absorption (Table 9), the bubbling of the $CO_2$ through Fluid 1 was able to impact the Ba and Sr ions. Thus, an improvement in the removal of the heavy metals. In the case of Fluid 2, Ni, Cd, Zn and Ba ions were less affected by the treatment. However, other ions were observed to have a percentage reduction of 41, 87, 78, 10, 96, 78, and 93 for Fe, Cr, Mn, Sr, Cu, and Pb respectively. The observations from the results of Fluids 1 and 2 show that with different fluid composition, the effectiveness of treatment may vary. Thus, the question of the mechanisms responsible for such variations. In the case of the high salinity fluids (3-5), much better performance of the treatment is observed as in the case of surface $CO_2$ absorption.

TABLE 9

Effect of 1 wt. % EDTA solution on the concentration of heavy metals in the case of atmospheric $CO_2$ absorption.

| | | % Change | | | | | | | | | |
|---|---|---|---|---|---|---|---|---|---|---|---|
| Fluid | Time (hrs.) | Fe | Cr | Mn | Ni | Zn | Sr | Cd | Cu | Ba | Pb |
| F1 | 24 | −61 | −95 | −26 | −41 | −48 | 30 | −31 | −88 | 51 | −99 |
| | 48 | −34 | −42 | −35 | −41 | −48 | 27 | −42 | −74 | 931 | −80 |
| | 72 | −48 | −88 | −37 | −41 | −50 | 31 | −41 | −76 | 812 | 91 |
| | 96 | −48 | −60 | −44 | −44 | −52 | 40 | −41 | −77 | 633 | −96 |
| F2 | 24 | −41 | −88 | −74 | −43 | 100 | 14 | 56 | −72 | 40 | −96 |
| | 48 | −40 | −51 | −70 | −14 | 101 | 29 | 35 | 57 | 2100 | −72 |
| | 72 | −36 | −45 | −68 | −24 | 102 | −88 | 3 | 64 | 43 | −71 |
| | 96 | −49 | −20 | −71 | −27 | 103 | −58 | 13 | 472 | 810 | 48 |
| F3 | 24 | −46 | −38 | −100 | −46 | — | −31 | −65 | −52 | −29 | — |
| | 48 | −34 | −34 | −99 | −34 | −100 | −30 | −56 | −46 | −28 | — |
| | 72 | −32 | −33 | −99 | −34 | — | −34 | −55 | −41 | −30 | — |
| | 96 | −29 | −38 | −99 | −32 | — | −27 | −59 | −34 | −27 | — |
| F4 | 24 | −14 | −26 | −100 | −17 | — | −10 | −47 | −41 | 3429 | — |
| | 48 | −38 | −34 | −100 | −43 | — | −37 | −39 | −44 | −43 | — |
| | 72 | −36 | −34 | −99 | −74 | — | −40 | −35 | −39 | −43 | — |
| | 96 | −26 | −27 | −98 | −27 | — | −20 | −49 | −19 | −21 | — |
| F4 | 24 | −47 | −25 | −97 | −47 | — | −45 | 4 | −36 | −98 | — |
| | 48 | −30 | −27 | −99 | −34 | — | −25 | −71 | −41 | −21 | — |
| | 72 | −38 | −44 | −100 | −97 | −100 | −42 | −93 | −76 | −30 | −100 |
| | 96 | −15 | −22 | −99 | −16 | — | −11 | −37 | −18 | −8 | — |

Across the three fluids, the minimum percentage reduction in the concentration of heavy metals is roughly 30% with some ions achieving 100% removal after treatments with EDTA solution of 1 wt. %. This indicates that it is feasible to use mineralization to remove heavy metals from produced water or wastewater. This is because the new technology will lessen the need to meet environmental standards while complementing the current state-of-the-art. The results also show that high salinity increases the effectiveness of heavy metal removal; for this reason, this technology should be used before conventional water treatment procedures. Thus, lowering the workload requires meeting the dischargeable norms. Even though the results have shown how the EDTA solution affects the heavy metal removal process, further investigation is necessary to ascertain the ideal concentration to attain a notable improvement.

TABLE 10

Effect of 1 wt. % EDTA solution on the concentration of heavy metals in the case of $CO_2$ bubbling through the fluids.

| | | % Change | | | | | | | | | |
|---|---|---|---|---|---|---|---|---|---|---|---|
| Fluid | Time (hrs.) | Fe | Cr | Mn | Ni | Zn | Sr | Cd | Cu | Ba | Pb |
| F1 | 24 | −62 | −93 | −38 | −42 | −50 | −22 | −38 | −91 | −23 | −85 |
| | 48 | −50 | −89 | −36 | −37 | −46 | 24 | −35 | −90 | 75 | −84 |
| | 72 | −47 | −90 | −39 | −38 | −48 | −35 | −35 | −90 | 15 | −82 |
| | 96 | −46 | −90 | −40 | −41 | −48 | 18 | −37 | −90 | 2 | −81 |

TABLE 10-continued

Effect of 1 wt. % EDTA solution on the concentration of heavy metals in the case of $CO_2$ bubbling through the fluids.

| Fluid | Time (hrs.) | % Change | | | | | | | | | |
|---|---|---|---|---|---|---|---|---|---|---|---|
| | | Fe | Cr | Mn | Ni | Zn | Sr | Cd | Cu | Ba | Pb |
| F2 | 24 | −41 | −88 | −74 | 37 | −9 | 6 | 162 | −75 | 751 | −92 |
| | 48 | −32 | −87 | −77 | 83 | 340 | −90 | 112 | −78 | 239 | −93 |
| | 72 | −27 | −87 | −78 | 94 | 397 | 54 | 137 | −77 | 162 | −91 |
| | 96 | −33 | −88 | −77 | −10 | 4865 | −96 | 91 | −72 | −29 | −89 |
| F3 | 24 | −27 | −26 | −51 | −29 | — | −23 | −57 | −45 | −19 | −38 |
| | 48 | −27 | −21 | −49 | −29 | — | −45 | −50 | −47 | −19 | 11 |
| | 72 | −21 | −23 | −49 | −24 | — | −21 | −48 | −44 | −21 | 42 |
| | 96 | −26 | −36 | −49 | −28 | — | −56 | 0 | −37 | −24 | 99 |
| F4 | 24 | −39 | −35 | −61 | −44 | — | −35 | −62 | −38 | −37 | — |
| | 48 | −26 | −19 | −55 | −23 | −100 | −25 | −42 | −29 | −32 | — |
| | 72 | −28 | −28 | −56 | −27 | −100 | −23 | −47 | −33 | −26 | — |
| | 96 | −49 | −52 | −68 | −75 | — | −49 | −63 | −41 | −74 | — |
| F4 | 24 | −32 | −27 | −76 | −34 | — | −29 | −22 | −49 | −25 | — |
| | 48 | −33 | −21 | −79 | −35 | −100 | −27 | −69 | −53 | −26 | 454 |
| | 72 | −32 | −35 | −86 | −32 | — | −28 | −45 | −51 | −25 | 1184 |
| | 96 | −45 | −45 | −82 | −45 | — | −43 | −60 | −53 | −37 | 1131 |

The pH at which these fluids are released must also be watched, even though it is important to lower the concentration of heavy metals in the discharge fluids. The fluids had an average pH of 7.0 at first, but after the EDTA solution was added and they were exposed to $CO_2$ during the treatment period, the pH altered. FIGS. 3A-3D illustrate the pH shift in both cases of ambient $CO_2$ absorption and $CO_2$ bubbling through the fluids. According to FIGS. 3A-3D, the pH of all fluids following the experiments is around 7.0 in the case of atmospheric $CO_2$ absorption. Therefore, the pH of the waterbodies would not be impacted by the discharge of such fluids. However, the pH is alkaline while $CO_2$ is bubbling through the solution, though. This is not nearly as problematic as the acidic pH range. This is due to the possibility of aquatic life being in danger at acidic pH ranges. Furthermore, the EDTA remains fully protonated at the alkaline pH range, allowing it to be utilized again in ensuing fluid treatments.

Figure 4A:
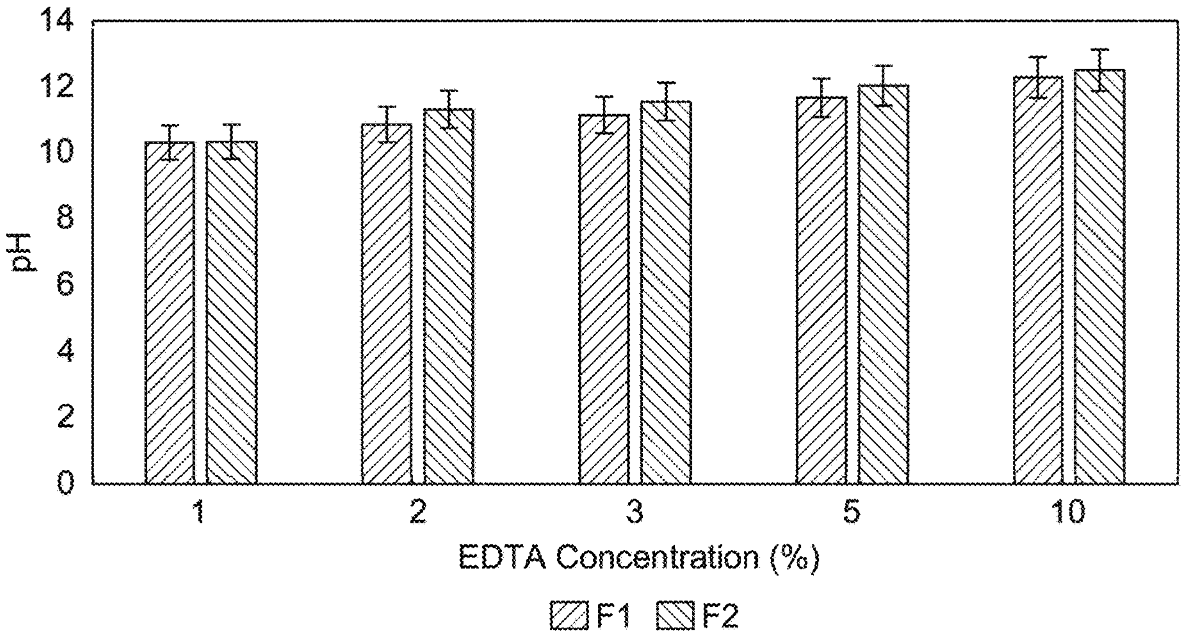
FIG. 4A depicts equilibrium pH of fluids F1 and F2 due to EDTA concentration, according to certain embodiments.
Figure 4B:
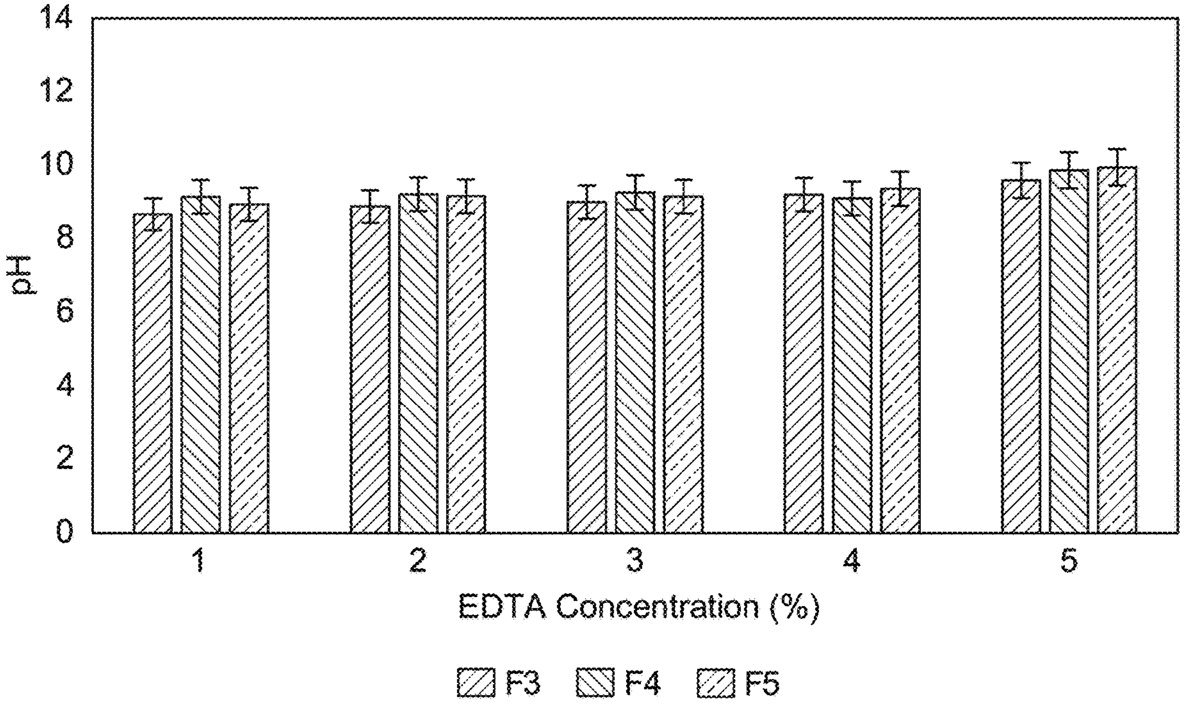
FIG. 4B depicts equilibrium pH of fluids F3, F4, and F5 due to EDTA concentration, according to certain embodiments.

Based on the results discussed thus far and the treatment of fluids with EDTA to reduce the heavy metal concentration, the effect of varying concentrations of EDTA on the treatment efficiency is assessed. More so, the case with no EDTA solution added is used as the base case against which the treatment efficiencies are compared. In the case of Fluid 1 (Table 11), the effect of EDTA on the removal of heavy metals shows that with increasing concentration of EDTA, improvement in the removal efficiency can be observed however, the desired concentration exists in which case of 2% EDTA. This is because except for the case of Ba where at 1% removal efficiency (29%) greater than at 2 wt. %, in other cases, further increase of concentration above 2 wt. % did not result in significant improvements. In the case of Fluid 2, it is observed that the increase in EDTA concentration does not positively impact the removal efficiency in some cases such as those of Ni, Zn, Sr, and Cd. Thus, the desired concentration of EDTA to be deployed in this instance is 1 wt. %. in the case of the high salinity fluids (Fluids 3-5), the desired concentration of EDTA to be used is 1 wt. % as it is at this concentration significant removal of heavy metals were achieved. Thus, based on the examination of the EDTA solution effect on the removal efficiency, the desired values are within field-deplorable concentration and could be economical to implement. This is because an enormous amount of water is treated daily, thus, care must be exercised to ensure the economic viability of the processes. More so, a look at the discharge pH of the different cases of EDTA concentrations (FIGS. 4A-4B) reveals that in the pH increases gradually in the cases of Fluid 1 and 2 with an increase in EDTA concentration. This alkaline pH could also help to keep the EDTA molecule completely deprotonated and effective throughout the treatment cycle. More so, high pH also helps to precipitate other kinds of metals. In the case of Fluids 3-5, the average pH is observed to be 8.0 which is within the typical seawater pH. Thus, direct discharge of the treated fluids into the waterbodies will not impact their pH.

The removal of heavy metal ions from wastewater and produced water demonstrated in the present disclosure is due to ion immobilization and precipitation. This implies that some of the ions are converted to carbonates whereas others are infused in the formed carbonate structure. In field-scale implementation, after the treatment process, the solid precipitates can be separated using sedimentation or centrifugation. To evaluate the effect of precipitates formation as well as their characteristics, the effect of EDTA concentration on the propensity of precipitate formation was examined. Table 12 shows the results of the collectable precipitates formed in all cases. In the case of Fluids 1 and 2, no precipitates were retrieved, however, the concentration of the heavy metal has been impacted. The precipitates formed in this case are Nano-sized and difficult to retrieve or the concentration of the cations is too small for carbonate precipitation to take place. This is because a minimum concentration of divalent cations must exist before precipitates can be formed. Furthermore, for the high salinity fluids, retrievable precipitates were observed with their respective masses shown in Table 12. In the cases of Fluids 3-5, a maximum precipitate mass of 4 g is observed from a fluid of 50 mL solution. However, at the implied desired concentration of EDTA deployable for these fluids (1 wt. %), the mass precipitated at these concentrations are 2.2, 0.5 and 0.5 g respectively for Fluids 3-5. Aside from the precipitation of heavy metals in the form of solids, their composition and characteristic morphology are another important consideration.

TABLE 11

Effect of EDTA concentration on the percentage reduction of heavy metal concentration.

| | | % Change | | | | | | | | | |
|---|---|---|---|---|---|---|---|---|---|---|---|
| Fluid | EDTA Conc. | Fe | Cr | Mn | Ni | Zn | Sr | Cd | Cu | Ba | Pb |
| F1 | 0% | 0 | 0 | 0 | 0 | 0 | 0 | 0 | 0 | 0 | 0 |
| | 1% | −65 | −94 | −13 | −34 | −41 | −6 | −30 | −84 | −29 | −91 |
| | 2% | −77 | −81 | −79 | −99 | −100 | −21 | −100 | −91 | −12 | −88 |
| | 3% | −74 | −81 | −80 | −99 | −100 | −22 | −100 | −87 | −9 | −89 |
| | 5% | −72 | −80 | −81 | −99 | −100 | 22 | −98 | −78 | 99 | −90 |
| | 10% | −70 | −81 | −80 | −99 | −100 | 85 | −100 | −55 | 234 | −97 |
| F2 | 0% | 0 | 0 | 0 | 0 | 0 | 0 | 0 | 0 | 0 | −84 |
| | 1% | −36 | −88 | −69 | −12 | 100 | 88 | 70 | −57 | 399 | −98 |
| | 2% | −17 | −98 | 10 | 5441 | 32937 | 141 | 22890 | 30 | 1298 | −98 |
| | 3% | −9 | −97 | 16 | 5614 | 32824 | 164 | 23660 | 66 | 1449 | −100 |
| | 5% | −12 | −97 | 10 | 5111 | 29785 | 236 | 21912 | 119 | 2528 | −97 |
| | 10% | 28 | −95 | 29 | 6084 | 31613 | 502 | 23983 | 367 | 5901 | −100 |
| F3 | 0% | 0 | 0 | 0 | 0 | — | 0 | 0 | 0 | 0 | — |
| | 1% | −33 | −43 | −96 | −39 | — | −17 | −68 | −4 | −12 | — |
| | 2% | −32 | −40 | −100 | −37 | — | 5 | −34 | 3 | −5 | — |
| | 3% | −34 | −20 | −99 | −41 | — | −20 | −38 | 0 | −13 | — |
| | 5% | −35 | −41 | −98 | −41 | — | −16 | −42 | 15 | −9 | — |
| | 10% | −37 | −40 | −99 | −43 | — | −21 | −47 | 39 | −13 | — |
| F4 | 0% | 0 | 0 | 0 | 0 | — | 0 | 0 | 0 | 0 | — |
| | 1% | −32 | −41 | −99 | −39 | — | −17 | −45 | 2 | 16 | — |
| | 2% | −27 | −29 | −99 | −19 | — | −10 | −4 | 18 | 135 | — |
| | 3% | −16 | −23 | −99 | −23 | — | −1 | −9 | 42 | 23 | — |
| | 5% | 45 | 25 | −96 | 39 | — | 78 | 48 | 189 | 149 | — |
| | 10% | −28 | −29 | −98 | −36 | — | −14 | −14 | 77 | 12 | — |
| F5 | 0% | 0 | 0 | 0 | 0 | — | 0 | 0 | 0 | 0 | — |
| | 1% | −33 | −31 | −98 | −36 | — | −19 | −27 | −14 | −12 | — |
| | 2% | −36 | −32 | −100 | −37 | — | −23 | −61 | −9 | −13 | — |
| | 3% | −36 | −32 | −100 | −37 | — | −23 | −57 | −1 | −13 | — |
| | 5% | −36 | −28 | −91 | −10 | — | −24 | −23 | 13 | −15 | — |
| | 10% | −37 | −35 | −97 | −36 | — | −22 | −22 | 87 | −11 | — |

TABLE 12

Effect of EDTA concentration on the formation of precipitates.

| Fluid | EDTA Concentration (%) | Precipitates Mass (g) |
|---|---|---|
| F1 | 1 | 0.0 |
| | 2 | 0.0 |
| | 3 | 0.0 |
| | 5 | 0.0 |
| | 10 | 0.0 |
| F2 | 1 | 0.0 |
| | 2 | 0.0 |
| | 3 | 0.0 |
| | 5 | 0.0 |
| | 10 | 0.0 |
| F3 | 1 | 2.2 |
| | 2 | 3.0 |
| | 3 | 1.4 |
| | 5 | 1.4 |
| | 10 | 4.2 |
| F4 | 1 | 0.5 |
| | 2 | 0.8 |
| | 3 | 1.9 |
| | 5 | 1.7 |
| | 10 | 4.1 |
| | 1 | 0.5 |
| | 2 | 1.3 |
| F5 | 3 | 1.2 |
| | 5 | 1.8 |
| | 10 | 4.6 |

Before conducting a mineralogical assessment of the retrieved solids, they were dried at 40° C. and atmospheric pressure. The mineralogy of the precipitates was then assessed using XRD and XRF instruments with the results shown in Tables 13 and 14 respectively. The mineralogical composition of the precipitates reveals that they are majorly composed of halite (NaCl), with other minerals being calcite, aragonite, brucite and quartz. The elemental analysis (Table 14) shows the presence of heavy metals in the precipitates. Accordingly, insofar as no recognizable morphology is formed, this supports the conclusion that heavy metal removal is attributable to infusion into the structure of established precipitates. However, this is further examined using SEM analysis.

TABLE 13

Mineralogical makeup of precipitates.

| | EDTA | Composition (%) | | | | |
|---|---|---|---|---|---|---|
| Fluid | Conc. | Halite | Quartz | Brucite | Calcite | Aragonite |
| F3 | 1 | 86.30 | 3.70 | 9.20 | 0.10 | 0.70 |
| | 2 | 99.60 | 0.00 | 0.00 | 0.40 | 0.00 |
| | 3 | 99.50 | 0.10 | 0.00 | 0.20 | 0.20 |
| | 5 | 93.90 | 0.70 | 4.20 | 0.30 | 0.90 |
| | 10 | 84.10 | 2.90 | 10.90 | 0.50 | 1.60 |
| F4 | 1 | 88.10 | 0.00 | 9.40 | 2.00 | 0.50 |
| | 2 | 99.70 | 0.10 | 0.00 | 0.20 | 0.10 |
| | 3 | 95.00 | 0.40 | 4.20 | 0.30 | 0.10 |
| | 5 | 94.30 | 2.60 | 2.40 | 0.20 | 0.50 |
| | 10 | 91.60 | 0.10 | 8.00 | 0.30 | 0.00 |
| F5 | 1 | 99.50 | 0.00 | 0.00 | 0.10 | 0.30 |
| | 2 | 99.60 | 0.20 | 0.00 | 0.20 | 0.00 |
| | 3 | 94.50 | 0.60 | 4.00 | 0.40 | 0.40 |
| | 5 | 89.90 | 1.70 | 7.40 | 0.20 | 0.70 |
| | 10 | 95.30 | 0.00 | 3.50 | 0.80 | 0.40 |

TABLE 4

Elemental composition of precipitates.

| Fluid | EDTA Conc. | Composition (%) Na | Mg | Al | Si | Cl | K | Ca | Cr |
|---|---|---|---|---|---|---|---|---|---|
| F3 | 1 | 7.2342 | 1.8150 | 0.1321 | 0.2302 | 67.6058 | 1.0404 | 21.7766 | 0.0156 |
| | 2 | 14.8449 | 0.8947 | 0.1249 | 0.0227 | 68.2437 | 0.3537 | 15.4203 | 0.0205 |
| | 3 | 18.6172 | 1.5937 | 0.1136 | 0.0640 | 64.3076 | 0.3621 | 14.8188 | 0.0074 |
| | 5 | 14.2762 | 4.8767 | 0.1337 | 0.1415 | 52.9956 | 2.3369 | 25.1644 | 0.0063 |
| | 10 | 18.7140 | 5.0262 | 0.1638 | 0.3073 | 37.3613 | 2.8412 | 35.4576 | 0.0647 |
| F4 | 1 | 14.3295 | 1.8324 | 0.1175 | 0.0731 | 70.3617 | 1.4195 | 11.7573 | 0.0027 |
| | 2 | 11.3844 | 5.9327 | 0.1605 | 0.3357 | 57.3900 | 0.7710 | 23.8249 | 0.0008 |
| | 3 | 25.3344 | 1.4994 | 0.1015 | 0.0548 | 66.2723 | 1.2552 | 5.3792 | 0.0324 |
| | 5 | 17.7974 | 3.4949 | 0.1395 | 0.1878 | 48.1572 | 1.7343 | 28.4127 | 0.0085 |
| | 10 | 23.6854 | 4.1985 | 0.1319 | 0.2883 | 41.8230 | 2.3508 | 27.3857 | 0.0147 |
| F5 | 1 | 2.3578 | 3.7084 | 0.1213 | 0.0681 | 67.5420 | 6.1745 | 19.9824 | 0.0025 |
| | 2 | 8.6298 | 2.5639 | 0.1203 | 0.1030 | 65.4501 | 1.6683 | 21.3984 | 0.0012 |
| | 3 | 12.4248 | 4.3006 | 0.1336 | 0.1518 | 57.8383 | 1.8717 | 23.1799 | 0.0099 |
| | 5 | 22.3787 | 3.4523 | 0.1022 | 0.0873 | 59.3018 | 1.7693 | 12.8509 | 0.0129 |
| | 10 | 24.2125 | 3.2355 | 0.1574 | 0.1055 | 48.5011 | 1.2031 | 22.4744 | 0.0123 |

Elemental composition of precipitates.

| Fluid | EDTA Conc. | Composition (%) Mn | Fe | Co | Ni | Cu | Zn | Sr |
|---|---|---|---|---|---|---|---|---|
| F3 | 1 | 0.0328 | 0.0210 | 0.0024 | 0.0078 | 0.0034 | 0.0085 | 0.0088 |
| | 2 | 0.0338 | 0.0007 | 0.0022 | 0.0064 | 0.0084 | 0.0011 | 0.0065 |
| | 3 | 0.0147 | 0.0086 | 0.0087 | 0.0152 | 0.0091 | 0.0016 | 0.0093 |
| | 5 | 0.0178 | 0.0026 | 0.0003 | 0.0141 | 0.0100 | 0.0039 | 0.0079 |
| | 10 | 0.0199 | 0.0052 | 0.0009 | 0.0097 | 0.0024 | 0.0046 | 0.0090 |
| F4 | 1 | 0.0643 | 0.0011 | 0.0005 | 0.0068 | 0.0106 | 0.0059 | 0.0056 |
| | 2 | 0.1252 | 0.0118 | 0.0106 | 0.0105 | 0.0038 | 0.0036 | 0.0059 |
| | 3 | 0.0073 | 0.0012 | 0.0095 | 0.0049 | 0.0211 | 0.0040 | 0.0041 |
| | 5 | 0.0203 | 0.0021 | 0.0044 | 0.0102 | 0.0039 | 0.0039 | 0.0076 |
| | 10 | 0.0490 | 0.0038 | 0.0049 | 0.0182 | 0.0176 | 0.0023 | 0.0069 |
| F5 | 1 | 0.0023 | 0.0025 | 0.0046 | 0.0073 | 0.0063 | 0.0004 | 0.0060 |
| | 2 | 0.0071 | 0.0054 | 0.0014 | 0.0169 | 0.0090 | 0.0027 | 0.0077 |
| | 3 | 0.0138 | 0.0025 | 0.0003 | 0.0114 | 0.0168 | 0.0052 | 0.0191 |
| | 5 | 0.0026 | 0.0025 | 0.0002 | 0.0064 | 0.0043 | 0.0030 | 0.0063 |
| | 10 | 0.0086 | 0.0122 | 0.0018 | 0.0347 | 0.0051 | 0.0035 | 0.0116 |

Figure 5A:
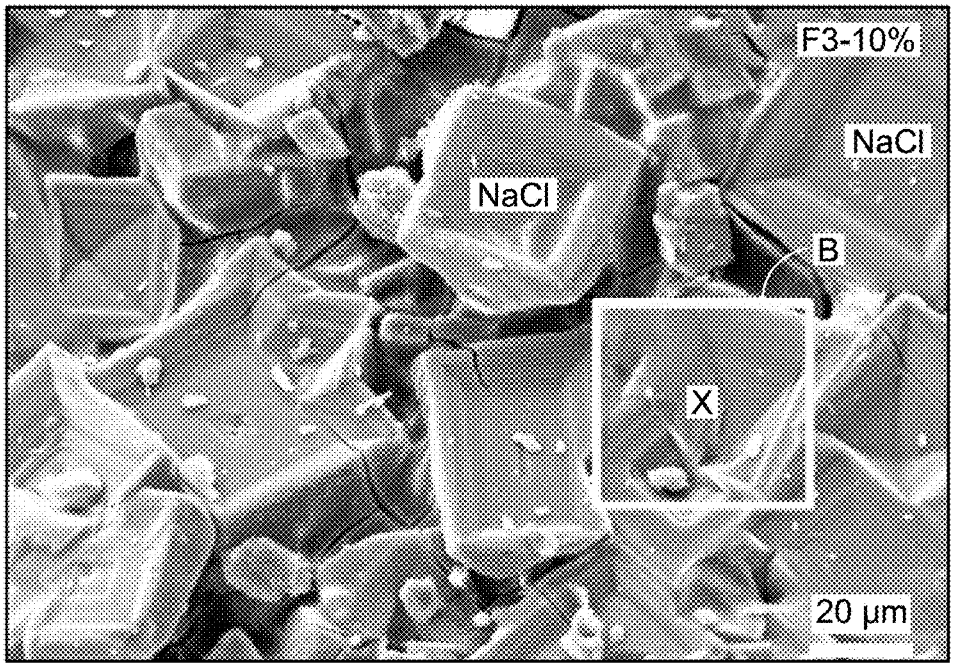
FIG. 5A depicts a scanning electron microscopy (SEM) image showing the cubic crystal structure of halite, according to certain embodiments.
Figure 5B:
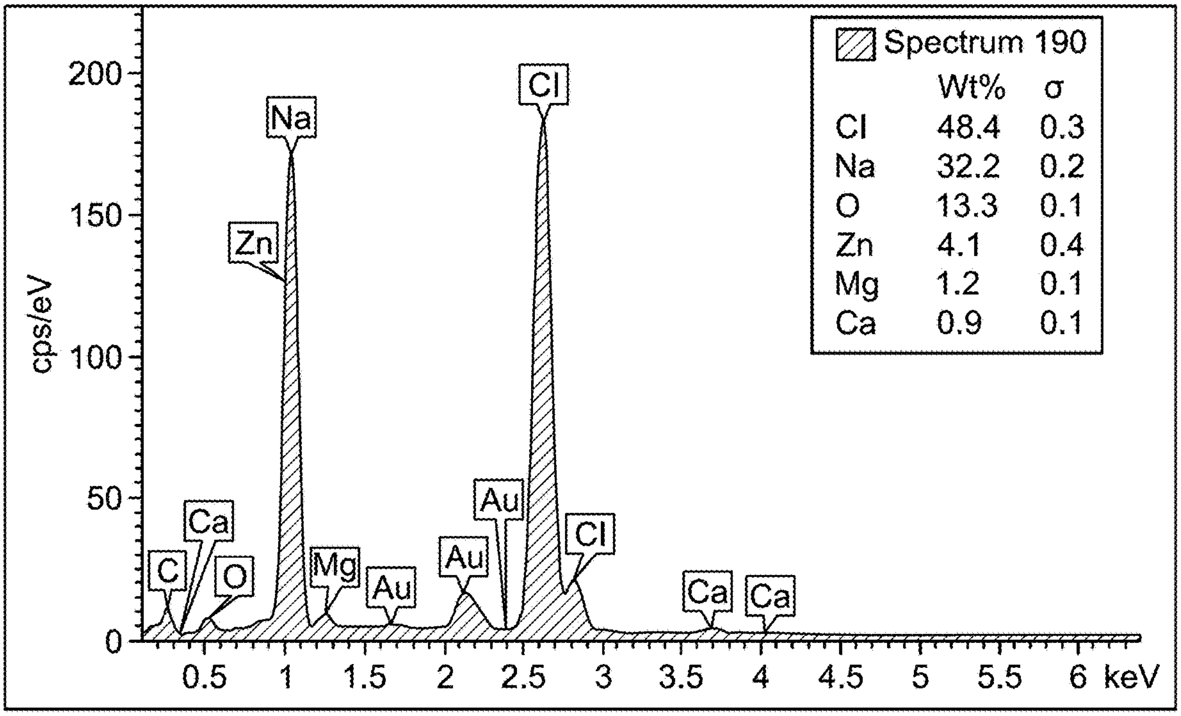
FIG. 5B depicts energy dispersive X-ray spectroscopy (EDX) spectra for the halite denoted B in FIG. 5A and its elemental composition, according to certain embodiments.
Figure 5C:
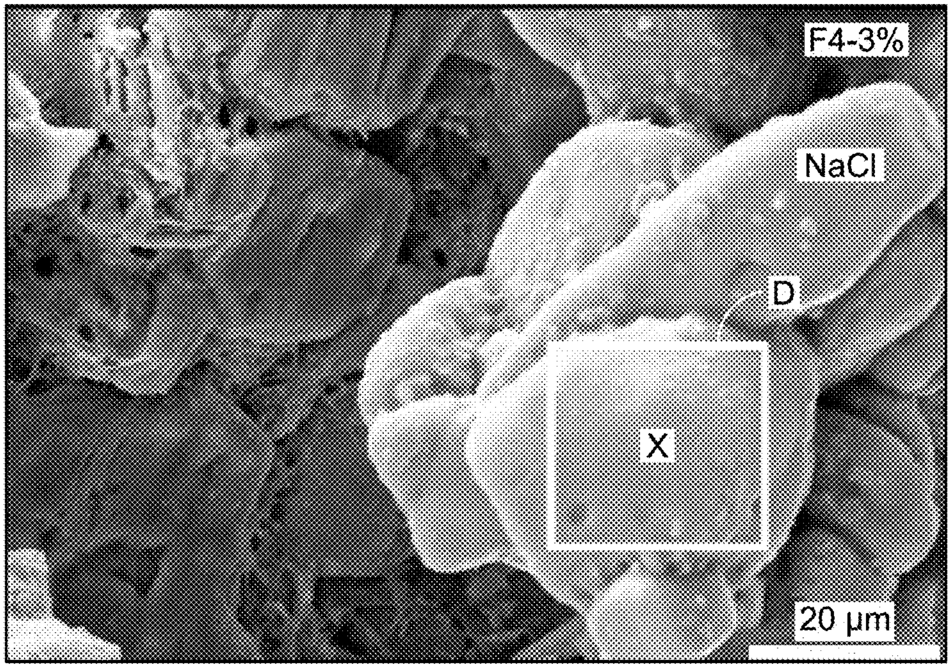
FIG. 5C depicts a SEM image showing a sub-rounded crystal structure of halite, according to certain embodiments.
Figure 5D:
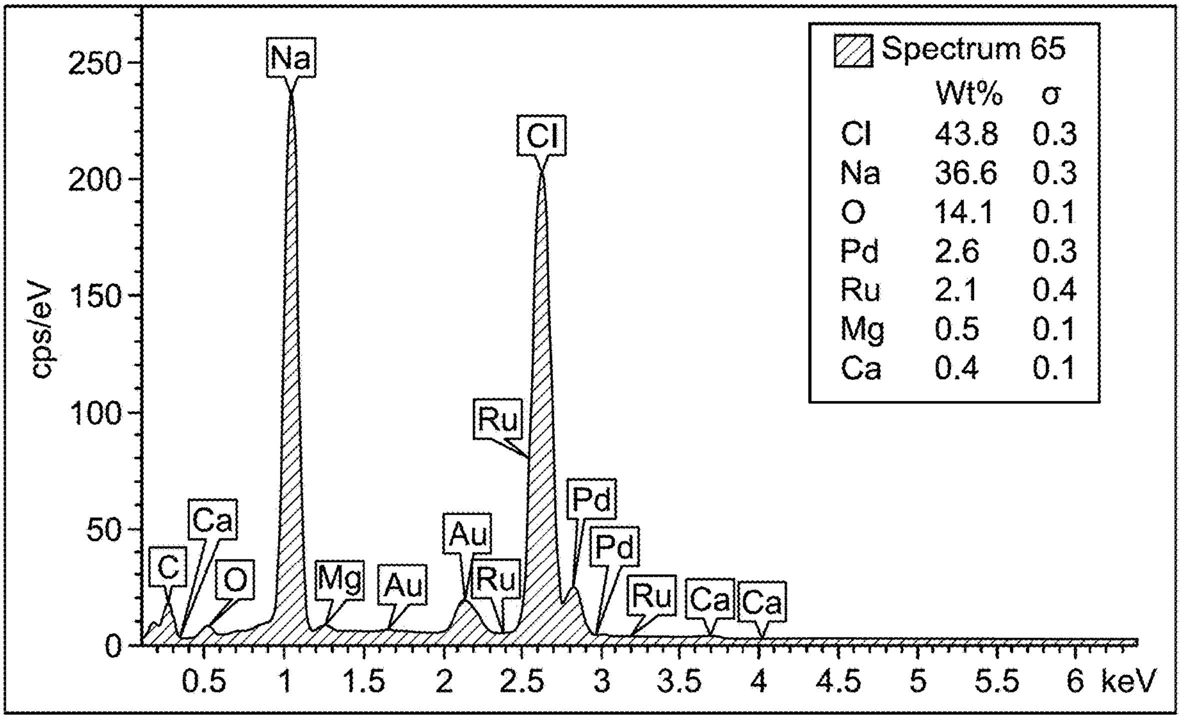
FIG. 5D depicts EDX spectra for the halite denoted D in FIG. 5C and its elemental composition, according to certain embodiments.
Figure 5E:
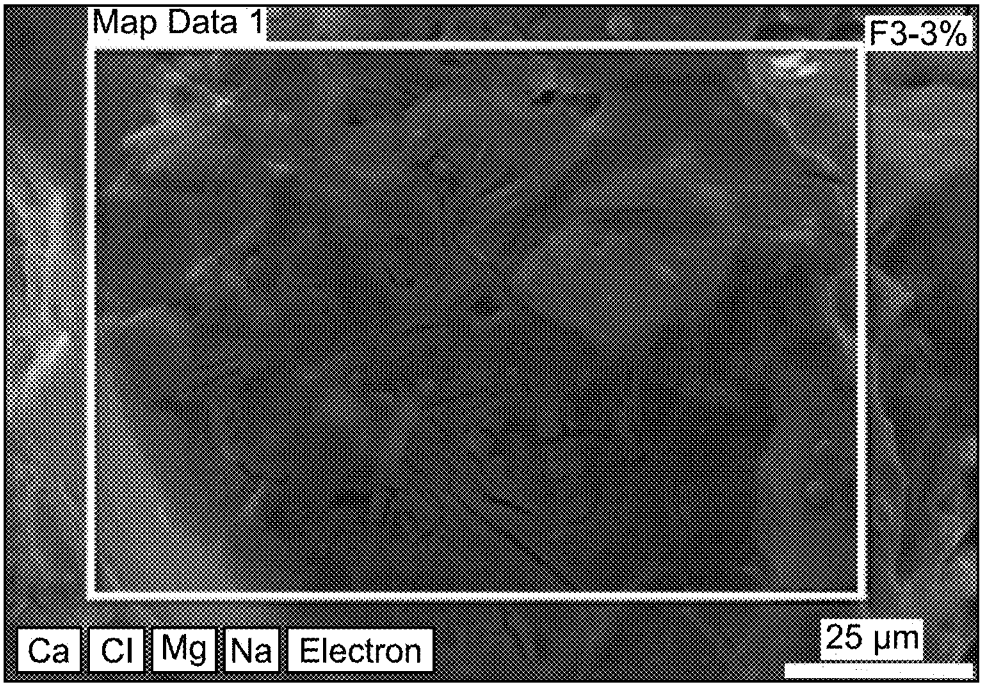
FIG. 5E depicts elemental map showing the replacement of partly dissolved halite by $CaCl_2$), according to certain embodiments.
Figure 5F:
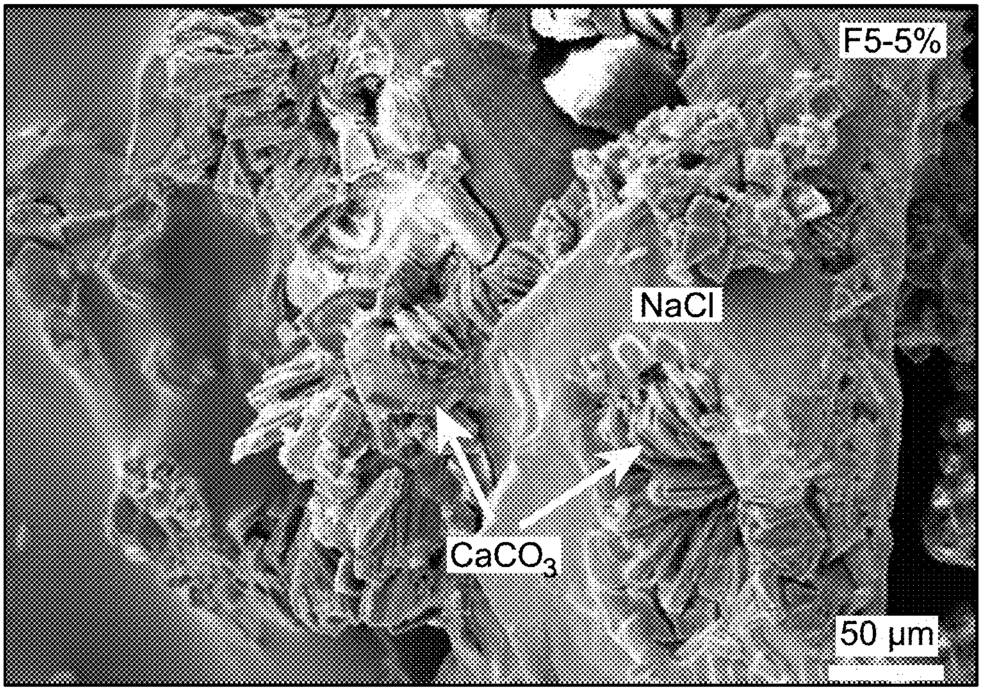
FIG. 5F depicts a SEM image showing the replacement of the partly dissolved halite by calcite, according to certain embodiments.
Figure 6A:
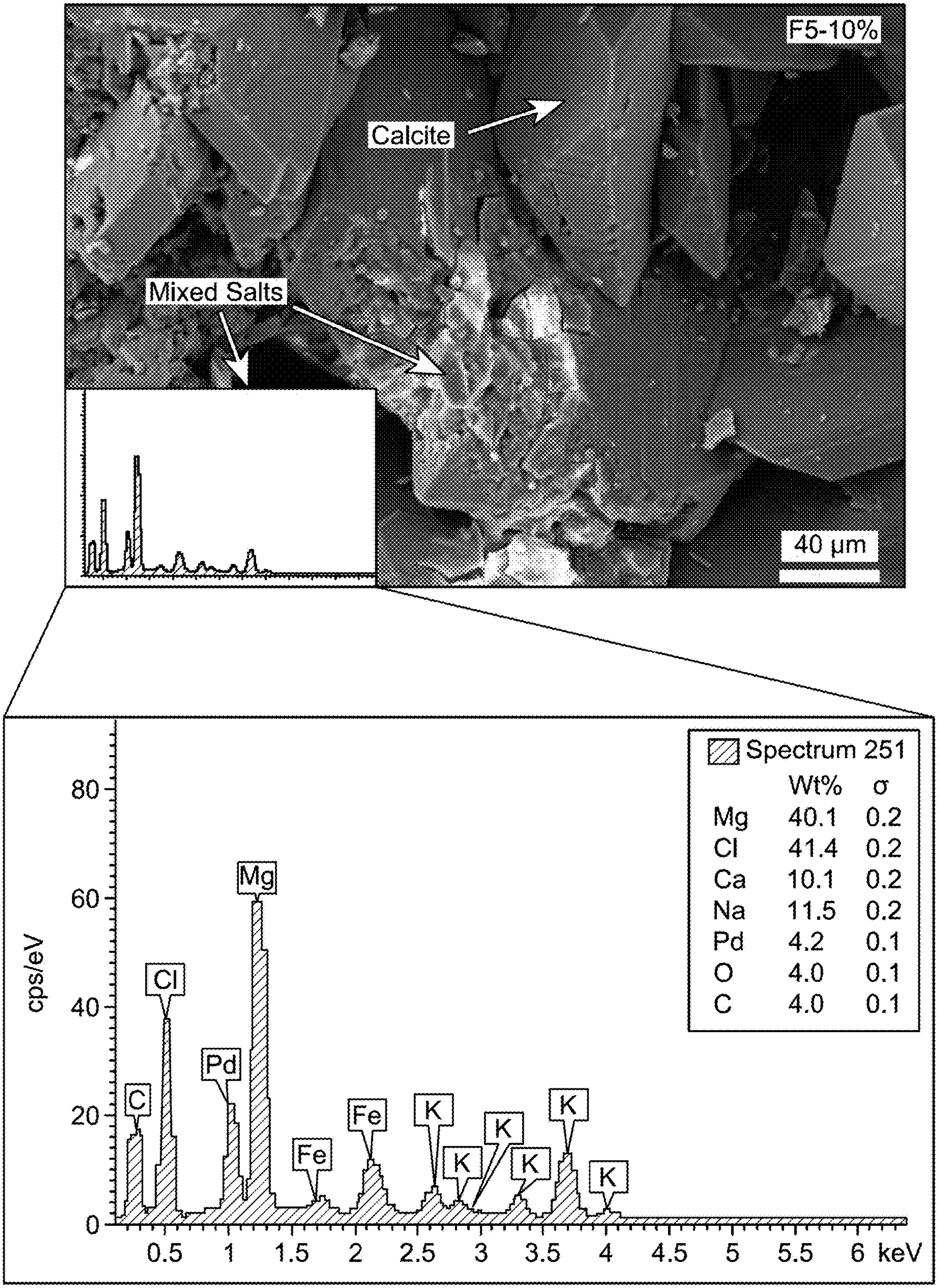
FIG. 6A depicts a SEM image showing rhombohedral calcite crystals, according to certain embodiments.
Figure 6B:
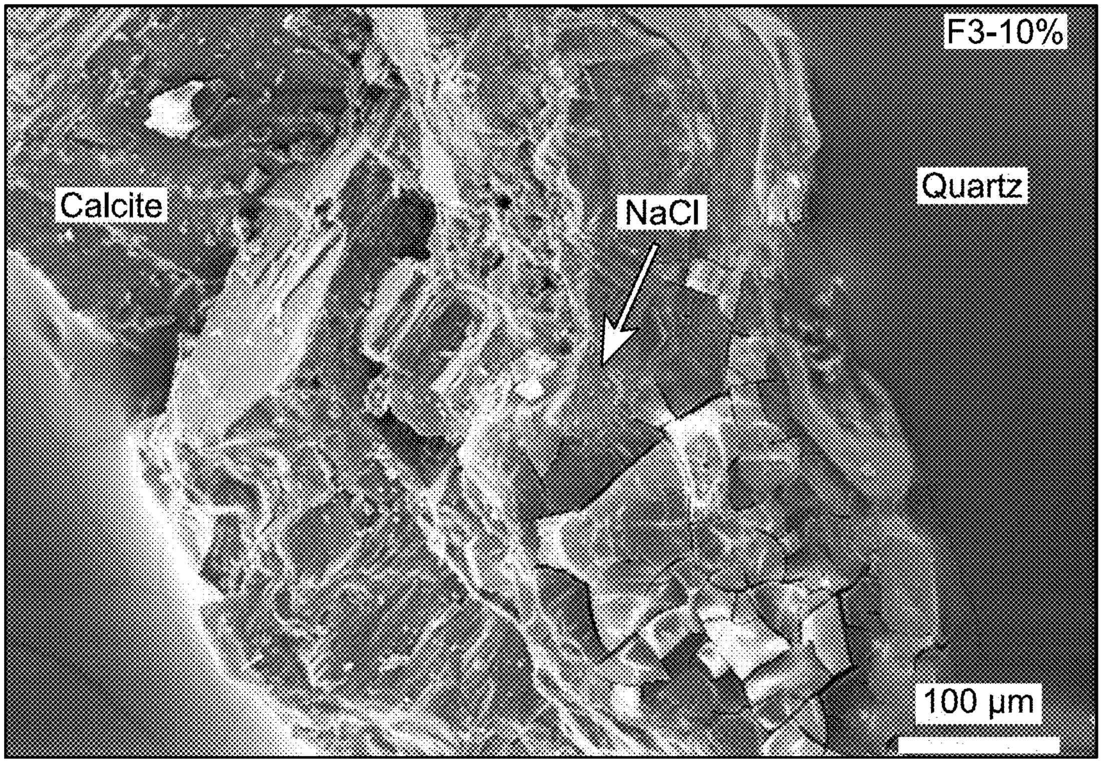
FIG. 6B depicts a SEM image showing replacement of partly dissolved calcite by halite, according to certain embodiments.
Figure 6C:
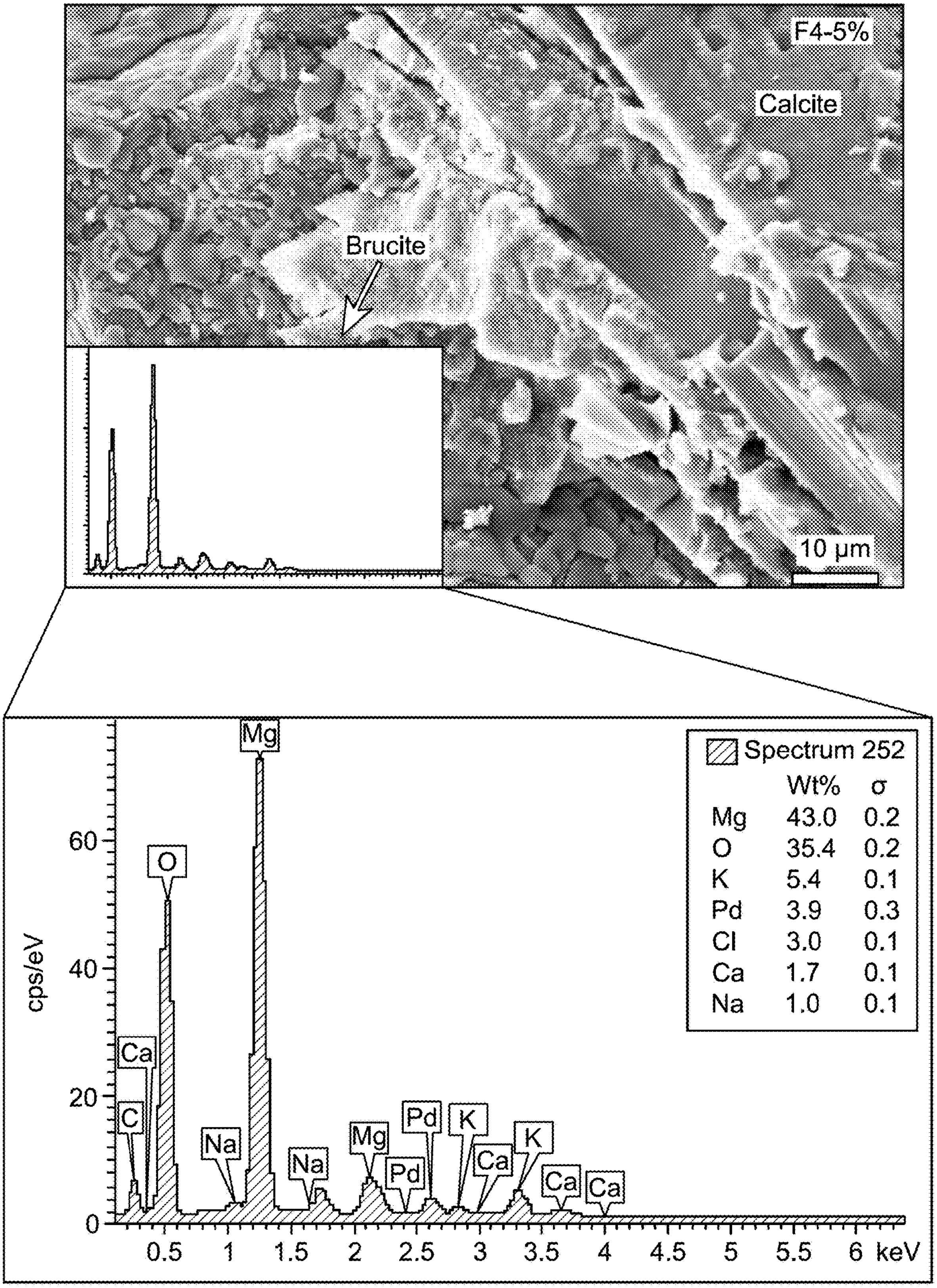
FIG. 6C depicts a SEM image showing the replacement of calcite by brucite, EDX spectra in the bottom left showing the elemental composition of the brucite, according to certain embodiments.
Figure 6D:
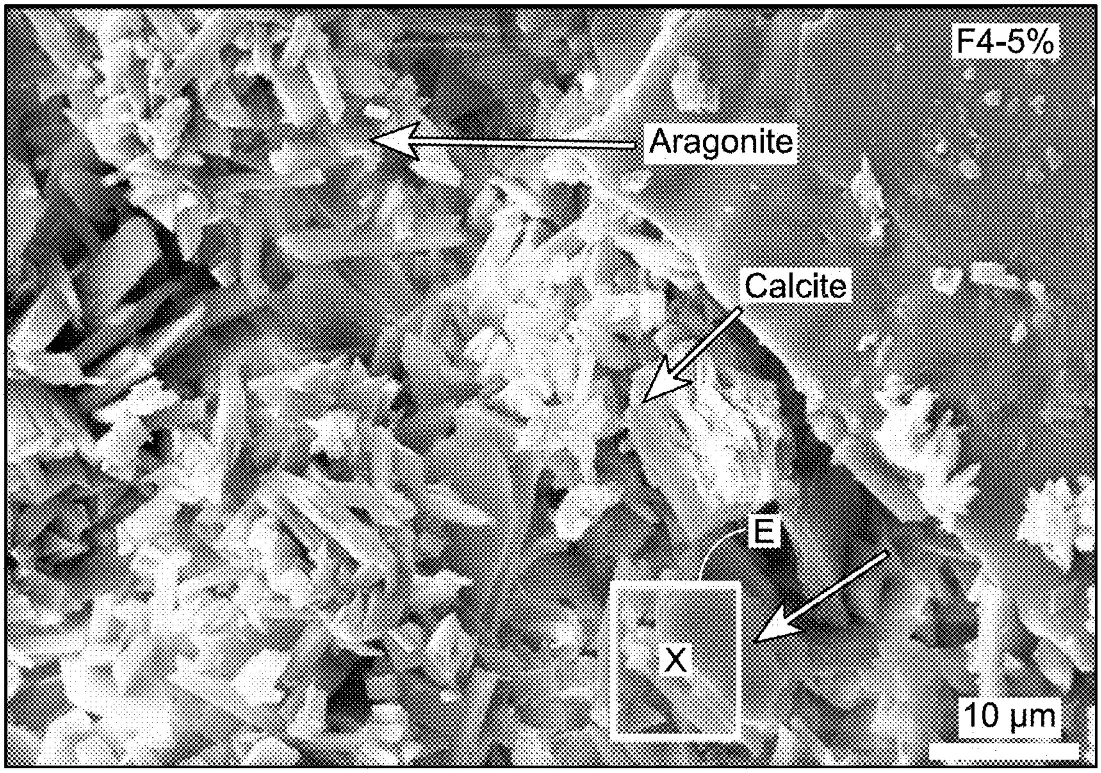
FIG. 6D depicts a SEM image showing prismatic crystals of aragonite and those of calcite, according to certain embodiments.
Figure 6E:
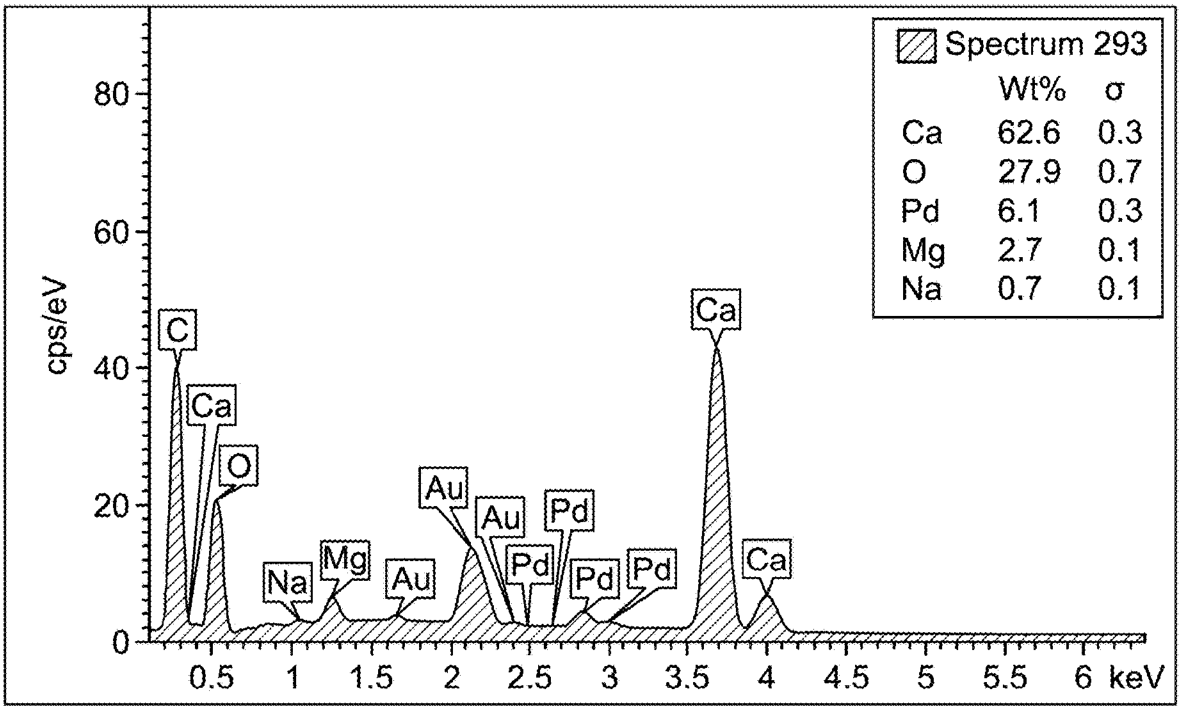
FIG. 6E depicts EDX spectra for the calcite denoted E in FIG. 6D and its elemental composition, according to certain embodiments.
Figure 6F:
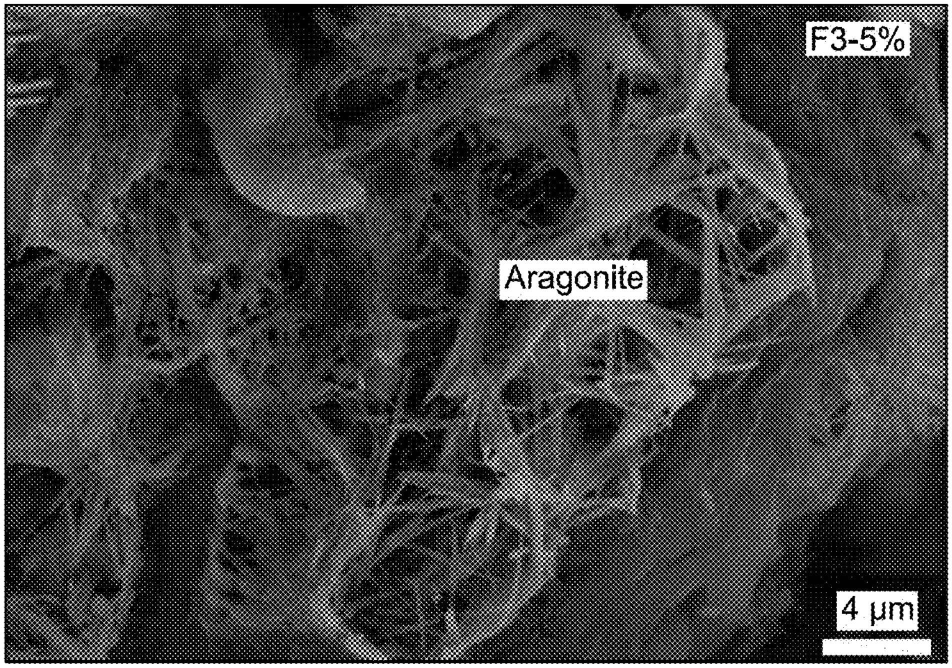
FIG. 6F depicts a SEM image showing fibrous aragonite crystals, according to certain embodiments.
Figure 7A:
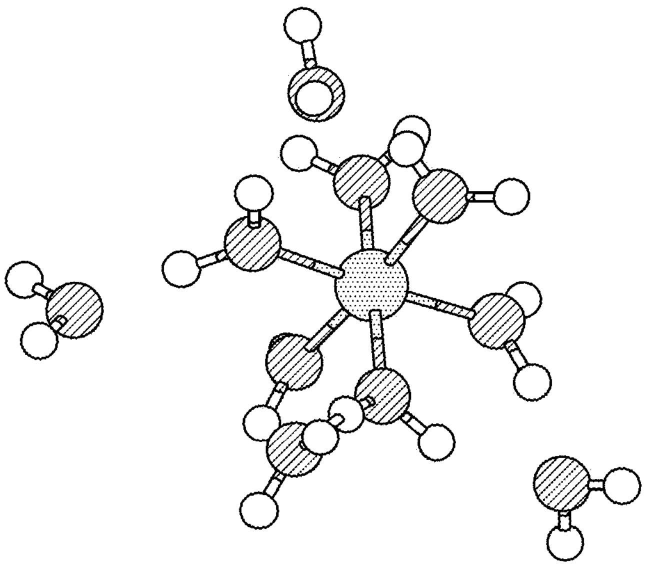
FIG. 7A depicts a schematic diagram of hydrated Al ion, according to certain embodiments.
Figure 7B:
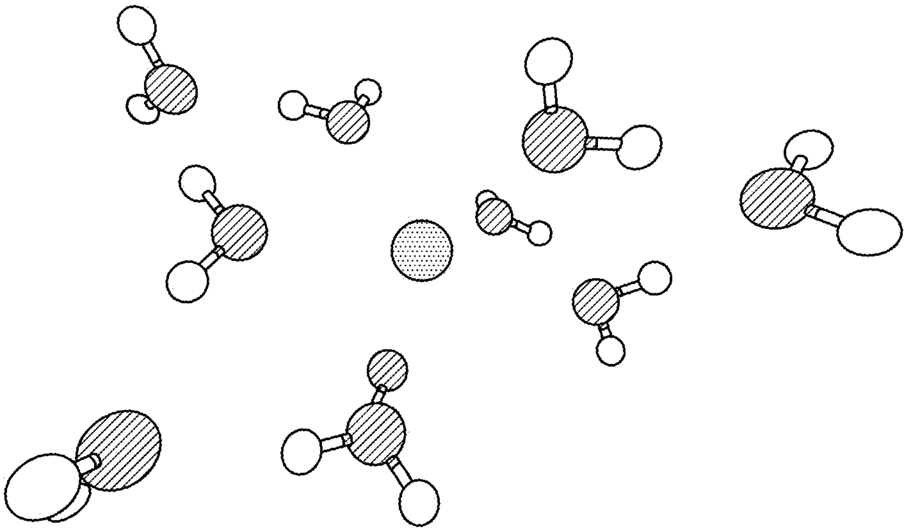
FIG. 7B depicts a schematic diagram of hydrated Ba ion, according to certain embodiments.
Figure 7C:
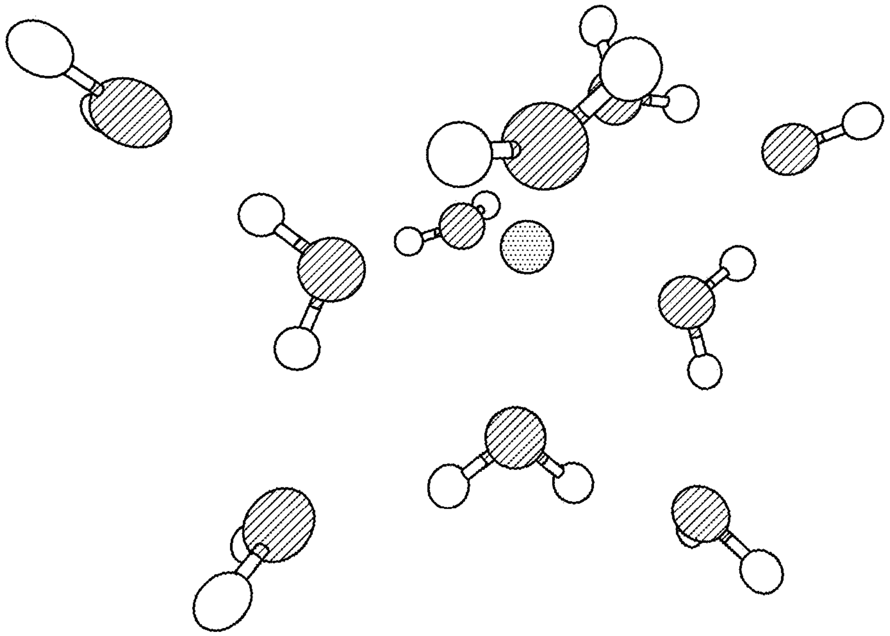
FIG. 7C depicts a schematic diagram of hydrated Ca ion, according to certain embodiments.
Figure 7D:
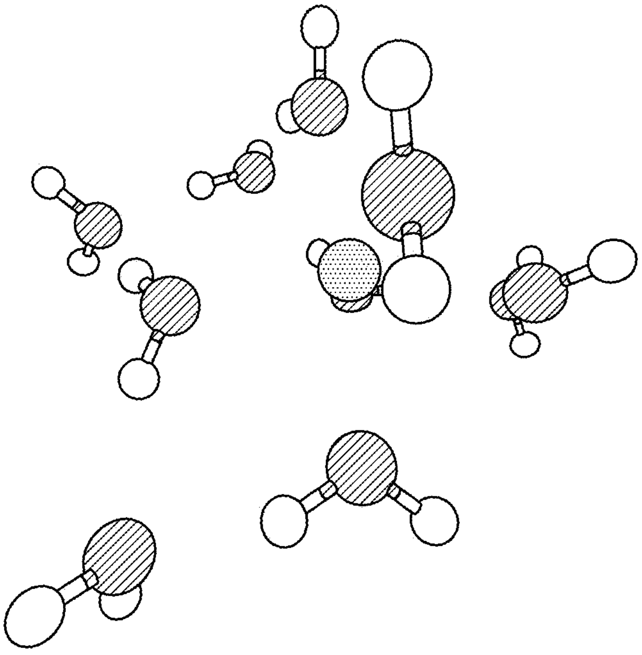
FIG. 7D depicts a schematic diagram of Cd ion, according to certain embodiments.
Figure 8:
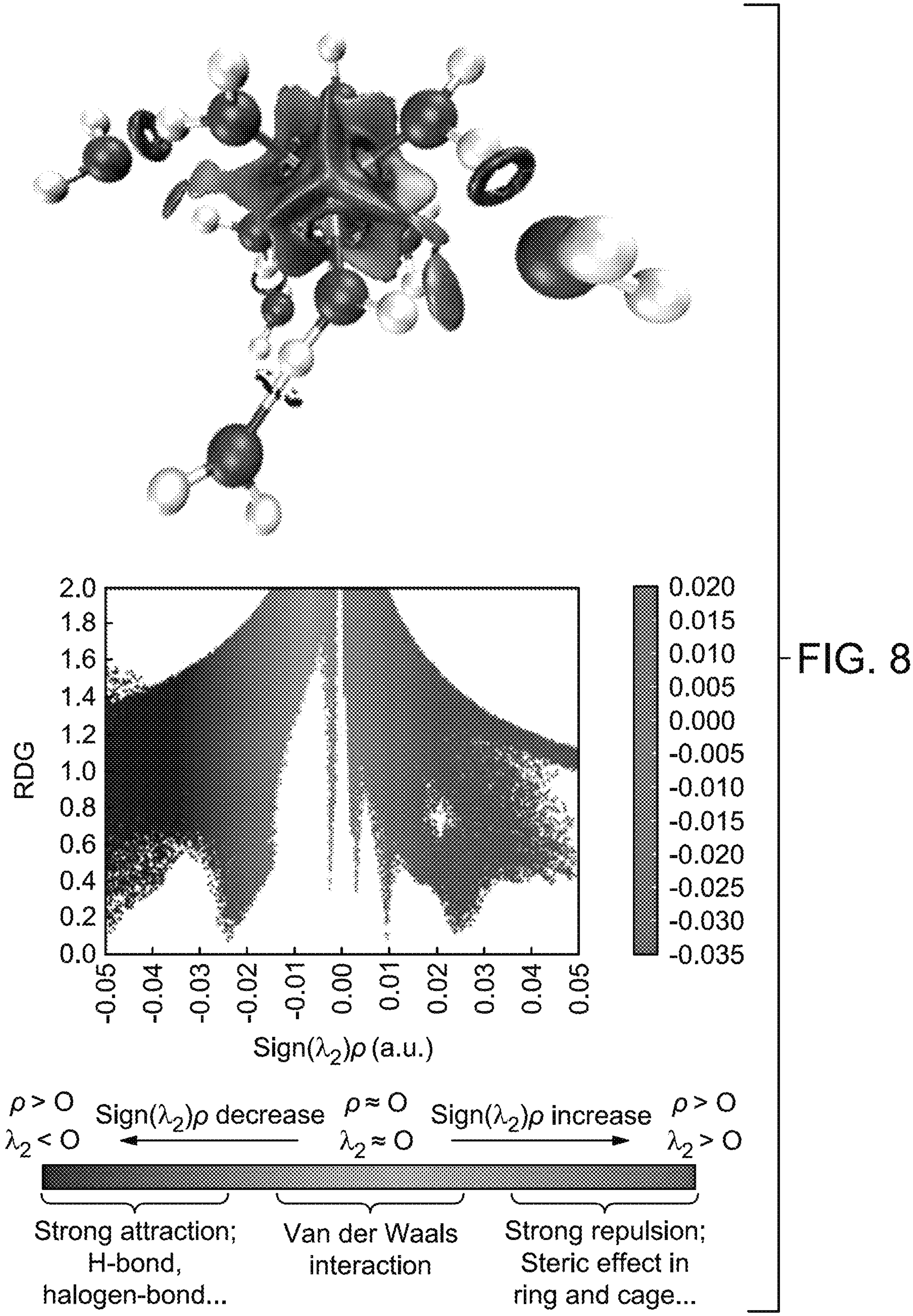
FIG. 8 depicts reduced density gradient (RDG) isosurface of hydrated $Al^{3+}$, according to certain embodiments.
Figure 9B:
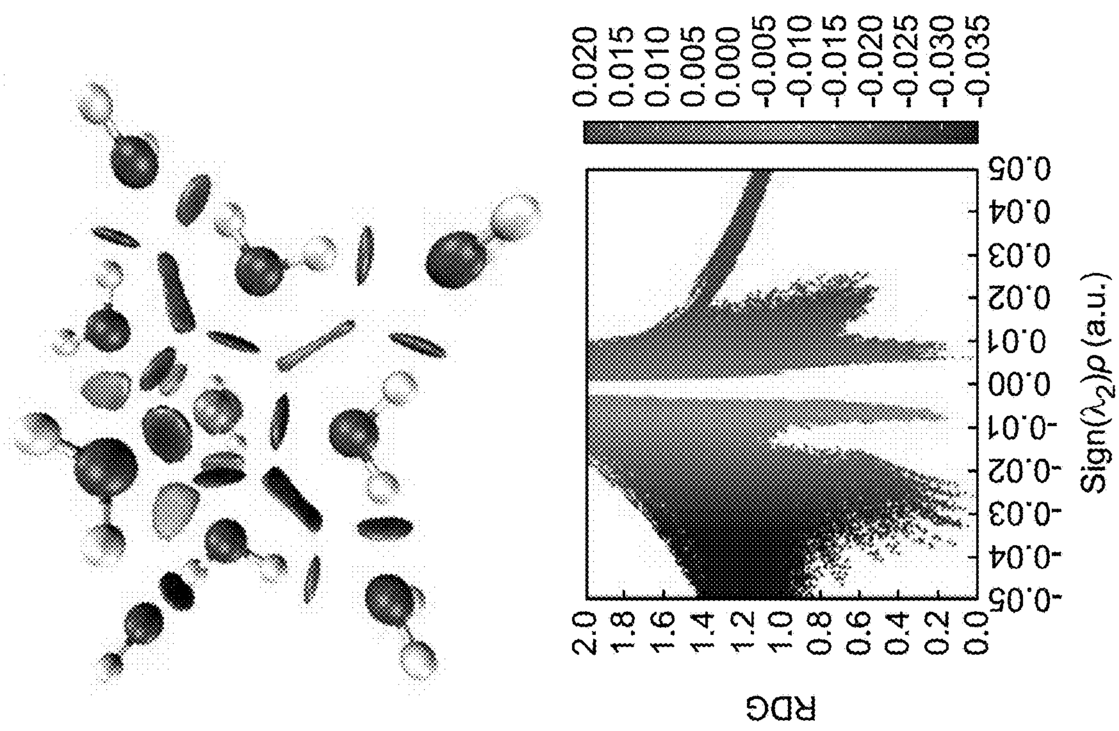
FIG. 9B depicts RDG isosurface of $Ca^{2+}$ hydration, according to certain embodiments.
Figure 9A:
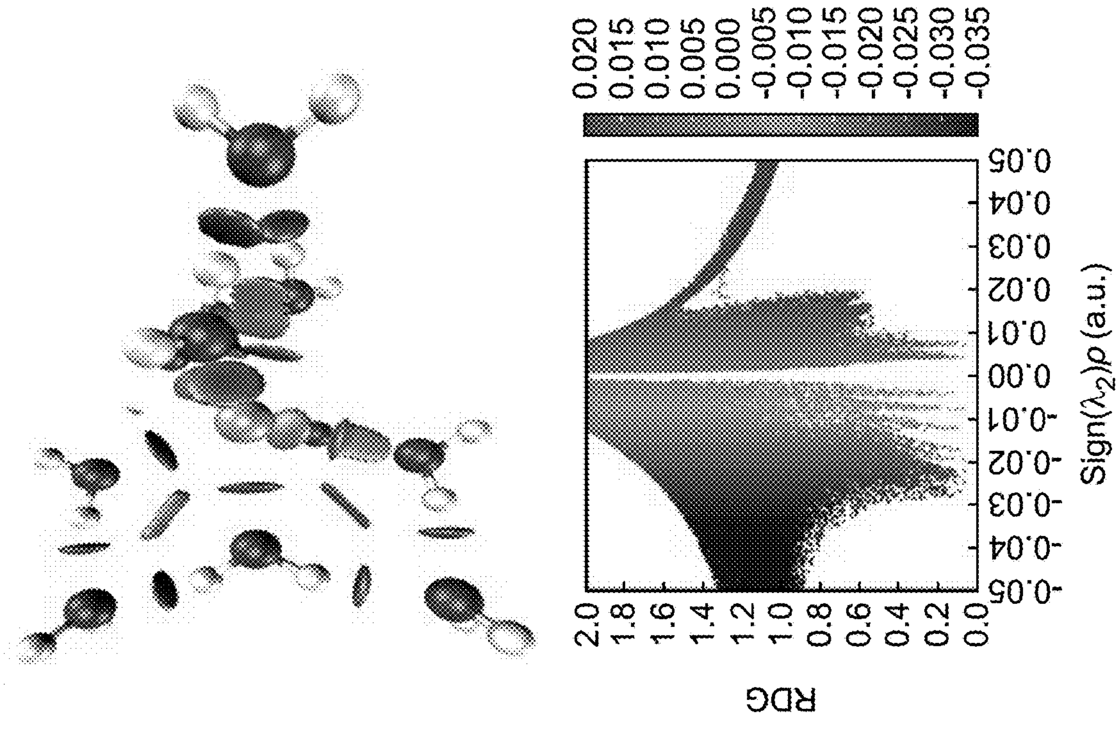
FIG. 9A depicts RDG isosurface of $Ba^{2+}$ hydration, according to certain embodiments.
Figure 9D:
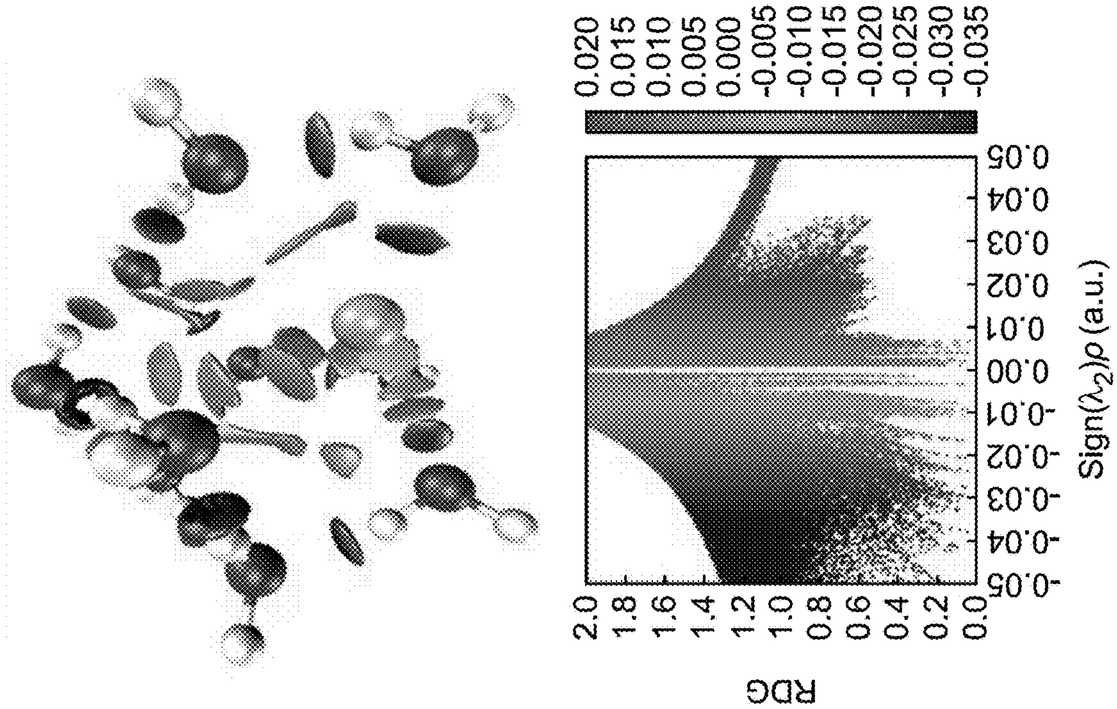
FIG. 9D depicts RDG isosurface of $K^{+}$ hydration, according to certain embodiments.
Figure 9C:
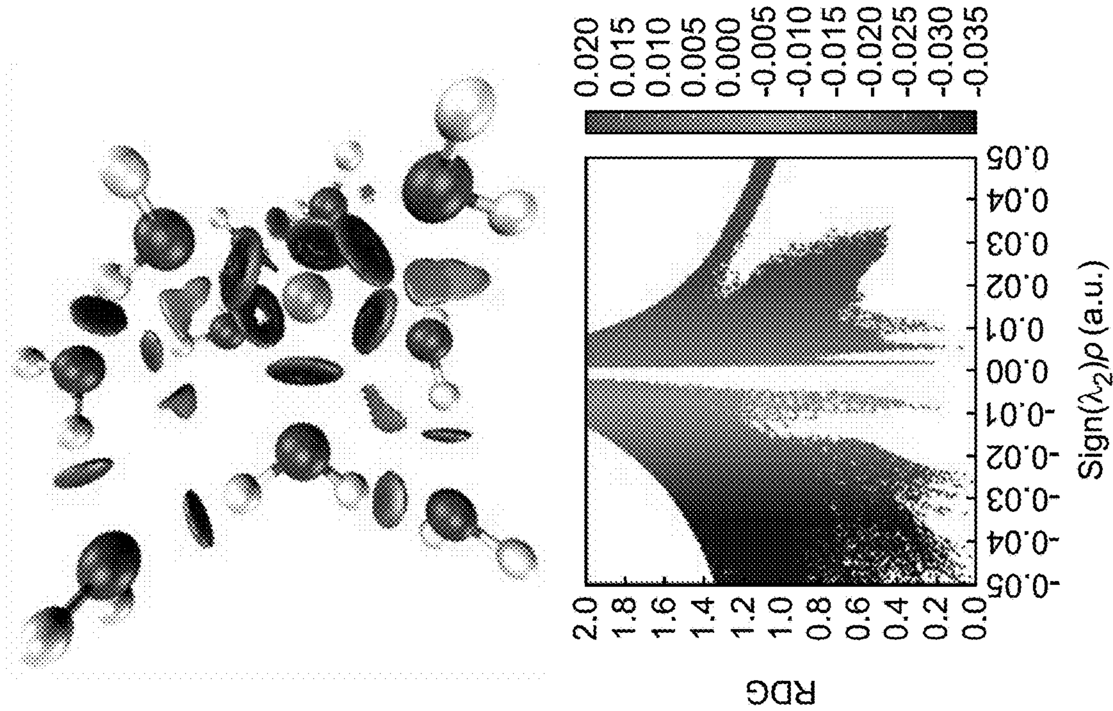
FIG. 9C depicts RDG isosurface of $Cd^{2+}$ hydration, according to certain embodiments.
Figure 10B:
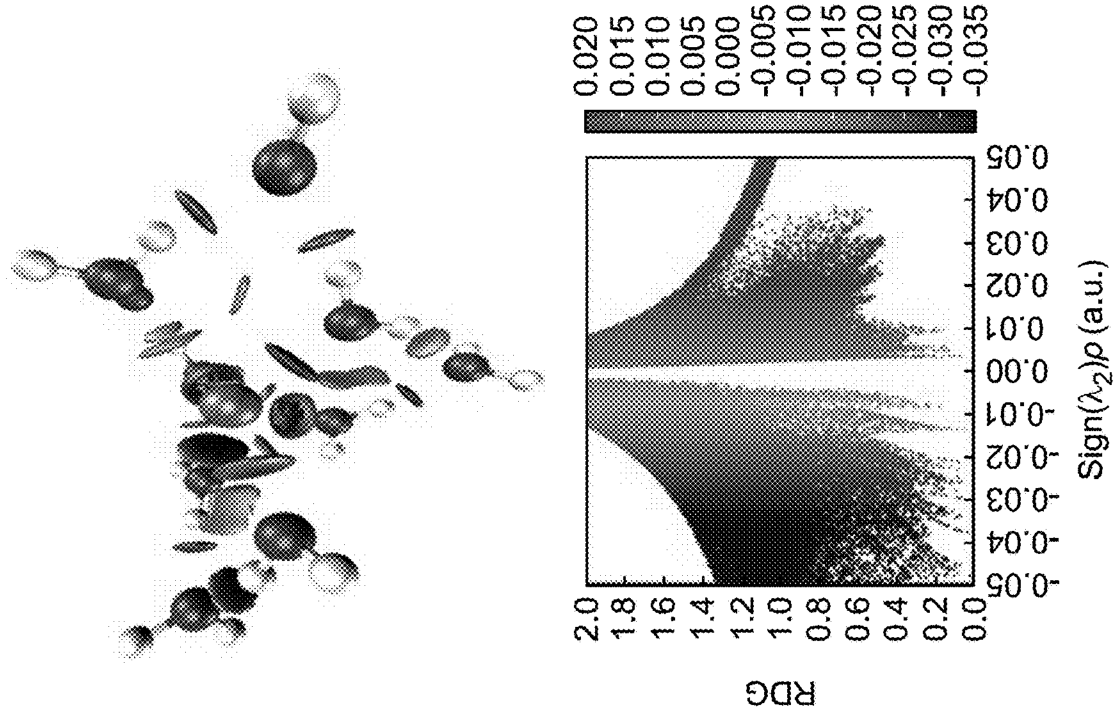
FIG. 10B depicts RDG isosurface of $Pb^{2+}$ hydration, according to certain embodiments.
Figure 10A:
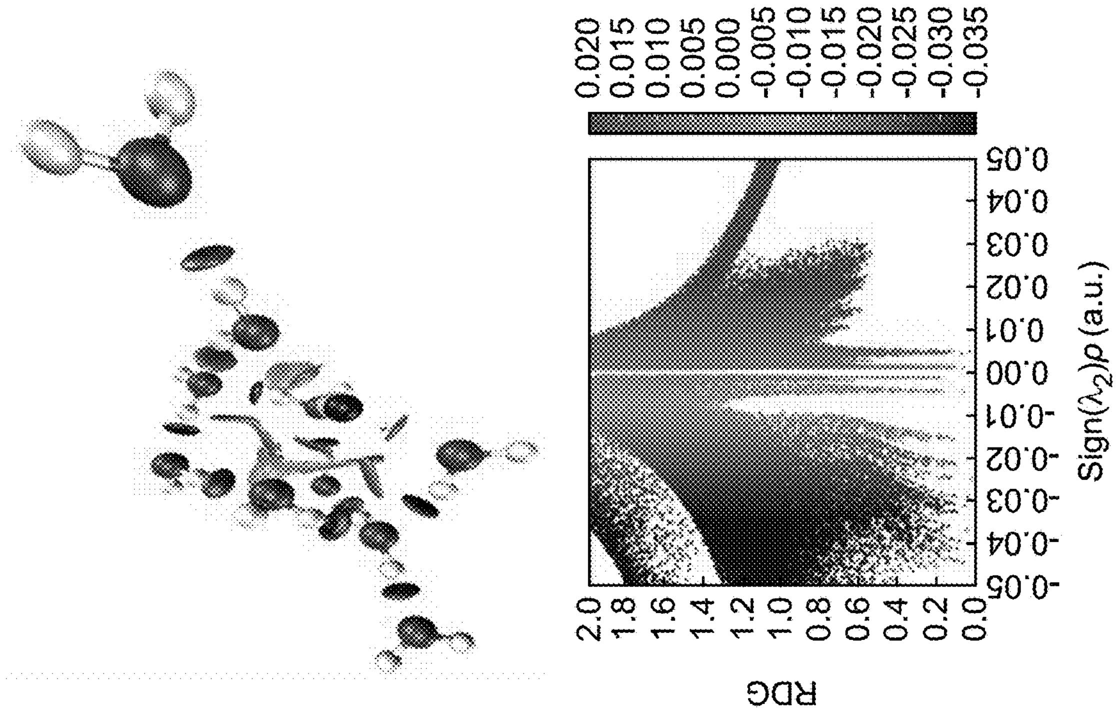
FIG. 10A depicts RDG isosurface of $Na^{1+}$ hydration, according to certain embodiments.
Figure 10D:
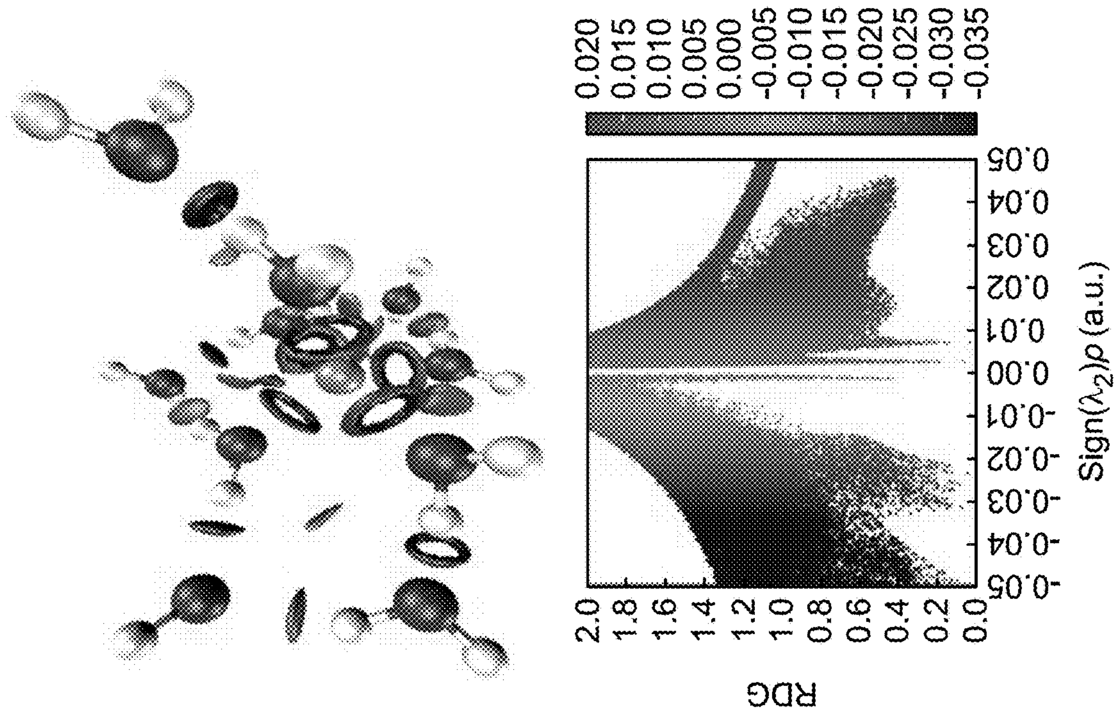
FIG. 10D depicts RDG isosurface of $Zn^{2+}$ hydration, according to certain embodiments.
Figure 10C:
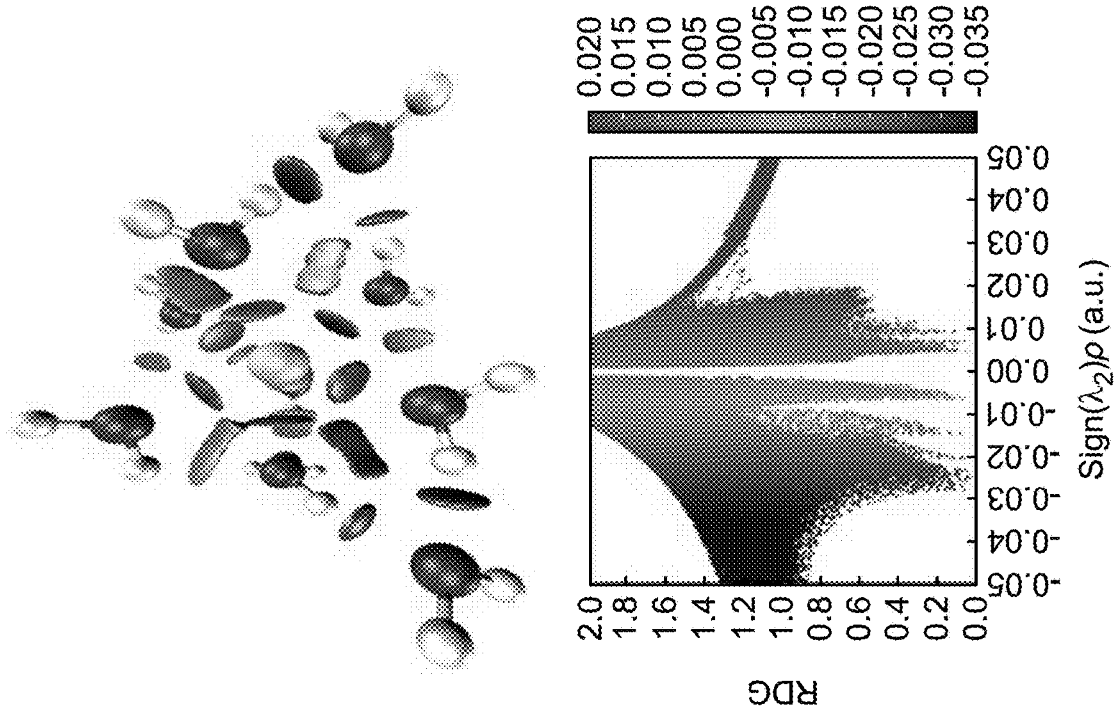
FIG. 10C depicts RDG isosurface of $Sr^{2+}$ hydration, according to certain embodiments.
Figure 11:
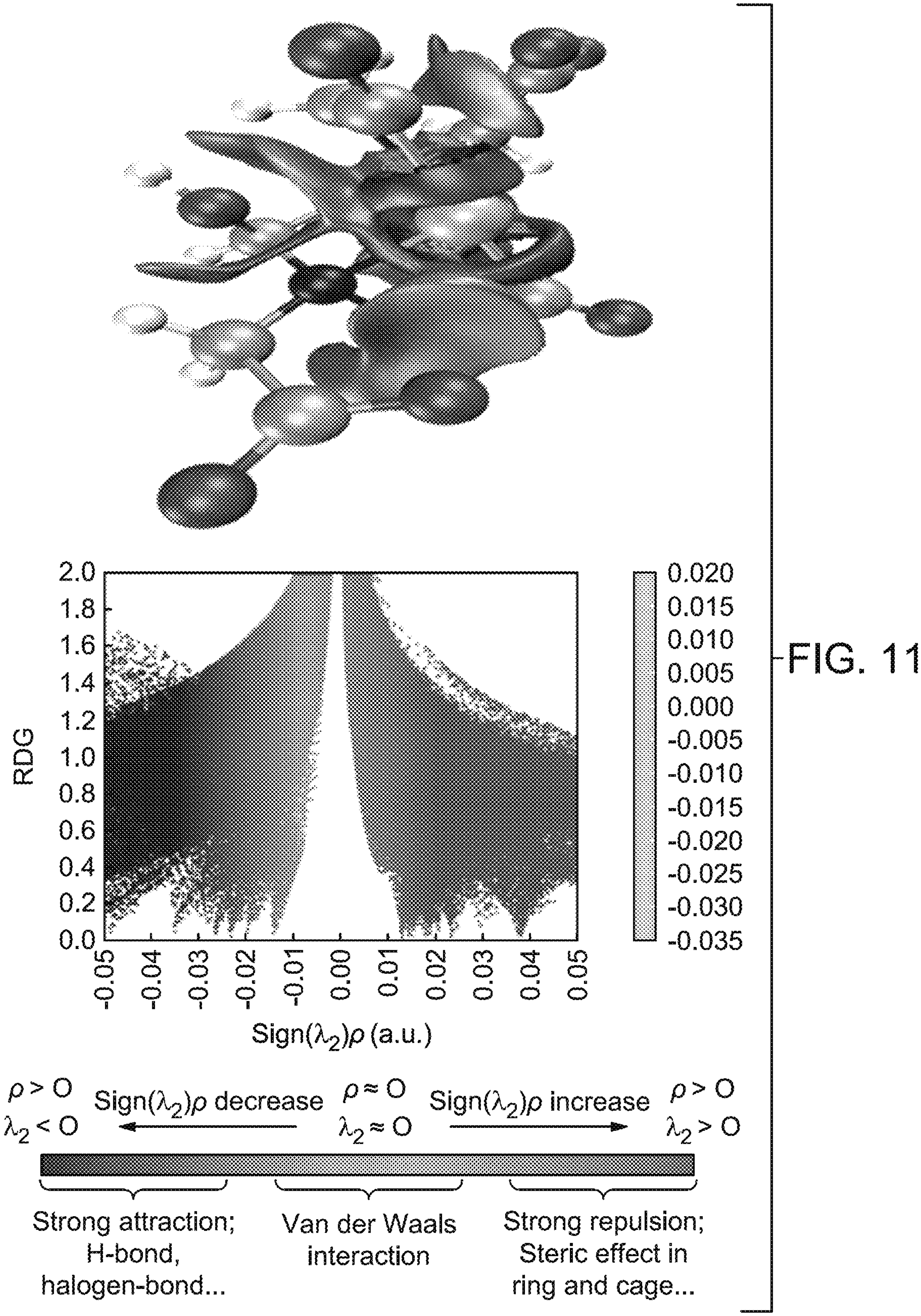
FIG. 11 depicts RDG isosurface of EDTA-$Al^{3+}$ interaction, according to certain embodiments.
Figure 12B:
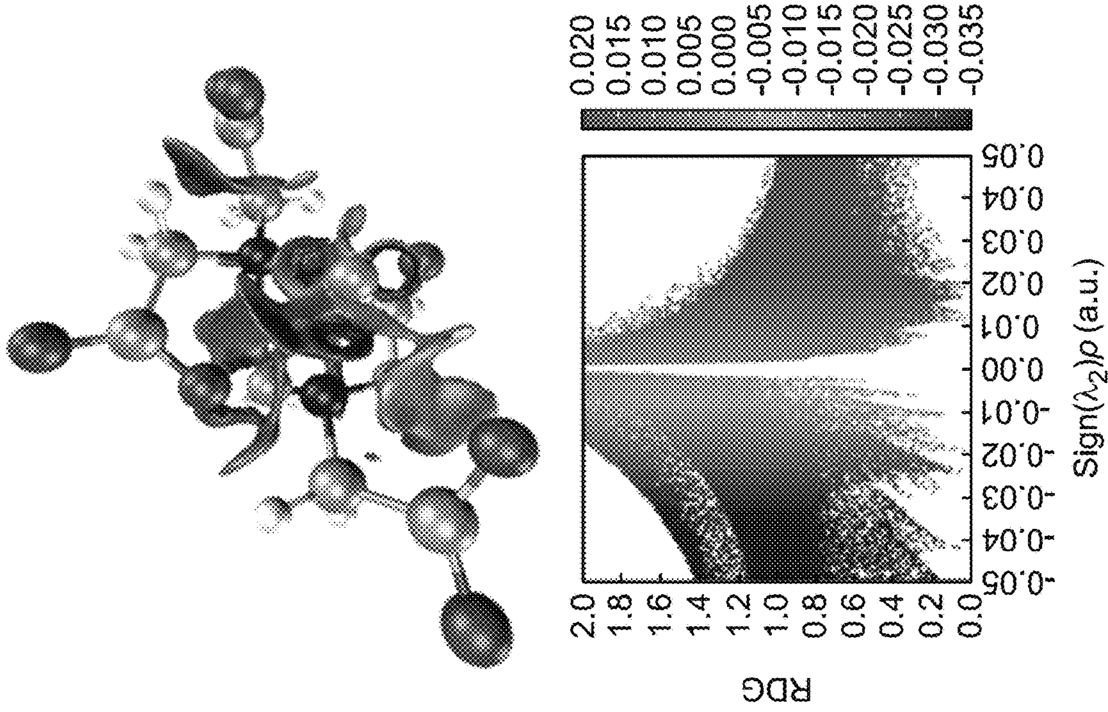
FIG. 12B depicts RDG isosurface of EDTA-$Ca^{2+}$ interaction, according to certain embodiments.
Figure 12A:
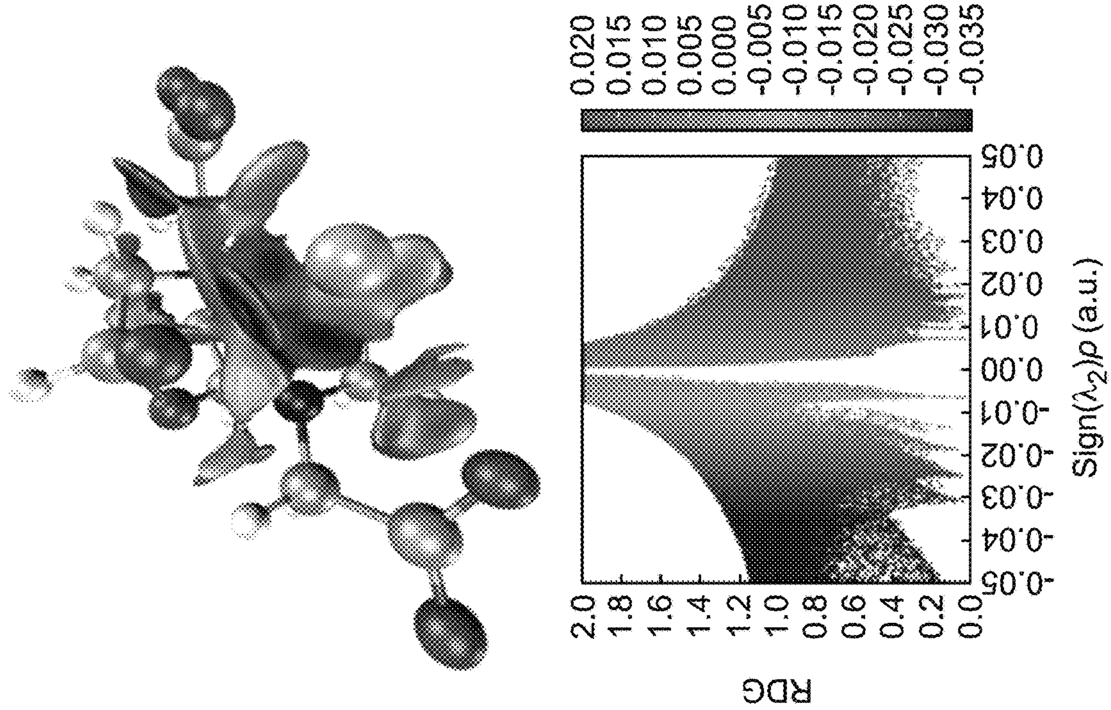
FIG. 12A depicts RDG isosurface of EDTA-$Ba^{2+}$ interaction, according to certain embodiments.
Figure 12D:
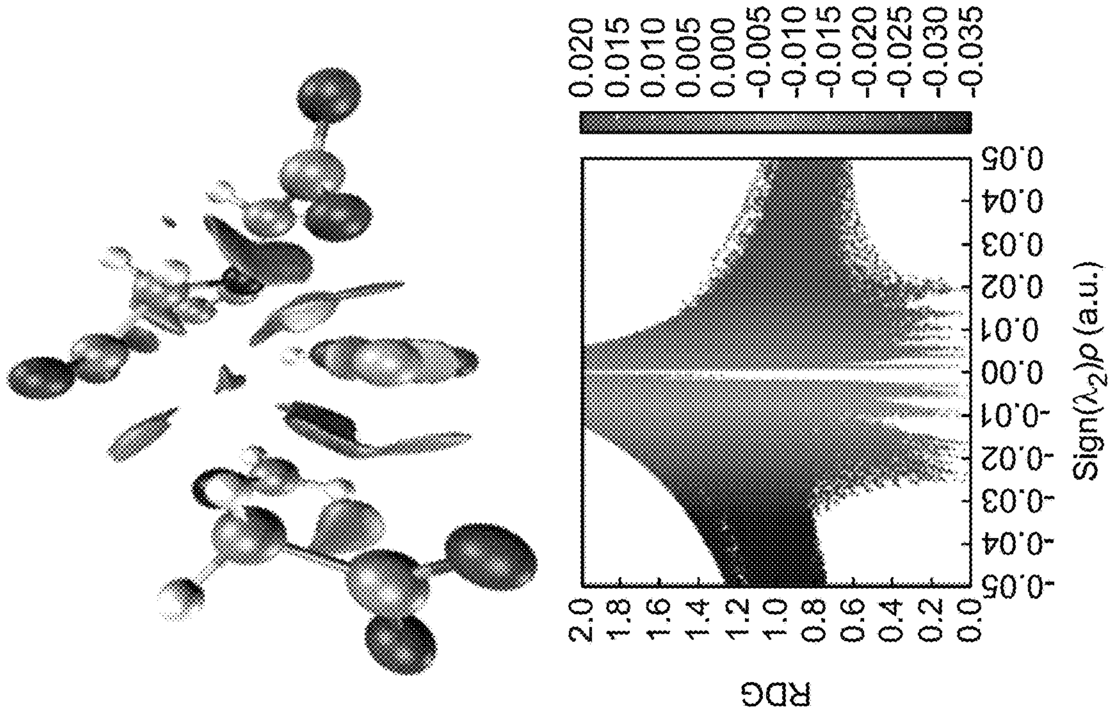
FIG. 12D depicts RDG isosurface of EDTA-$K^{+}$ interaction, according to certain embodiments.
Figure 12C:
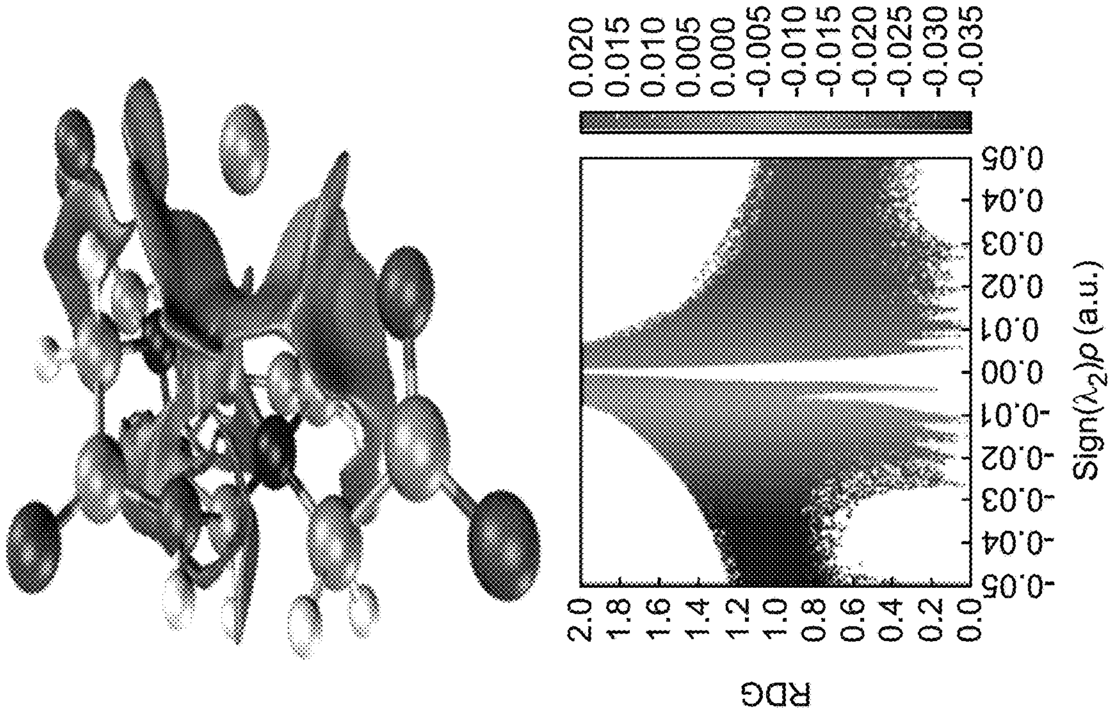
FIG. 12C depicts RDG isosurface of EDTA-$Cd^{2+}$ interaction, according to certain embodiments.
Figure 13B:
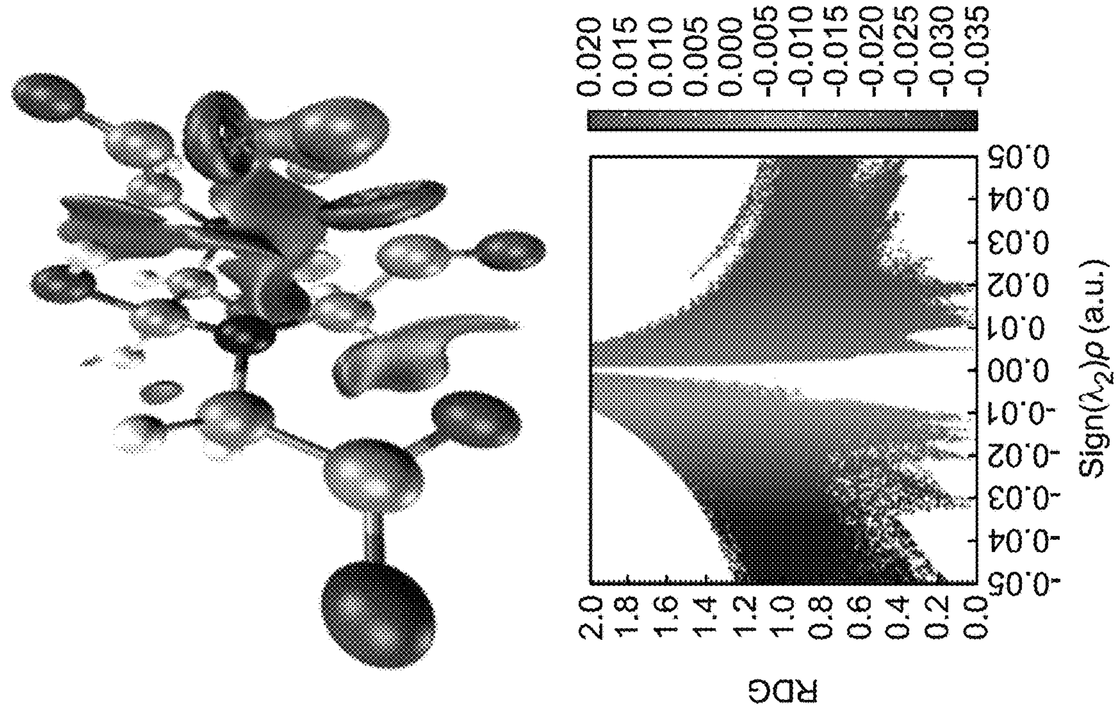
FIG. 13B depicts RDG isosurface of EDTA-$Pb^{2+}$ interaction, according to certain embodiments.
Figure 13A:
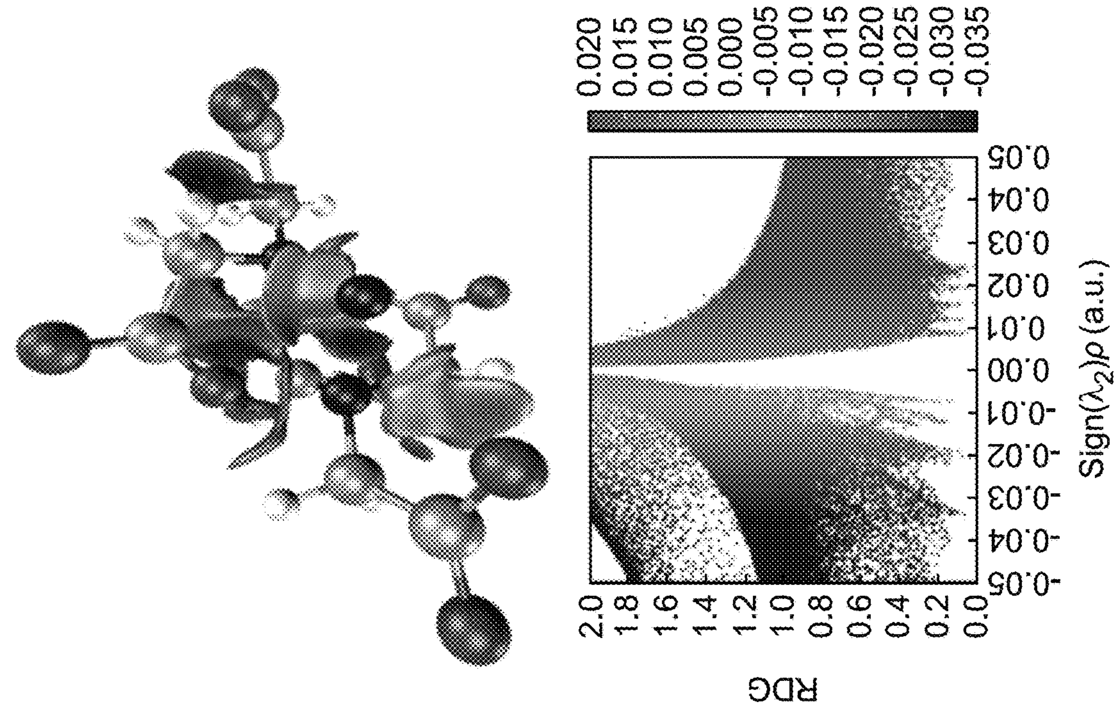
FIG. 13A depicts RDG isosurface of EDTA-$Na^{+}$ interaction, according to certain embodiments.
Figure 13C:
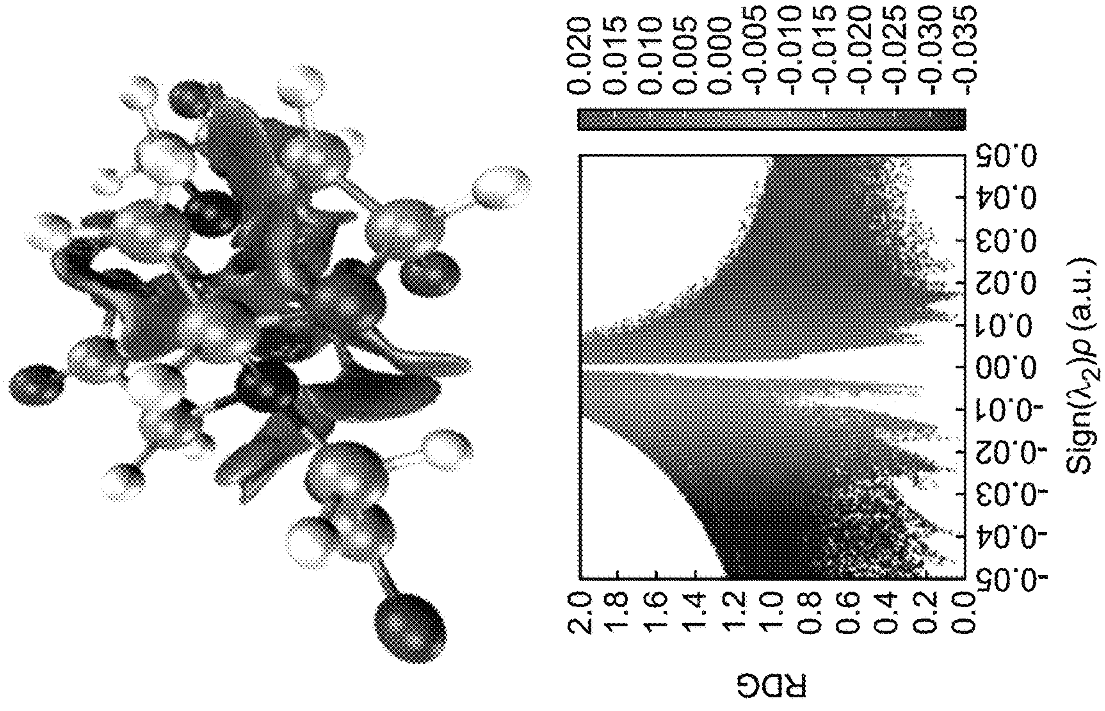
FIG. 13C depicts RDG isosurface of EDTA-$Sr^{2+}$ interaction, according to certain embodiments.
Figure 13D:
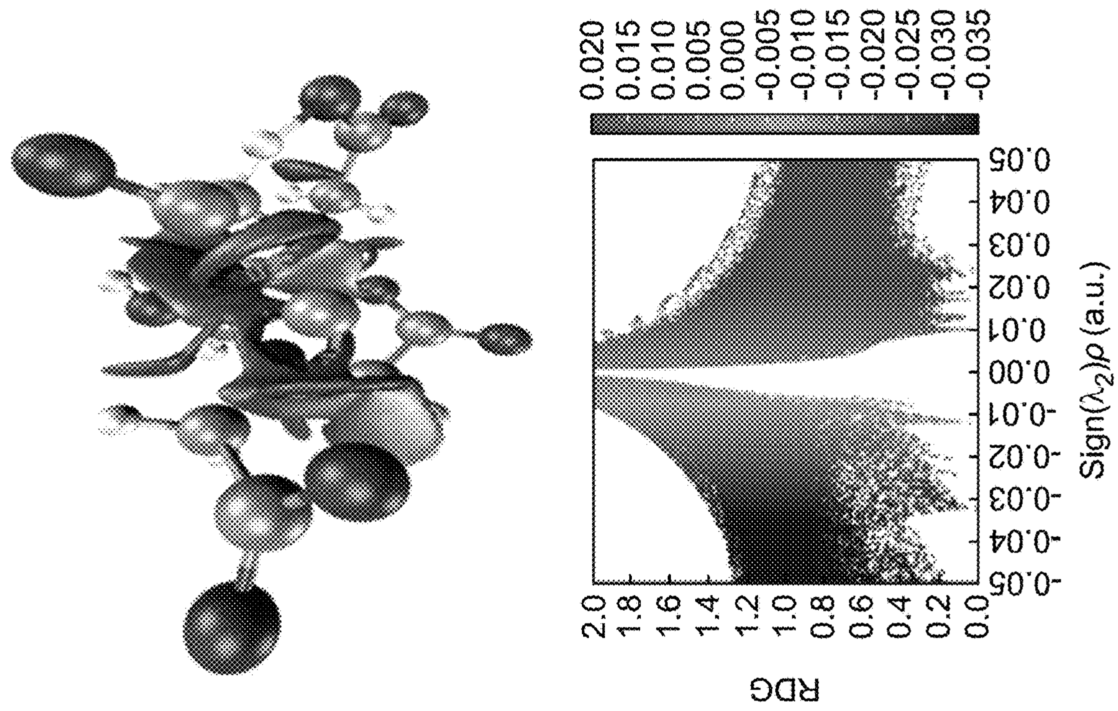
FIG. 13D depicts RDG isosurface of EDTA-$Zn^{2+}$ interaction, according to certain embodiments.

Results of the SEM analysis show that halite (NaCl) is the most predominant mineral in all the analyzed samples (FIGS. 5A-5F). Morphologically, the salt (halite) mainly exhibits euhedral cubic crystals (FIGS. 5A and 5B) and sub-rounded crystal aggregates (FIGS. 5C and 5D). The cubic crystals are characterized by well-developed concentric zones that increase in diameter away from the center of the crystal (FIG. 5A). Furthermore, the EDX analysis shows that halite has incorporated heavy metals such as Zn and Ru in its crystal structure (FIGS. 5B and 5D). The incorporation of these metals into the halite structure is probably because the EDTA is a powerful chelating agent that can form stable complexes with metal ions, including $Zn^{2+}$ and $Ru^{2+}/Ru^{3+}$. This complexation with the EDTA can result in the incorporation of these heavy metals into the NaCl structure through ion exchange and recrystallization. The EDTA assists to solubilize the $Zn^{2+}$ and $Ru^{2+}/Ru^{3+}$ and makes them available for substitution into the halite crystal lattice by structural and charge compensation. Halite generally exhibits dissolution features, which are eventually replaced by either $CaCl_2$) (FIG. 5E), calcite (FIG. 5F) or other mixed salts containing $MgCl_2$, and $CaCl_2$). Calcite is the second most prominent mineral in the analyzed samples (FIGS. 6A-D). The mineral shows mainly rhombohedral morphological characteristics (FIG. 6A), with varying degrees of dissolution and replacement by halite (FIG. 6B), brucite (FIG. 6C), and mixed salts (FIG. 6A). Moreover, the analyzed calcite is closely associated with prismatic-(FIGS. 6D and 6E) and fibrous-shaped aragonite crystals (FIG. 6F). The aragonite shows evidence for replacement by the calcite (FIG. 6D). Overall, brucite (FIG. 6C) and quartz (FIG. 6B) are the least abundant minerals in the samples studied. While brucite mainly occurs as a replacement for calcite, quartz is mostly surrounded by calcite and halite and does not exhibit any sign of alteration or dissolution due to its chemical stability.

This section is aimed at providing further insights into the heavy metal removal process. First by evaluating how the ions exist in the brine (hydrated state), and how the EDTA-Ion interactions result in the removal of the heavy metals. More so, the nature of the interaction i.e. Van der Waals interaction, hydrogen bonding and steric hindrances are evaluated using the NCI analysis. The state of existence of ions in water has received significant attention in the past with the hydration energies and enthalpy of these ions reported in the published art [Rodriguez-Cruz, S. E., et al., Hydration energies of divalent metal ions, $Ca^{2+}(H_2O)_n$ (n=5-7) and $Ni^{2+}(H_2O)_n$ (n=6-8), obtained by blackbody infrared radiative dissociation, J. Am. Chem. Soc., 120 (24), 1998, 5842-5843; and Peschke, M., et al., Hydration energies and entropies for $Mg^{2+}$, $Ca^{2+}$, $Sr^{2+}$, and $Ba^{2+}$ from gas-phase ion-water molecule equilibria determinations, J. Phys. Chem. A, 102 (49), 1998, 9978-9985, incorporated herein by references in their entireties]. However, the number of water molecules required to hydrate these ions has received less attention. More so, how many water molecules exist in the first and second hydration shells is even more scarce in the published art. Additionally, the nature of the interaction although inferred has not been comprehensively analyzed. The case of $Ca^{2+}$ ion is much covered in the literature with different reports showing inconsistency in the number of water molecules required to hydrate the $Ca^{2+}$ [Rodriguez-Cruz, S. E., et al., Hydration energies of divalent metal ions, $Ca^{2+}(H_2O)_n$ (n=5-7) and $Ni^{2+}(H_2O)_n$ (n=6-8), J. Am. Chem. Soc., 120 (24), 1998, 5842-5843, incorporated herein by reference in its entirety]. Experimentally, the coordination number of water molecules that hydrate the $Ca^{2+}$ has been reported to vary between 5-10 [Megyes, T., et al., Solvation of calcium ion in polar solvents: An X-ray diffraction and ab initio study, J. Phys. Chem. A, 108 (33), 2004, 7261-7271; and Fulton, J. L., et al., Understanding the effects of concentration on the solvation structure of $Ca^{2+}$ in aqueous solution: The perspective on local structure from EXAFS and XANES, J. Phys. Chem. A, 107 (25), 2003, 4688-4696, incorporated herein by references in their entireties]. This can be attributed to the different experimental conditions and water environment. In another experimental study using infrared spectroscopy [Bush, M. F., et al., Hydration of alkaline earth metal dications: Effects of metal ion size determined using infrared action spectroscopy, J. Am. Chem. Soc., 131 (37), 2009, 13270-13277; Bush, M. F., et al., Infrared action spectra of $Ca^{2+}(H_2O)_{11-69}$ exhibit spectral signatures for condensed-phase structures with increasing cluster size, J. Am. Chem. Soc., 130 (46), 2008, 15482-15489; and Bush, M. F., et al., Hydration of the calcium dication: Direct evidence for second shell formation from infrared spectroscopy, ChemPhysChem, 8 (15), 2007, 2245-2253, incorporated herein by references in their entirety], 6-8 water molecules were reported to be adjacent to the $Ca^{2+}$ however, this is dependent on the total number of water molecules. Monte Carlo [Bernal-Uruchurtu, M. I., et al., A refined Monte Carlo study of $Mg^{2+}$ and $Ca^{2+}$ hydration, J. Chem. Phys., 103 (5), 1995, 1588-1598, incorporated herein by reference in its entirety] and molecular dynamics (MD) [León-Pimentel, C. I., et al., Aqueous solvation of Mg(II) and Ca(II): A Born-Oppenheimer molecular dynamics study of microhydrated gas phase clusters, J. Chem. Phys., 148 (22), 2018; Wanprakhon, S., et al., Hydration structure and dynamics of $K^+$ and $Ca^{2+}$ in aqueous solution: Comparison of conventional QM/MM and ONIOM-XS MD simulations, Chem. Phys. Lett., 517 (4-6), 2011, 171-175; and Todorova, T., et al., Car-Parrinello molecular dynamics simulations of $CaCl_2$) aqueous solutions, J. Chem. Theory Comput., 4 (5), 2008, 779-789, incorporated herein by references in their entireties] simulation of the $Ca^{2+}$ hydration has reported 6-10 water molecules with DFT calculations [Lei, X. L., et al., Structures, stability, vibration entropy and IR spectra of hydrated calcium ion clusters $[Ca(H_2O)_n]^{2+}$ (n=1-20, 27): A systematic investigation by density functional theory, J. Phys. Chem. A, 114 (28), 2010, 7595-7603; Shi, R., et al., Ground-state structures of hydrated calcium ion clusters from comprehensive genetic algorithm search, Front. Chem., 9 (1), 2021, 1-9; Peschke, M., et al., Binding energies for doubly-charged ions $M^{2+}$=$Mg^{2+}$, $Ca^{2+}$ and $Zn^{2+}$ with ligands L=$H_2O$, acetone and N-methylacetamide in complexes $M_n$ (n=1-7) from gas phase equilibria determinations, J. Am. Chem. Soc., 122 (43), 2000, 10440-10449; and Carl, D. R., et al., Binding energies for the inner hydration shells of $Ca^{2+}$: An experimental and theoretical investigation of $Ca^{2+}(H_2O)_x$ complexes (x=5-9), Int. J. Mass Spectrom., 265 (2-3), 2007, 308-325, incorporated herein by references in their entireties] revealing 6 water molecules in the first hydration shell. However, different levels of theory were implemented to arrive at their respective conclusions.

In the present disclosure, the coordination number of each ion is studied with the results shown in Table 15 and FIGS. 7A-7D. As reported in the published art using DFT calculations [Shi, R., et al., Ground-state structures of hydrated calcium ion clusters from comprehensive genetic algorithm search, Front. Chem., 9 (1), 2021, 1-9, incorporated herein by reference in its entirety], results from the present disclosure showed that in the case of $Ca^{2+}$, the first hydration shells have 6 and 4 water molecules first and second hydration shell respectively. However, this disagrees with another report [Rodriguez-Cruz, S. E., et al., Hydration energies of divalent metal ions, $Ca_{2+}(H_2O)_n$ (n=5-7) and $Ni^{2+}(H_2O)_n$ (n=6-8), J. Am. Chem. Soc., 120 (24), 1998, 5842-5843, incorporated herein by reference in its entirety] where the coordination number was reported to be 7-9 in the first hydration shell. However, the authors used the Blackbody Infrared Radiative Dissociation for their study. Additionally, Table 15 shows that Na and Ni have 4 water molecules in their first hydration shells whereas Zn has 5. Ions such as Al, Ca, Cd, Fe, K, Mg, and Pb have 6 water molecules with Ba, Mn, and Sr having 7 water molecules in their first hydration shells. From the table also, it can be observed that no correlation exists between the ionic and atomic radius of the ions with the number of water molecules in the hydration shells. Moreover, no correlation exists with the ionic charges.

TABLE 15

Number of water molecules in first (N1) and second (N2) hydration shells

| Ion | Hydration Shells (N) | |
|---|---|---|
| | N1 | N2 |
| Al | 6 | 4 |
| Ba | 7 | 3 |
| Ca | 6 | 4 |
| Cd | 6 | 4 |
| Fe | 6 | 4 |
| K | 6 | 4 |
| Mg | 6 | 4 |
| Mn | 7 | 3 |
| Na | 4 | 6 |
| Ni | 4 | 6 |
| Pb | 6 | 4 |
| Sr | 7 | 3 |
| Zn | 5 | 5 |

In addition to the evaluation of the number of water molecules which are found in the first and second hydration shells of the ions, the nature of the interaction of the water molecules with the ions is also evaluated. This was achieved by NCI analysis and plotting the RDG maps. From these maps, the nature of the interactions, i.e. Van der Waals interaction, hydrogen bonding formation and steric clashes can be ascertained. This further indicates the mechanisms with which different cations are hydrated. FIGS. 8-10D shows the RDG map of the hydrated ions with the color band used to depict hydrogen bond formation, Van der Waal interactions and steric clashes. From these figures, the hydration of the ions is largely dominated by hydrogen bond formation and Van der Waals interactions. More so, the interaction between the first and second hydration shells are via hydrogen bond formation. This further affirms the existing knowledge of how water molecules interact to hydrate ions. However, more importantly, the information provided in this section elucidates the ground state hydration of ions which has largely received less attention.

The interaction or rather the chelation of the heavy metal ions by the EDTA molecule is evaluated in this section. This is because the mechanism of heavy metal removal herein is based on the ability of the EDTA solution to facilitate the mineralization of the heavy metals. Thus, how well the EDTA solution chelates the ions is analyzed. This is achieved by calculating the binding energy of the complex with the counterpoise error correction applied. The binding energy of the EDTA molecule with the different ions is shown in Table 16. From the table, EDTA can be observed to bind instantaneously with all ions except in the cases of K and Na. This is inferred from the negative values of the binding energy. The binding energy of EDTA increases in the order of Ba<Sr<Cd<Ca<Mg<Pb<Zn<Ni<Al<Mn. Furthermore, there is a correlation between the ion charges and the binding energy of the complexes. Ions carrying a $3^+$ charge are therefore more capable of binding than those carrying a $2^+$ charge, and ions carrying a $2^+$ charge are more capable of binding than monovalent ions.

In the cases of Na and K, a positive binding energy was observed which implies that these ions are not instantaneously chelated by the EDTA molecules or do not form stable complexes with Na and K. EDTA chelates ions by the formation of complexes through coordination bond with metals. For other ions, such as Ca, chelation takes place via a number of coordination sites, resulting in the formation of a 1:1 complex with the metal ions. This happens as a result of the nitrogen and oxygen atoms in the EDTA molecule's lone pairs of electrons forming coordination bonds with the metals. No stable complex can be developed in the case of Na because it lacks d or f orbitals that are suitable for the creation of coordination bonds. This is also caused by the alkali metals' low charge density and the absence of suitable empty orbitals needed for the efficient creation of coordination bonds. Therefore, it is possible to attribute Na and K's incapacity to form stable complexes to their respective electronic configurations, and coordination preferences. More so, the chelation of the ions by EDTA is driven by the Van der Waals type of interaction across all examined ions (FIGS. 11-13D). The lack of their ability to form complexes with EDTA molecules also creates an opening for halite to precipitate when the brines become saturated with sodium and chloride ions.

TABLE 16

The binding energy of EDTA-Ion complex

| Ions | Binding Energy (kcal/mol) |
|---|---|
| Al | −981.141 |
| Ba | −123.695 |
| Ca | −184.613 |
| Cd | −168.910 |
| K | 190.061 |
| Mg | −203.744 |
| Mn | −1229.804 |
| Na | 286.415 |
| Ni | −444.331 |
| Pb | −235.054 |
| Sr | −151.043 |
| Zn | −289.141 |

Furthermore, the XRD's evidence for the creation of brucite may be explained by magnesium's strong hydration stability. As a result, the DFT calculations' findings offered both logical justifications for the precipitates that were seen and insights into the ion's state. Following the cations' chelation by EDTA, $CO_2$ dissolves in brine to generate $CO_3^{2-}$, which binds to the chelated cation to form carbonates. However, several factors influence the likelihood of carbonate formation. There have been reports in the published art [Jarwar, M. A., et al., Co-precipitation of Cd, Cr, Pb, Zn, and carbonates using *Vibrio harveyi* strain isolated from Mediterranean Sea sediment, Minerals, 13 (5), 2023, 627; and Kim, Y., et al., Effect of divalent cations (Cu, Zn, Pb, Cd, and Sr) on microbially induced calcium carbonate precipitation and mineralogical properties, Front. Microbiol., 12 (3), 2021, 1-12, incorporated herein by references in their entireties] of carbonates being formed by heavy metals such as Zn, Pb, Cd, and Cu. But this depends on factors such as the ion-carbonate solubility product and the solution pH, which needs to be high. It was discovered subsequently in a different study that ion concentration affects the mineralization of cations. Therefore, even in the presence of other parameters such as a high pH, the mineralization of the heavy metals would be impossible due to the low concentration of these metals in the wastewater used in the present disclosure. Thus, infusing the heavy metals into carbonates such as aragonite, calcites, or halite precipitates is the sole method by which they might be extracted from waste fluids. Furthermore, the method used here could be applied even at pH values as low as 6, as seen in FIGS. 3A-3D.

Disclosed herein is a process for the removal of heavy metals from wastewater and produced water via mineral immobilization and precipitation. The process employs additives, such as EDTA, to enhance mineralization kinetics under conditions involving environmental $CO_2$ absorption and subsequent bubbling through the wastewater. The following findings summarize the observations of the present study: metal immobilization and precipitation methods are applicable for the removal of heavy metals from produced water associated with oil field operations, as well as industrial and residential wastewater streams. The disclosed procedure leverages $CO_2$ uptake from ambient air, thereby reducing greenhouse gas emissions and mitigating environmental impact. Heavy metal removal via mineralization constitutes an auxiliary approach that enhances the efficacy of advanced water treatment systems. The method requires minimal adjustments and is readily adaptable for integration into existing water treatment plant infrastructure. Heavy metal extraction is effected through the incorporation of metal ions into the crystalline structures of precipitates, such as halite, calcite, and aragonite. The effectiveness of metal immobilization exhibits a correlation with ionic charge and the hydration shell size, as defined by the number of coordinated water molecules. The interaction between the chelating agent and metal ions is predominantly governed by van der Waals forces.

Numerous modifications and variations of the present disclosure are possible in light of the above teachings. It is therefore to be understood that within the scope of the appended claims, the invention may be practiced otherwise than as specifically described herein.

The invention claimed is:

1. A method of removing a heavy metal from a wastewater, comprising:

adding a chelating agent to the wastewater to obtain a mixture;

mixing $CO_2$ with the mixture to reach an alkaline pH to generate a carbonic mixture; and precipitating the carbonic mixture to generate a mineral entrapping the heavy metal, wherein the chelating agent is present in the wastewater at an amount of 0.1 to 15 wt. % based on the total weight of the wastewater;

wherein the wastewater comprises an alkali metal and an alkaline earth metal;

wherein the heavy metal, the alkali metal, and the alkaline earth metal are in the form of water-soluble salts;

wherein the chelating agent is at least one selected from the group consisting of ethylenediaminetetraacetic acid (EDTA), gluconic acid, citric acid, and phytic acid;

wherein the $CO_2$ is in the form of a gas consisting essentially of $CO_2$ at a pressure of 10 to 100 psi, and the mixing includes sparging the $CO_2$ into the mixture with a flow rate sufficient to distribute the $CO_2$ evenly into the mixture;

wherein the carbonic mixture has a pH of 8 to 12; and wherein the heavy metal is present in the mineral in an amount of 0.001 to 1 wt. % based on the total weight of the mineral after precipitating.

2. The method of claim 1, wherein the mixing includes turbulent mixing of the $CO_2$ through the mixture.

3. The method of claim 1, wherein the heavy metal is at least one selected from the group consisting of iron, copper, lead, cadmium, chromium, nickel, zinc, strontium, barium, cobalt, manganese, gold, ruthenium, palladium, and silver.

4. The method of claim 1, wherein the alkali metal is sodium, potassium, or a combination thereof.

5. The method of claim 1, wherein the alkaline earth metal is magnesium, calcium, or a combination thereof.

6. The method of claim 1, wherein the $CO_2$ is mixed with the mixture at a pressure of 12 to 80 psi.

7. The method of claim 1, further comprising:

repeating the mixing and the precipitating 3 to 10 times.

8. The method of claim 1, wherein the mixing lasts for a period of 1 to 1500 minutes.

9. The method of claim 1, wherein the carbonic mixture has a pH of 8 to 12 after precipitating.

10. The method of claim 1, wherein the precipitating is carried out for a period of 10 to 100 hours.

11. The method of claim 1, wherein the precipitating generates 0.1 to 5 g of mineral per 50 mL of wastewater.

12. The method of claim 1, wherein the mineral comprises sodium in an amount of 2 to 25 wt. %, magnesium in an amount of 0.5 to 6 wt. %, aluminum in an amount of 0.01 to 0.2 wt. %, silicon in an amount of 0.001 to 0.4 wt. %, chloride in an amount of 35 to 70 wt. %, potassium in an amount of 0.1 to 8 wt. %, calcium in an amount of 4 to 30 wt. %, chromium in an amount of 0.0001 to 0.05 wt. %, manganese in an amount of 0.001 to 0.3 wt. %, iron in an amount of 0.0.0001 to 0.05 wt. %, cobalt in an amount of 0.0001 to 0.02 wt. %, nickel in an amount of 0.001 to 0.04 wt. %, copper in an amount of 0.001 to 0.03 wt. %, zinc in an amount of 0.0001 to 0.01 wt. %, and strontium in an amount of 0.005 to 0.03 wt. %, based on the total weight of the mineral.

13. The method of claim 1, wherein the mineral comprises halite in an amount of 80 to 99.8 wt. %.

14. The method of claim 13, wherein the halite comprises chloride in an amount of 40 to 55 wt. % sodium in an amount of 25 to 35 wt. %, oxygen in an amount of 10 to 15 wt. %, zinc in an amount of 2 to 6 wt. %, magnesium in an amount of 0.1 to 2 wt. %, and calcium in an amount of 0.1 to 2 wt. %, based on the total amount of the halite in the mineral.

15. The method of claim 13, wherein the halite further comprises palladium in an amount of 1 to 5 wt. %, ruthenium in an amount of 1 to 4 wt. %, based on the total amount of the halite in the mineral.

16. The method of claim 1, wherein the mineral comprises quartz in an amount up to 5 wt. %.

17. The method of claim 1, wherein the mineral comprises brucite in an amount up to 12 wt. %, and aragonite in an amount up to 2 wt. % based on the total weight of the mineral.

18. The method of claim 1, wherein the mineral comprises calcite in an amount of 0.05 to 4 wt. %, based on the total weight of the mineral.

19. The method of claim 1, wherein the mineral comprises halite and brucite in a rhombohedral morphology, calcite in a prismatic morphology, and aragonite in a fibrous-shaped morphology.

20. The method of claim 1, wherein the amount of heavy metal in the wastewater is reduced by 30 to 100% by weight after the precipitating.

* * * * *